US012203055B2

(12) United States Patent
Lo et al.

(10) Patent No.: US 12,203,055 B2
(45) Date of Patent: *Jan. 21, 2025

(54) DETERGENT COMPOSITIONS CONTAINING A STABILIZED ENZYME BY PHOSPHONATES

(71) Applicant: ECOLAB USA INC., Saint Paul, MN (US)

(72) Inventors: Wendy Lo, Saint Paul, MN (US); Erik C. Olson, Saint Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/480,275

(22) Filed: Oct. 3, 2023

(65) Prior Publication Data

US 2024/0052269 A1 Feb. 15, 2024

Related U.S. Application Data

(60) Continuation of application No. 17/302,096, filed on Apr. 23, 2021, now Pat. No. 11,807,835, which is a
(Continued)

(51) Int. Cl.
*C11D 3/386* (2006.01)
*C11D 3/07* (2006.01)
(Continued)

(52) U.S. Cl.
CPC ................ *C11D 3/386* (2013.01); *C11D 3/07* (2013.01); *C11D 3/30* (2013.01); *C11D 3/36* (2013.01);
(Continued)

(58) Field of Classification Search
CPC ......... C11D 3/386; C11D 3/07; C11D 3/0052; C11D 17/0073
See application file for complete search history.

(56) References Cited

U.S. PATENT DOCUMENTS 4,608,189 A 8/1986 Koch et al.
6,099,587 A * 8/2000 Scialla ................ C11D 3/3947 510/303
(Continued)

FOREIGN PATENT DOCUMENTS

DE 102009002094 A1 10/2010
DE 102013225920 A1 6/2015
(Continued)

OTHER PUBLICATIONS

"The International Search Report and Written Opinion of the International Searching Authority", in connection to PCT/US2017/050489 filed Sep. 7, 2017 mailed Feb. 12, 2018.
(Continued)

*Primary Examiner* — Liam J Heincer
*Assistant Examiner* — M. Reza Asdjodi
(74) *Attorney, Agent, or Firm* — McKee, Voorhees & Sease, PLC

(57) ABSTRACT

Detergent compositions that contain an enzyme, alkaline source, and phosphonate or amine phosphonate salt are described here. A use solution of the detergent compositions containing disclosed phosphonates can retain its enzyme activity for an extended period of time. Specifically, one specific type of phosphonates and another specific type of amine phosphonate salts were discovered to stabilize enzymes in detergent compositions. Solid detergent compositions that contain disclosed phosphonate or amine phosphonate salts are more effective to remove soils and can save production and use costs.

20 Claims, 13 Drawing Sheets

Related U.S. Application Data division of application No. 15/697,991, filed on Sep. 7, 2017, now Pat. No. 11,021,680.

(60) Provisional application No. 62/384,433, filed on Sep. 7, 2016.

(51) Int. Cl.
*C11D 3/30* (2006.01)
*C11D 3/36* (2006.01)
*C11D 17/00* (2006.01)
*C11D 17/06* (2006.01)

(52) U.S. Cl.
CPC .......... *C11D 3/364* (2013.01); *C11D 3/38663* (2013.01); *C11D 17/0052* (2013.01); *C11D 17/0073* (2013.01); *C11D 17/06* (2013.01)

(56) References Cited

U.S. PATENT DOCUMENTS

| | | | | |
|---|---|---|---|---|
| 6,177,392 | B1 | 1/2001 | Lentsch et al. | |
| 6,362,150 | B1 | 3/2002 | Lunati | |
| 6,440,926 | B1 * | 8/2002 | Spadoni | C11D 7/268 510/276 |
| 6,638,902 | B2 | 10/2003 | Tarara et al. | |
| 7,087,569 | B2 | 8/2006 | Lentsch et al. | |
| 7,888,303 | B2 | 2/2011 | Tjelta et al. | |
| 7,893,012 | B2 | 2/2011 | Tjelta et al. | |
| 8,236,734 | B1 | 8/2012 | Shen et al. | |
| 8,888,924 | B2 * | 11/2014 | Silvernail | A47L 15/4436 134/29 |
| 8,894,897 | B2 | 11/2014 | Stolte et al. | |
| 9,663,748 | B2 * | 5/2017 | Silvernail | C11D 7/06 |
| 11,021,680 | B2 * | 6/2021 | Lo | C11D 3/364 |
| 2002/0177541 | A1 * | 11/2002 | Tarara | C11D 3/386 510/392 |
| 2003/0139310 | A1 | 7/2003 | Smith et al. | |
| 2005/0020466 | A1 | 1/2005 | Man et al. | |
| 2006/0113506 | A1 * | 6/2006 | Man | C11D 3/3945 252/186.1 |
| 2007/0232514 | A1 | 10/2007 | Nielsen et al. | |
| 2008/0274930 | A1 | 11/2008 | Smith et al. | |
| 2009/0102085 | A1 | 4/2009 | Stolte et al. | |
| 2009/0105114 | A1 | 4/2009 | Stolte et al. | |
| 2011/0152158 | A1 * | 6/2011 | Bettiol | C11D 3/0084 510/237 |
| 2012/0015858 | A1 | 1/2012 | Kessler et al. | |
| 2012/0149625 | A1 * | 6/2012 | Simonsen | C11D 3/38663 510/226 |
| 2013/0239995 | A1 * | 9/2013 | Johnson | C11D 3/046 134/28 |
| 2014/0053876 | A1 * | 2/2014 | Silvernail | C11D 7/06 206/524.1 |
| 2014/0073550 | A1 * | 3/2014 | Olson | C11D 3/365 510/109 |
| 2015/0017707 | A1 | 1/2015 | Mussmann et al. | |
| 2015/0038390 | A1 | 2/2015 | Silvernail et al. | |
| 2015/0132832 | A1 * | 5/2015 | Chan | C11D 3/38609 510/392 |
| 2016/0060611 | A1 | 3/2016 | Alekseyeyv et al. | |
| 2016/0177233 | A1 * | 6/2016 | Silvernail | C11D 3/364 134/42 |
| 2018/0023037 | A1 * | 1/2018 | Silvernail | C11D 3/3773 134/42 |
| 2018/0066208 | A1 * | 3/2018 | Olson | C11D 1/143 |
| 2018/0066213 | A1 * | 3/2018 | Lo | C11D 3/38636 |
| 2020/0346253 | A1 * | 11/2020 | Carter | C11D 3/10 |
| 2021/0253979 | A1 * | 8/2021 | Lo | C11D 3/38627 |
| 2022/0135907 | A1 * | 5/2022 | Lundberg | C11D 3/0073 134/29 |
| 2024/0052269 | A1 * | 2/2024 | Lo | C11D 17/0052 |

FOREIGN PATENT DOCUMENTS

| | | | |
|---|---|---|---|
| EP | 0104434 | A2 | 4/1984 |
| EP | 0945500 | A1 | 3/1998 |
| JP | 9512049 | A | 12/1997 |
| JP | 10505741 | A | 6/1998 |
| JP | 2001510233 | A | 7/2001 |
| JP | 2002508026 | A | 3/2002 |
| JP | 2002520482 | A | 7/2002 |
| JP | 2006520434 | A | 9/2006 |
| JP | 2015511973 | A | 4/2015 |
| WO | 9528464 | A1 | 10/1995 |
| WO | 02061026 | A1 | 8/2002 |
| WO | 2008137853 | A1 | 11/2008 |
| WO | 2009075663 | A1 | 6/2009 |
| WO | 2010057977 | A1 | 5/2010 |
| WO | 2010112549 | A1 | 10/2010 |
| WO | 2013156396 | A1 | 10/2013 |
| WO | 2015086761 | A1 | 6/2015 |
| WO | 2016038449 | A1 | 3/2016 |
| WO | 2017083798 | A1 | 5/2017 |

OTHER PUBLICATIONS

"Effect of Temperature on Reaction Rates", ChemGuide, https://www.chemguide.co.uk/physical/basicrates/temperature.html, 21 pages, 1980.

Extended European Search Report in EP24150311, mailed Apr. 10, 2024, 11 pages.

* cited by examiner

DETERGENT COMPOSITIONS CONTAINING A STABILIZED ENZYME BY PHOSPHONATES

CROSS-REFERENCE TO RELATED APPLICATIONS

This application is a Continuation Application of U.S. Ser. No. 17/302,096, filed Apr. 23, 2021, which is a Divisional Application of U.S. Ser. No. 15/697,991, filed Sep. 7, 2017, now U.S. Pat. No. 11,021,680, issued Jun. 1, 2021, which claims priority to U.S. Provisional Application No. 62/384,433, filed Sep. 7, 2016, titled "Enzyme Stability and Phosphonate Types". Provisional Application No. 62/384,433 is incorporated herein by reference in its entirety.

FIELD OF THE INVENTION

The present disclosure relates generally to the field of cleaning compositions. In particular, solid detergent compositions that comprise an enzyme, a phosphonate, an alkaline source, and optionally other ingredients. The enzyme in these detergent compositions shows a superior stability after dissolving into use solutions of the compositions. Because of the enzyme's stability, the enzyme can function longer and therefore provide more effective removing/preventing re-deposition of soils. Conversely, also because of the superior stability of the enzyme, the amount of enzyme and other ingredients for increasing enzyme's effectiveness in these disclosed compositions can be reduced to achieve a similar cleaning effect.

BACKGROUND OF THE INVENTION

Detergency is defined as the ability to wet, emulsify, suspend, penetrate, and disperse soils. Conventional detergents used in the warewashing and laundering industries include alkaline detergents. Alkaline detergent formulations employing alkali metal carbonates and/or alkali metal hydroxides, intended for both institutional and consumer use, are known to provide effective detergency.

Enzymes have been employed in cleaning compositions since early $20^{th}$ century. However, it was not until the mid-1960's when enzymes were commercially available with both the pH stability and soil reactivity for detergent applications. Enzymes are known as effective chemicals for use with detergents and other cleaning agents to break down soils. Enzymes break down soils, make them more soluble, and enable surfactants to remove them from a surface to provide enhanced cleaning of a substrate.

Specifically, enzymes can provide desirable activity for removal of, for example, protein-based, carbohydrate-based, or triglyceride-based stains from substrates. As a result, enzymes have been used for various cleaning applications in order to digest or degrade soils such as grease, oils (e.g., vegetable oils or animal fat), protein, carbohydrate, or the like. For example, enzymes may be added as a component of a composition for laundry, textiles, ware washing, cleaning-in-place, cleaning drains, floors, carpets, medical or dental instruments, meat cutting tools, hard surfaces, personal care, or the like. Although products containing enzymes have evolved from simple powders containing alkaline protease to more complex granular compositions containing multiple enzymes and still further to liquid compositions, there remains a need for alternative cleaning applications employing stabilized enzymes. Numerous mechanisms for improving stabilization of enzymes for storage in detergent compositions have been used. However, there remains a need for improvement such that use solutions of detergent compositions retain detergency and cleaning performance when exposed to high temperatures and pH for extended periods of time as in actual cleaning applications.

Accordingly, it is an objective to develop a detergent composition with an enzyme and stabilizing agent such that its use solution is able to retain suitable enzyme stability under an elevated temperature and pH condition of use for a much longer period of time.

It is a further objective to develop multi-use solid detergent compositions that have not only storage, shelf, and dimensional stability but also provide a superior enzyme stability within the solid compositions and in their use solutions, under an elevated temperature and pH condition to provide improved detergency. The enzymatic activity in these compositions or use solutions thereof is retained under elevated temperature and pH conditions for a longer period of time.

It is an objective to develop methods for use of the stabilized enzymes in either detergent compositions themselves and in use solutions for improved detergency.

It is a further objective to develop methods to stabilize an enzyme in a solid detergent composition and its use solution.

Beneficially, such objectives overcome significant limitations of the state of the art of enzyme stability in detergent compositions, namely wherein un-stabilized enzyme significantly decreases its activity over time, including within short time periods of as little as 5-20 minutes, in the use solutions of these detergent compositions.

A further object is to develop multi-use compositions and methods for employing the same, to improve protein removal and anti-redeposition properties of detergent compositions, in particular non-caustic detergents compositions.

These and other objects, advantages and features of the present disclosure will become apparent from the following specification taken in conjunction with the claim set forth herein.

BRIEF SUMMARY OF THE INVENTION

An advantage of the present disclosure is that an enzyme in a solid detergent composition can retain its activity for an extended period of time not only during the solid composition's storage but also in a use solution of the composition.

It is surprisingly discovered that adding a specific type of phosphonates or its salts, or another specific type of amine phosphonate salts in a detergent composition containing an enzyme can maintain the enzyme's activity for an extended period of time in a use solution of the composition during the actual use of the composition for cleaning purposes. It is also surprisingly discovered that enzymes in the use solutions of the detergent compositions of the present disclosure have superior stability. This discovery leads to a more effective composition due to a prolonged enzyme activity for removing soils. Beneficially, this improvement further allows the elimination or reduced use of enzymes, stabilizers, or some other ingredients commonly found in detergent compositions.

In one aspect, provided is a composition that comprises an enzyme, a phosphonate represented by a formula of

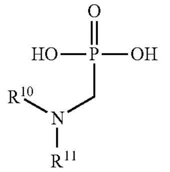

or salt thereof, and an alkaline source; wherein the enzyme is a protease, amylase, lipase, cellulase, peroxidase, gluconase, or mixture thereof; the alkaline source is a metal carbonate, metal bicarbonate, metal silicate, or mixture thereof; and $R^{10}$ and $R^{11}$ are independently hydrogen, a substituted alkyl, 2-$(EO)_n$-biphosphonateamine-ethyl, 2-$(PO)_n$-biphosphonateamine-isopropyl, phosphonate, phosphonate ester, or derivative thereof, with a proviso that $R^{10}$ and $R^{11}$ are both —$CH_2$—$PO(OH)_2$ groups.

In other aspect, provided is a composition that comprises an enzyme, an alkaline source, and an amine phosphonate salt; wherein the amine phosphonate salt is a product of a phosphonate represented by a formula of

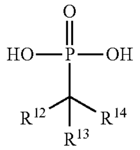

and an amine, the enzyme is a protease, amylase, lipase, cellulase, peroxidase, gluconase, or mixture thereof; the alkaline source comprises a metal carbonate, metal bicarbonate, metal silicate, or mixture thereof; and $R^{12}$, $R^{13}$, and $R^{14}$ are independently hydroxyl, methyl, —$PO(OH)_2$, —$CH_2COOH$, a substituted alkyl, phosphonate, ester thereof, salt thereof, or derivative thereof.

In yet another aspect, provided is a solid detergent composition that comprises an alkaline source, a phosphonate, and an enzyme; wherein the alkaline source comprises a metal carbonate, metal bicarbonate, metal silicate, or mixture thereof; the enzyme is a protease, amylase, lipase, cellulase, peroxidase, gluconase, or mixture thereof; the phosphonate is represented by a formula of

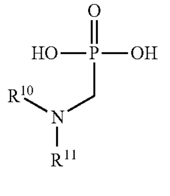

or salt thereof, wherein $R^{10}$ and $R^{11}$ are independently hydrogen, a substituted carboxylic acid, phosphonate, ethanol, diglyco, substituted alkyl, 2-$(EO)_n$-biphosphonateamine-ethyl, 2-$(PO)_n$-biphosphonateamine-isopropyl, or phosphonate-methyl; with a proviso that $R^{10}$ and $R^{11}$ are both —$CH_2$—$PO(OH)_2$ groups, the ingredients of the composition is mixed and used to produce a solid detergent.

In another aspect, provided is a solid detergent composition that comprises an alkaline source, an enzyme, and an amine phosphonate salt; wherein the alkaline source comprises a metal carbonate, metal bicarbonate, metal silicate, or mixture thereof; the enzyme is a protease, amylase, lipase, cellulose, peroxidase, gluconase, or mixture thereof; the amine phosphonate salt is a product of a phosphonate represented by a formula of

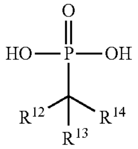

and an amine, wherein $R^{12}$, $R^{13}$, and $R^{14}$ are independently hydroxyl, methyl, —$PO(OH)_2$, —$CH_2COOH$, a substituted alkyl, phosphonate, ester thereof, salt thereof, or derivative thereof; and the ingredients of the composition is mixed and used to produce a solid detergent.

In yet another aspect, provided is a method of cleaning, sanitizing and/or bleaching that comprises generating a use solution of a composition disclosed herein, and contacting a surface or object in need of cleaning and sanitizing with the use solution.

In other aspect, provided is a method of stabilizing an enzyme in a solid detergent composition. The method comprises adding a phosphonate of formula

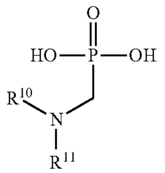

or salt thereof, or an amine phosphonate salt in a detergent composition containing an enzyme, wherein $R^{10}$ and $R^{11}$ are independently hydrogen, a substituted carboxylic acid, phosphonate, ethanol, diglyco, substituted alkyl, 2-$(EO)_n$-biphosphonateamine-ethyl, 2-$(PO)_n$-biphosphonateamine-isopropyl, or phosphonate-methyl with a proviso that $R^{10}$ and $R^{11}$ are both —$CH_2$—$PO(OH)_2$ groups; the amine phosphonate salt is a product of a phosphonate of formula

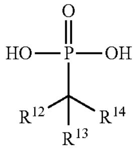

and an amine, and $R^{12}$, $R^{13}$, and $R^{14}$ are independently hydroxyl, methyl, —$PO(OH)_2$, —$CH_2COOH$, a substituted alkyl, phosphonate, ester thereof, salt thereof, or derivative thereof.

While multiple embodiments are disclosed, still other embodiments of the present disclosure will become apparent to those skilled in the art from the following detailed description, which shows and describes illustrative embodiments of the invention. Accordingly, the examples, figures, drawings, and detailed description are to be regarded as illustrative in nature and not restrictive.

BRIEF DESCRIPTION OF THE DRAWINGS

FIG. 1A shows the protease activities at a level of 0.3 wt-% phosphonate. FIG. 1B shows the protease activities at a level of 0.6 wt-% phosphonate. FIG. 1C shows the protease activities at a level of 0.1 wt-% elemental phosphorus.

FIG. 2A shows the protease activities with phosphonebutane tricarboxylic acid (PBTC) alone or together with alkanolamines in the base formula detergent composition. FIG. 2B shows the protease activities with 1-hydroxy ethylidene-1,1-diphosphonic acid (HEDP) alone or together with alkanolamines in the base formula detergent composition. FIG. 2C shows the protease activities with PSO alone or together with alkanolamines in the base formula detergent composition. FIG. 2D shows the protease activities in the all ash detergent compositions, e.g., no bicarbonate in the detergent compositions, with various phosphonates.

FIG. 3A shows the amylase activities at a level of 0.3 wt-% of phosphonate. FIG. 3B shows the amylase activities at a level of 0.6 wt-% of phosphonate. FIG. 3C shows the amylase activities at a level of 0.1 wt-% elemental phosphorus.

FIG. 4A shows the amylase activities with PBTC alone or together with alkanolamines in the base formula detergent compositions. FIG. 4B shows the amylase activities with HEDP alone or together with alkanolamines in the base formula detergent compositions. FIG. 4C shows the amylase activities with PSO alone or together with alkanolamines in the base formula detergent compositions. FIG. 4D shows the amylase activity in the all ash formula detergent compositions with various phosphonates, respectively.

FIG. 5A shows the lipase activities at a level of 0.3 wt-% phosphonate. FIG. 5B shows the lipase activities at a level of 0.6 wt-% phosphonate. FIG. 5C shows the lipase activities at a level of 0.1 wt-% elemental phosphorus.

FIG. 6A shows the lipase activities with PBTC alone or together with alkanolamines in the base formula detergent compositions at 120° F. FIG. 6B shows the lipase activities with HEDP alone or together with alkanolamines in the base formula detergent compositions at 120° F. FIG. 6C shows the lipase activities with PSO alone or together with alkanolamines in the base formula detergent compositions at 120° F. FIG. 6D shows the lipase activities with PBTC at room temperature alone or together with alkanolamines in the base formula detergent compositions. FIG. 6E shows the lipase activities with HEDP at room temperature, or together with alkanolamines in the base formula detergent compositions. FIG. 6F shows the lipase activities with PSO at room temperature, alone or together with alkanolamines in the base formula detergent compositions. FIG. 6G shows the lipase activities in the all ash formula detergent compositions with various phosphonates at 120° F., respectively.

Figure 1A:
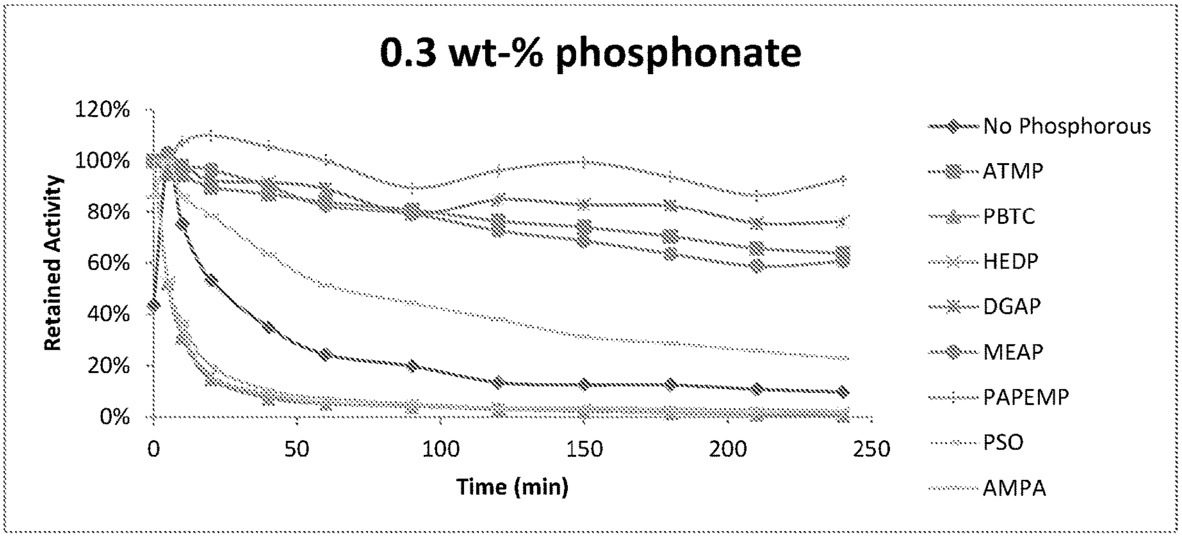
FIG. 1A-FIG. 1C show the protease activities at different time points in the use solutions of the various base formula detergent compositions containing a different phosphonate at different levels at 120° F.

Various embodiments of the present disclosure will be described in detail with reference to the examples, figures, and drawings, wherein like reference numerals represent like parts throughout the several views. Reference to various embodiments does not limit the scope of the disclosure. Figures represented herein are not limitations to the various embodiments according to the disclosure and are presented for exemplary illustration of the disclosure.

DETAILED DESCRIPTION OF THE PREFERRED EMBODIMENT

The present disclosure relates to a detergent composition that contains an enzyme and has a superior enzyme stability in its use solution. The use solution of such a composition retains its enzyme activity for a long period of time. Especially, in a use solution produced from a detergent composition disclosed here, enzymes have such a superior stability that they can be effective to remove soil, protein, and starch for a long period time.

The embodiments of this disclosure are not limited to particular compositions and methods of use, which can vary and are understood by skilled artisans. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form.

Numeric ranges recited within the specification are inclusive of the numbers within the defined range. Throughout this disclosure, various aspects of this disclosure are presented in a range format. It should be understood that the description in range format is merely for convenience and brevity and should not be construed as an inflexible limitation on the scope of the disclosure. Accordingly, the description of a range should be considered to have specifically disclosed all the possible sub-ranges as well as individual numerical values within that range (e.g. 1 to 5 includes 1, 1.5, 2, 2.75, 3, 3.80, 4, and 5).

So that the present disclosure may be more readily understood, certain terms are first defined. Unless defined otherwise, all technical and scientific terms used herein have the same meaning as commonly understood by one of ordinary skill in the art to which embodiments of the disclosure pertain. Many methods and materials similar, modified, or equivalent to those described herein can be used in the practice of the embodiments of the present disclosure without undue experimentation, the preferred materials and methods are described herein. In describing and claiming the embodiments of the present disclosure, the following terminology will be used in accordance with the definitions set out below.

The term "about," as used herein, refers to variation in the numerical quantity that can occur, for example, through typical measuring and liquid handling procedures used for making concentrates or use solutions in the real world;

through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

The term "actives" or "percent actives" or "percent by weight actives" or "actives concentration" are used interchangeably herein and refers to the concentration of those ingredients involved in cleaning expressed as a percentage minus inert ingredients such as water or salts.

As used herein, "substituted" refers to an organic group as defined below (e.g., an alkyl group) in which one or more bonds to a hydrogen atom contained therein are replaced by a bond to non-hydrogen or non-carbon atoms. Substituted groups also include groups in which one or more bonds to carbon(s) or hydrogen(s) atom replaced by one or more bonds, including double or triple bonds, to a heteroatom. Thus, a substituted group is substituted with one or more substituents, unless otherwise specified. A substituted group can be substituted with 1, 2, 3, 4, 5, or 6 substituents.

Substituted ring groups include rings and ring systems in which a bond to a hydrogen atom is replaced with a bond to a carbon atom. Therefore, substituted cycloalkyl, aryl, heterocyclyl, and heteroaryl groups may also be substituted with substituted or unsubstituted alkyl, alkenyl, and alkynyl groups are defined herein.

As used herein, the term "alkyl" or "alkyl groups" refers to saturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkyl-substituted alkyl groups (e.g., alkyl-substituted cycloalkyl groups and cycloalkyl-substituted alkyl groups).

Unless otherwise specified, the term "alkyl" includes both "unsubstituted alkyls" and "substituted alkyls." As used herein, the term "substituted alkyls" refers to alkyl groups having substituents replacing one or more hydrogens on one or more carbons of the hydrocarbon backbone. Such substituents may include, for example, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including heteroaromatic) groups.

In some embodiments, substituted alkyls can include a heterocyclic group. As used herein, the term "heterocyclic group" includes closed ring structures analogous to carbocyclic groups in which one or more of the carbon atoms in the ring is an element other than carbon, for example, nitrogen, sulfur or oxygen. Heterocyclic groups may be saturated or unsaturated. Exemplary heterocyclic groups include, but are not limited to, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran, and furan.

Alkenyl groups or alkenes are straight chain, branched, or cyclic alkyl groups having two to about 30 carbon atoms, and further including at least one double bond. In some embodiments alkenyl groups have from 2 to about carbon, or typically, from 2 to 10 carbone atoms. Alkenyl groups may be substituted or unsubstituted. Alkenyl groups may be substituted similarly to alkyl groups.

As used herein, the terms "alkylene", cycloalkylene", and alkenylene", alone or as part of another substituent, refer to a divalent radical derived from an alkyl, cycloalkyl, or alkenyl group, respectively, as exemplified by $-CH_2CH_2CH_2-$. For alkylene, cycloalkylene, and alkenylene groups, no orientation of the linking group is implied.

The term "ester" as used herein refers to $-R^{30}COOR^{31}$ group. $R^{30}$ is absent, a substituted or unsubstituted alkylene, cycloalkylene, alkenylene, alkynylene, arylene, aralkylene, heterocyclylalkylene, or heterocyclylene group as defined herein. $R^{31}$ is a substituted or unsubstituted alkyl, cycloalkyl, alkenyl, alkynyl, aryl, aralkyl, heterocyclylalkyl, or heterocyclyl group as defined herein.

The term "amine" (or "amino") as used herein refers to $-R^{32}NR^{33}R^{34}$ groups. $R^{32}$ is absent, a substituted or unsubstituted alkylene, cycloalkylene, alkenylene, alkynylene, arylene, aralkylene, heterocyclylalkylene, or heterocyclylene group as defined herein. $R^{33}$ and $R^{34}$ are independently hydrogen, or a substituted or unsubstituted alkyl, cycloalkyl, alkenyl, alkynyl, aryl, aralkyl, heterocyclylalkyl, or heterocyclyl group as defined herein.

The term "amine" as used herein also refers to an independent compound. When an amine is a compound, it can be represented by a formula of $R^{32'}NR^{33'}R^{34'}$ groups, wherein $R^{32'}$, $R^{33'}$, and $R^{34}$ are independently hydrogen, or a substituted or unsubstituted alkyl, cycloalkyl, alkenyl, alkynyl, aryl, aralkyl, heterocyclylalkyl, or heterocyclyl group as defined herein.

The term "alcohol" as used herein refers to $-R^{35}OH$ groups. $R^{35}$ is absent, a substituted or unsubstituted alkylene, cycloalkylene, alkenylene, alkynylene, arylene, aralkylene, heterocyclylalkylene, or heterocyclylene group as defined herein.

The term "carboxylic acid" as used herein refers to $-R^{36}COOH$ groups. $R^{36}$ is absent, a substituted or unsubstituted alkylene, cycloalkylene, alkenylene, alkynylene, arylene, aralkylene, heterocyclylalkylene, or heterocyclylene group as defined herein.

The term "ether" as used herein refers to $-R^{37}OR^{38}$ groups. $R^{37}$ is absent, a substituted or unsubstituted alkylene, cycloalkylene, alkenylene, alkynylene, arylene, aralkylene, heterocyclylalkylene, or heterocyclylene group as defined herein. $R^{38}$ is a substituted or unsubstituted alkyl, cycloalkyl, alkenyl, alkynyl, aryl, aralkyl, heterocyclylalkyl, or heterocyclyl group as defined herein.

An "antiredeposition agent" refers to a compound that helps keep suspended in water instead of redepositing onto the object being cleaned. Antiredeposition agents are useful in the present disclosure to assist in reducing redepositing of the removed soils onto the surface being cleaned.

As used herein, the term "cleaning" refers to perform, facilitate, or aid in soil removal, bleaching, microbial population reduction, and any combination thereof. As used herein, the term "microorganism" refers to any noncellular or unicellular (including colonial) organism. Microorganisms include all prokaryotes. Microorganisms include bacteria (including cyanobacteria), spores, lichens, fungi, protozoa, virinos, viroids, viruses, phages, and some algae. As used herein, the term "microbe" is synonymous with microorganism.

As used herein, the term "disinfectant" refers to an agent that kills all vegetative cells including most recognized pathogenic microorganisms, using the procedure described in *A.O.A.C. Use Dilution Methods*, Official Methods of Analysis of the Association of Official Analytical Chemists, paragraph 955.14 and applicable sections, 15th Edition, 1990 (EPA Guideline 91-2). As used herein, the term "high level disinfection" or "high level disinfectant" refers to a compound or composition that kills substantially all organisms, except high levels of bacterial spores, and is effected with a chemical germicide cleared for marketing as a sterilant by the Food and Drug Administration. As used herein, the term "intermediate-level disinfection" or "intermediate level disinfectant" refers to a compound or composition that kills mycobacteria, most viruses, and bacteria with a chemical germicide registered as a tuberculocide by the Environmental Protection Agency (EPA). As used herein, the term "low-level disinfection" or "low level disinfectant" refers to a compound or composition that kills some viruses and bacteria with a chemical germicide registered as a hospital disinfectant by the EPA.

As used herein, the phrase "food processing surface" refers to a surface of a tool, a machine, equipment, a structure, a building, or the like that is employed as part of a food processing, preparation, or storage activity. Examples of food processing surfaces include surfaces of food processing or preparation equipment (e.g., slicing, canning, or transport equipment, including flumes), of food processing wares (e.g., utensils, dishware, wash ware, and bar glasses), and of floors, walls, or fixtures of structures in which food processing occurs. Food processing surfaces are found and employed in food anti-spoilage air circulation systems, aseptic packaging sanitizing, food refrigeration and cooler cleaners and sanitizers, ware washing sanitizing, blancher cleaning and sanitizing, food packaging materials, cutting board additives, third-sink sanitizing, beverage chillers and warmers, meat chilling or scalding waters, autodish sanitizers, sanitizing gels, cooling towers, food processing antimicrobial garment sprays, and non-to-low-aqueous food preparation lubricants, oils, and rinse additives.

As used herein, the phrase "food product" includes any food substance that might require treatment with an antimicrobial agent or composition and that is edible with or without further preparation. Food products include meat (e.g., red meat and pork), seafood, poultry, produce (e.g., fruits and vegetables), eggs, living eggs, egg products, ready to eat food, wheat, seeds, roots, tubers, leafs, stems, corns, flowers, sprouts, seasonings, or a combination thereof. The term "produce" refers to food products such as fruits and vegetables and plants or plant-derived materials that are typically sold uncooked and, often, unpackaged, and that can sometimes be eaten raw.

The term "hard surface" refers to a solid, substantially non-flexible surface such as a counter top, tile, floor, wall, panel, window, plumbing fixture, kitchen and bathroom furniture, appliance, engine, circuit board, and dish. Hard surfaces may include for example, health care surfaces and food processing surfaces.

As used herein, the phrase "health care surface" refers to a surface of an instrument, a device, a cart, a cage, furniture, a structure, a building, or the like that is employed as part of a health care activity. Examples of health care surfaces include surfaces of medical or dental instruments, of medical or dental devices, of electronic apparatus employed for monitoring patient health, and of floors, walls, or fixtures of structures in which health care occurs. Health care surfaces are found in hospital, surgical, infirmity, birthing, mortuary, and clinical diagnosis rooms. These surfaces can be those typified as "hard surfaces" (such as walls, floors, bed-pans, etc.,), or fabric surfaces, e.g., knit, woven, and non-woven surfaces (such as surgical garments, draperies, bed linens, bandages, etc.,), or patient-care equipment (such as respirators, diagnostic equipment, shunts, body scopes, wheel chairs, beds, etc.,), or surgical and diagnostic equipment. Health care surfaces include articles and surfaces employed in animal health care.

As used herein, the term "instrument" refers to the various medical or dental instruments or devices that can benefit from cleaning with a composition according to the present disclosure.

The term "laundry" refers to items or articles that are cleaned in a laundry washing machine. In general, laundry refers to any item or article made from or including textile materials, woven fabrics, non-woven fabrics, and knitted fabrics. The textile materials can include natural or synthetic fibers such as silk fibers, linen fibers, cotton fibers, polyester fibers, polyamide fibers such as nylon, acrylic fibers, acetate fibers, and blends thereof including cotton and polyester blends. The fibers can be treated or untreated. Exemplary treated fibers include those treated for flame retardancy. It should be understood that the term "linen" is often used to describe certain types of laundry items including bed sheets, pillow cases, towels, table linen, table cloth, bar mops and uniforms. The disclosure additionally provides a composition and method for treating non-laundry articles and surfaces including hard surfaces such as dishes, glasses, and other ware.

As used herein, the phrases "medical instrument," "dental instrument," "medical device," "dental device," "medical equipment," or "dental equipment" refer to instruments, devices, tools, appliances, apparatus, and equipment used in medicine or dentistry. Such instruments, devices, and equipment can be cold sterilized, soaked or washed and then heat sterilized, or otherwise benefit from cleaning in a composition of the present disclosure. These various instruments, devices and equipment include, but are not limited to: diagnostic instruments, trays, pans, holders, racks, forceps, scissors, shears, saws (e.g., bone saws and their blades), hemostats, knives, chisels, rongeurs, files, nippers, drills, drill bits, rasps, burrs, spreaders, breakers, elevators, clamps, needle holders, carriers, clips, hooks, gouges, curettes, retractors, straightener, punches, extractors, scoops, keratomes, spatulas, expressors, trocars, dilators, cages, glassware, tubing, catheters, cannulas, plugs, stents, scopes (e.g., endoscopes, stethoscopes, and arthoscopes) and related equipment, and the like, or combinations thereof.

As used herein, the term "polymer" generally includes, but is not limited to, homopolymers, copolymers, such as for example, block, graft, random and alternating copolymers, terpolymers, and higher "x" mers, further including their derivatives, combinations, and blends thereof. Furthermore, unless otherwise specifically limited, the term "polymer" shall include all possible isomeric configurations of the molecule, including, but are not limited to isotactic, syndiotactic and random symmetries, and combinations thereof. Furthermore, unless otherwise specifically limited, the term "polymer" shall include all possible geometrical configurations of the molecule.

For the purpose of this patent application, successful microbial reduction is achieved when the microbial populations are reduced by at least about 50%, or by significantly more than is achieved by a wash with water. Larger reductions in microbial population provide greater levels of protection.

As used herein, the term "sanitizer" refers to an agent that reduces the number of bacterial contaminants to safe levels as judged by public health requirements. In an embodiment, sanitizers for use in this disclosure will provide at least a 3 log reduction and more preferably a 5-log order reduction. These reductions can be evaluated using a procedure set out in *Germicidal and Detergent Sanitizing Action of Disinfectants*, Official Methods of Analysis of the Association of Official Analytical Chemists, paragraph 960.09 and applicable sections, 15th Edition, 1990 (EPA Guideline 91-2). According to this reference a sanitizer should provide a 99.999% reduction (5-log order reduction) within 30 seconds at room temperature, 25±2° C., against several test organisms. Criteria for sanitizers and disinfectants may be different, depending on applications and regions.

As used herein, the term "soil" or "stain" refers to a non-polar oily substance which may or may not contain particulate matter such as mineral clays, sand, natural mineral matter, carbon black, graphite, kaolin, environmental dust, etc.

As used in this disclosure, the term "sporicide" refers to a physical or chemical agent or process having the ability to cause greater than a 90% reduction (1-log order reduction) in the population of spores of *Bacillus cereus* or *Bacillus subtilis* within 10 seconds at 60° C. In certain embodiments, the sporicidal compositions of the disclosure provide greater than a 99% reduction (2-log order reduction), greater than a 99.99% reduction (4-log order reduction), or greater than a 99.999% reduction (5-log order reduction) in such population within 10 seconds at 60° C.

Differentiation of antimicrobial "-cidal" or "-static" activity, the definitions which describe the degree of efficacy, and the official laboratory protocols for measuring this efficacy are considerations for understanding the relevance of antimicrobial agents and compositions. Antimicrobial compositions can affect two kinds of microbial cell damage. The first is a lethal, irreversible action resulting in complete microbial cell destruction or incapacitation. The second type of cell damage is reversible, such that if the organism is rendered free of the agent, it can again multiply. The former is termed microbiocidal and the later, microbistatic. A sanitizer and a disinfectant are, by definition, agents which provide antimicrobial or microbiocidal activity. In contrast, a preservative is generally described as an inhibitor or microbistatic composition.

As used herein, the term "substantially free of" or "free of" refers to compositions completely lacking the component or having such a small amount of the component that the component does not affect the performance of the composition. The component may be present as an impurity or as a contaminant and shall be less than 0.5 wt-%. In another embodiment, the amount of the component is less than 0.1 wt-% and in yet another embodiment, the amount of component is less than 0.01 wt-%.

The term "substantially similar cleaning performance" refers generally to achievement by a substitute cleaning product or substitute cleaning system of generally the same degree (or at least not a significantly lesser degree) of cleanliness or with generally the same expenditure (or at least not a significantly lesser expenditure) of effort, or both.

As used herein, the term "ware" refers to items such as eating and cooking utensils, dishes, and other hard surfaces such as showers, sinks, toilets, bathtubs, countertops, windows, mirrors, transportation vehicles, and floors. As used herein, the term "warewashing" refers to washing, cleaning, or rinsing ware. Ware also refers to items made of plastic. Types of plastics that can be cleaned with the compositions according to the disclosure include but are not limited to, those that include polypropylene polymers (PP), polycarbonate polymers (PC), melamine formaldehyde resins or melamine resin (melamine), acrilonitrile-butadiene-styrene polymers (ABS), and polysulfone polymers (PS). Other exemplary plastics that can be cleaned using the compounds and compositions of the disclosure include polyethylene terephthalate (PET) polystyrene polyamide.

As used herein, the term "waters" includes food process or transport waters. Food process or transport waters include produce transport waters (e.g., as found in flumes, pipe transports, cutters, slicers, blanchers, retort systems, washers, and the like), belt sprays for food transport lines, boot and hand-wash dip-pans, third-sink rinse waters, and the like. Waters also include domestic and recreational waters such as pools, spas, recreational flumes and water slides, fountains, and the like.

As used herein, the phrase "water soluble" means that the material is soluble in water in the present composition. In general, the material should be soluble at 25° C. at a concentration of about 0.1 wt. % of the water, alternatively at about 1 wt. %, alternatively at about 5 wt. %, and alternatively at about 15 wt. %.

As used here, "an essentially similar composition" is referred to a composition in which everything else is the same except the addition of a different amount of the first solid, or of which the weight percent of alkaline compounds is within 10% of one for the reference composition. The compared blocks have identical shapes and dimensions.

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

The methods and compositions of the present disclosure may comprise, consist essentially of, or consist of the components and ingredients of the present disclosure as well as other ingredients described herein. As used herein, "consisting essentially of" means that the methods and compositions may include additional steps, components or ingredients, but only if the additional steps, components or ingredients do not materially alter the basic and novel characteristics of the claimed methods and compositions.

It should also be noted that, as used in this specification and the appended claims, the term "configured" describes a system, apparatus, or other structure that is constructed or configured to perform a particular task or adopt a particular configuration. The term "configured" can be used interchangeably with other similar phrases such as arranged and configured, constructed and arranged, adapted and configured, adapted, constructed, manufactured and arranged, and the like.

Detergent Compositions and Detergent Products

As used herein, the term "composition" refers to chemical ingredients of a product or article. A product or article can be in a liquid, solid, powder form, or mixture thereof. It is possible that the same or similar composition can lead to different products or articles, due to the different process, arrangement, or amount in which each ingredient of the composition is put together in the product or article.

As used herein, the term "detergent composition" refers to chemical ingredients of a detergent product or detergent. A detergent product or detergent is usually used for cleaning purpose, by the detergent or detergent product itself or by a use solution thereof. A detergent or detergent product can be in a liquid, solid, powder form, or mixture thereof. A detergent product or detergent can be supplied in one package or separate packages. It is possible that the same or similar detergent composition can lead to different detergent products, due to the different process or amount in which each ingredient of the composition is put together in the detergent product. In this disclosure, the terms of "detergent product" and "detergent" are used interchangeably.

Solid Detergents

As used herein, the term "solid" refers to a state of matter known to those of skill in the art. A solid may be of crystalline, amorphous form, or a mixture thereof. In a solid can be a single compound or a mixture of compounds. A solid may be a mixture of two or more different solids. A solid may be aggregates of particles each of which has a size of a few, a few tens, a few hundreds of micrometers or nanometers. A solid may be a powder of one or more compounds.

As used herein, a solid detergent or cleaning composition refers to a detergent or cleaning composition in the form of a solid such as a powder, a flake, a granule, a pellet, a tablet, a lozenge, a puck, a briquette, a brick, a block, or another solid form known to those of skill in the art. Although the term solid block is often referred to herein, it is understood that the solid compositions can take various forms. In a preferred aspect, a pressed solid block is employed. It should be understood that the term "solid detergent" refers to the state of the detergent composition under the expected conditions of storage and use of the solid detergent composition. In general, it is expected that the detergent composition will remain a solid when provided at a temperature of a room temperature up to about 120° F.

A solid detergent composition can be provided as a pressed solid block, a cast solid block, an extruded pellet or block, or a tablet so that one or a plurality of the solids will be available in a package having a size of between about 1 grams and about 11,000 grams.

A solid detergent composition may be provided in the form of a unit dose. A unit dose refers to a solid detergent composition unit sized so that the entire unit is used during a single washing cycle. When the solid detergent composition is provided as a unit dose, it is preferably provided as a pressed solid, a cast solid, an extruded pellet, or a tablet having a size of between about 1 gram and about 50 grams. Alternatively, a pressed solid, a cast solid, an extruded pellet, or a tablet may have a size of between 50 grams up through 250 grams. An extruded, cast, or press solid may also have a weight of about 100 grams or greater.

A solid detergent composition may also be provided in the form of a multiple use (e.g., multi-use) solid, such as, a block or a plurality of pellets, and can be repeatedly used to generate aqueous use solutions of the detergent composition for multiple cycles or a predetermined number of dispensing cycles. A multiple use solid detergent composition can be repeatedly used to generate an aqueous detergent composition, e.g., use solution, for multiple washing cycles. A multiple use solid detergent composition can have a mass of about 1 kilogram to about 10 kilograms or greater.

Typically, the solid detergent composition as disclosed herein dissolves quickly and completely upon contact with an aqueous solution into a stable use solution. In some aspects of the disclosure, the amount and type of anionic surfactants employed in the solid detergent composition provides a desired dissolution rate for a particular dispense rate. A stable use solution does not contain any solids upon visual inspection.

Pressed solid detergent blocks are made suitable to provide stability such that reactive components in the compositions do not react with each other until a point of dilution and/or use. In some aspects, the order of introducing the components to form the solid are non-limiting as there is minimal and/or no water introduced into the solid compositions. However, in some aspects, pressed solid detergent blocks are made by using a binding system to minimize any damage to the coated granules which may be employed.

Beneficially, a pressing process to make the pressed solid detergent blocks generates a pressed solid detergent block and prevents the reaction or mix of the components. In an aspect of the disclosure, the solid detergent composition remains unreacted or unmixed until a point of use, e.g. dilution.

In a pressed solid process, a flowable solid, such as granular solids or other particle solids including binding agents are combined under pressure. In a pressed solid process, flowable solids of the compositions are placed into a form (e.g., a mold or container). The method can include gently pressing the flowable solid in the form to produce the solid cleaning composition.

The method can further include a curing step to produce the solid cleaning composition. As referred to herein, an uncured composition including the flowable solid is compressed to provide sufficient surface contact between particles making up the flowable solid that the uncured composition will solidify into a stable solid cleaning composition. A sufficient quantity of particles (e.g. granules) in contact with one another provides binding of particles to one another effective for making a stable solid composition. Inclusion of a curing step may include allowing the pressed solid to solidify for a period of time, such as a few hours, or about 1 day (or longer). In additional aspects, the methods could include vibrating the flowable solid in the form or mold, such as the methods disclosed in U.S. Pat. No. 8,889,048, which is herein incorporated by reference in its entirety.

The use of pressed solids provides numerous benefits over conventional solid block or tablet compositions requiring high pressure in a tablet press, or casting requiring the melting of a composition consuming significant amounts of energy, and/or by extrusion requiring expensive equipment and advanced technical know-how. Pressed solids overcome such various limitations of other solid blocks, therefore there is a need for making new pressed solid cleaning compositions. Moreover, pressed solid blocks have more consistent and attractive appearance than extruded ones, therefore pressed solid detergent blocks can form solid blocks of distinct shapes for identification and control of use. They can retain its shape under conditions in which the blocks may be stored or handled. In general, it is expected that the detergent composition will remain a solid when provided at a temperature of up to about 120° F.

In some situations, the methods of making pressed blocks reduce or eliminate water from the system prior to solidification. Preferably, the compositions are formed using components in an anhydrous form. In some other situations, compositions have a water content of less than about 20% by weight, less than about 15% by weight, less than about 12% by weight, 10% by weight, less than about 5% by weight, less than about 1% by weight, less than about 0.1% by weight, less than about 0.05% by weight, and most preferably free of water (e.g. dried). In an aspect, the dried composition may be in the form of granules. On contrast, cast or extruded solid detergent blocks can have from about 20 to about 40 wt-% water. Therefore, pressed solid blocks are preferred due to the removal or reduction of water from the compositions and ash hydration is not employed as a solidification mechanism.

The particulate components of the disclosure can be in the form of granules and/or flakes, but is preferably presented in the form of regular small granules. Thereafter, the granules are used to form solid detergent blocks. The solidification process may last from a few seconds to several hours, depending on factors including, but not limited to the size of the formed or cast composition, the ingredients of the composition, and the temperature of the composition.

The solid detergent compositions may be formed using a batch or continuous mixing system. To make extruded blocks, powders and liquids of a detergent composition are blended to form a mixture, then the blended mixture is pressed through a mold to form a product, then the product hardens with time to an extruded solid block. A single- or twin-screw extruder is used to combine and mix one or more cleaning agents at high shear to form a homogeneous mixture to make extruded blocks. To make pressed solid blocks, solid powders and/or other liquid ingredients of a detergent composition are mixed to form a blended power, then the blended power is poured into a mold and pressed into a solid detergent block. Generally, a solid detergent block processed according to the method of the disclosure is substantially homogeneous with regard to the distribution of ingredients throughout its mass and is dimensionally stable.

In some embodiments, the solid detergent composition of the present disclosure is provided as a pressed solid block having a mass of between about 5 grams and 10 kilograms. In certain embodiments, a pressed solid detergent block has a mass between about 1 and about 10 kilograms. In further embodiments, a block of the solid detergent composition has a mass of between about 5 kilograms and about 8 kilograms. In other embodiments, a block of the solid detergent composition has a mass of between about 5 grams and about 1 kilogram, or between about 5 grams and about 500 grams.

In some embodiments, the pressed solid detergent block produced from the disclosed composition has a water content of less than about 20 wt-%, 15 wt-%, 12 wt-%, 10 wt-%, 9 wt-%, 8 wt-%, 7 wt-%, 6 wt-%, 5 wt-%, 4 wt-%, 3 wt-%, 2 wt-%, 1 wt-%, 0.7 wt-%, 0.5 wt-%, 0.3 wt-%, 0.1 wt-%, or 0.05 wt-%. In some other embodiments, the pressed solid detergent block produced from the disclosed composition has a water content of between about 0.1 and about 15 wt-%, between about 0.1 and about 5 wt-%, between about 0.1 and about 3 wt-%, between about 1 and about 8 wt-%, between about 5 and about 10 wt-%, between about 5 and about 15 wt-%, or between about 5 and about 15 wt-%. In an aspect, the dried composition may be in the form of granules. On contrast, cast or extruded solid detergent blocks can have from about 20 to about 40 wt-% water.

Phosphonate

The detergent compositions disclosed here contains a specific type of phosphonates or salts thereof or amine salt of another specific type of phosphonates. Applicant unexpectedly discovered that these specific types of phosphonates or salts thereof disclosed here stabilize enzymes in detergent compositions.

The term "phosphonate" as used herein refers to an independent compound with a formula of $R^{40'}PO(OH)_2$ groups, wherein $R^{40'}$ is a substituted or unsubstituted alkyl, cycloalkyl, alkenyl, alkynyl, aryl, aralkyl, heterocyclylalkyl, or heterocyclyl group as defined herein.

The term "phosphonate" as used herein may also refer to $—R^{40}PO(OH)_2$ groups. $R^{40}$ is a substituted or unsubstituted alkylene, cycloalkylene, alkenylene, alkynylene, arylene, aralkylene, heterocyclylalkylene, or heterocyclylene group as defined herein.

One type phosphonate compound to stabilize enzyme(s) in a detergent composition is a type of phosphonate represented by formula

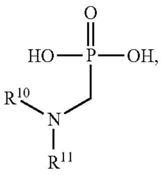

wherein $R^{10}$ and $R^{11}$ are independently hydrogen, a phosphonate, unsubstituted alkyl, or substituted alkyl, with an exception that $R^{10}$ and $R^{11}$ are both $—CH_2—PO(OH)_2$ groups. This type of phosphonate can be added into a detergent composition in its acid form, or in a salt form after being neutralized by a base. Since a use solution of the detergent compositions disclosed here has a pH of from about 8 to about 12, the two —OH group of the phosphonate group are in their salt forms, e.g., neutralized when the phosphonate is in the use solution.

The other type of phosphonate compound to stabilize enzyme(s) in a detergent composition is an amine phosphonate salt that is a product of a phosphonate compound represented by a formula

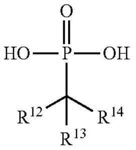

and an amine, and $R^{12}$, $R^{13}$, and $R^{14}$ are independently hydroxyl, methyl, $—PO(OH)_2$, $—CH_2COOH$, a substituted alkyl, phosphonate, ester thereof, salt thereof, or derivative thereof. This amine phosphonate salt is added to a detergent composition in its salt form, produced usually by reacting the phosphonate with an amine to neutralize all or part of its OH groups. The amine can be an alkanolamine, monoethanolamine, diethanolamine, triethanolamine, isopropylamine, or a mixture thereof. In some other embodiments, the amine of the amine phosphonate salt is a $C_{2-6}$ alkylamine or mixture thereof. The alkylamine of course can be a mono-, di-, or tri-amine.

In some embodiments, the disclosed detergent compositions contains a phosphonate of formula

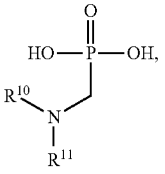

wherein $R^{10}$ and $R^{11}$ are independently hydrogen, a unsubstituted alkyl, substituted alkyl, a substituted carboxylic acid, phosphonate, ethanol, diglyco, 2-$(EO)_n$-biphosphonateamine-ethyl, 2-$(PO)_n$-biphosphonateamine-isopropyl, or phosphonate-methyl. In other embodiments, $R^{10}$ is hydrogen and $R^{11}$ is a unsubstituted alkyl, substituted alkyl, a substituted carboxylic acid, phosphonate, ethanol, diglyco, 2-$(EO)_n$-biphosphonateamine-ethyl, 2-$(PO)_n$-biphosphonateamine-isopropyl, or phosphonate-methyl. In some other embodiments, $R^{10}$ is hydrogen and $R^{11}$ is a substituted carboxylic acid, phosphonate, ethanol, diglyco, 2-$(EO)_n$-biphosphonateamine-ethyl, 2-$(PO)_n$-biphosphonateamine-isopropyl, or phosphonate-methyl.

As used here, EO refers to $-CH_2CH_2O-$, e.g., ethylene oxide group, and PO to $-CH_2CH(CH_3)O-$ group. When $(EO)_n$ or (PO), is used, n is an integer of 1-30.

In some embodiments, $R^{11}$ is $-CH_2-PO(OH)_2$ group. In some other embodiments, $R^{11}$ is $-CH_2-PO(OH)_2$ group and $R^{10}$ is ethanolyl, diglyco, substituted alkyl, isopropyl-2-$(EO)_n$-biphosphonateamine, or methyl-phosphonate. In yet some other embodiments, the phosphonate is

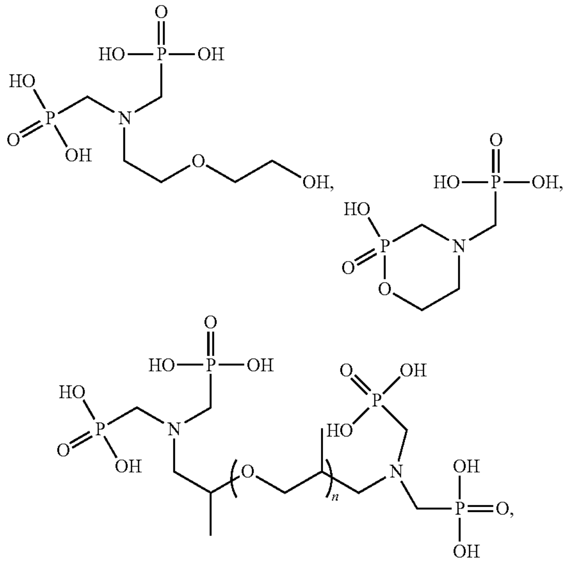

aminomethyl phosphonic acid, a mixture thereof, or a salt thereof.

In some embodiments, the amine phosphonate salt is an amine salt of a phosphonate of a formula

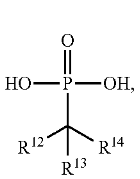

wherein $R^{12}$, $R^{13}$, and $R^{14}$ are independently hydroxyl, methyl, $-PO(OH)_2$, $-CH_2COOH$, a substituted alkyl, phosphonate, ester thereof, salt thereof, or derivative thereof. In some other embodiments, one of $R^{12}$, $R^{13}$, and $R^{14}$ is hydroxyl, methyl, $-PO(OH)_2$, $-CH_2COOH$, ester thereof, salt thereof, or derivative thereof. In some other embodiments, the phosphonate of the amine phosphonate salt is $PO(OH)_2(C(CH_2COOH)_3)$, phosphonebutane tricarboxylic acid (PBTC). In yet some other embodiments, the phosphonate of the amine phosphonate is $C(CH_3)(OH)(PO(OH)_2)_2$, 1-hydroxy ethylidene-1,1-diphosphonic acid (HEDP).

In some embodiments, the amine of the amine phosphonate salt is an alkanolamine, monoethanolamine, diethanolamine, triethanolamine, isopropylamine, or a mixture thereof. In some other embodiments, the amine of the amine phosphonate salt is a $C_{2-6}$ alkylamine or mixture thereof. The alkylamine can be a mono-, di-, or tri-amine.

In some embodiments, the detergent composition disclosed here has from about 0.1 wt-% to about 35 wt-%, 0.1 wt-% to about 30 wt-%, 0.1 wt-% to about 25 wt-%, 0.1 wt-% to about 15 wt-%, 0.1 wt-% to about 10 wt-%, 0.1 wt-% to about 5 wt-%, about 0.5 wt-% to about 5 wt-%, about 0.1 wt-% to about 1 wt-%, about 1 wt-% to about 10 wt-%, 0.1 wt-% to about 1 wt-%, about 1 wt-% to about 5 wt-%, 5 wt-% to about 10 wt-%, 10 wt-% to about 15 wt-%, about 15 wt-% to about 20 wt-%, 20 wt-% to about 25 wt-%, 25 wt-% to about 30 wt-%, 30 wt-% to about 35 wt-%, about 0.1 wt-%, about 0.5 wt-%, about 1 wt-%, about 2 wt-%, about 3 wt-%, about 4 wt-%, about 5 wt-%, about 6 wt-%, about 7 wt-%, about 8 wt-%, about 9 wt-%, about 10 wt-%, about 15 wt-%, about 20 wt-%, about 25 wt-%, about 30 wt-%, about 32 wt-%, or about 35 wt-% of the phosphonate, salt thereof, or amine phosphonate salt.

Enzymes

The disclosure disclosed here related to a detergent composition that comprises an enzyme. In some embodiments, the enzyme is supplied in a liquid or solid form and mixed with the other components of the detergent composition, by spraying or mixing.

Enzymes that can be used according to the disclosure include enzymes that provide desirable activity for removal of protein-based, carbohydrate-based, or triglyceride-based stains from substrates; for cleaning, destaining, and sanitizing presoaks, such as presoaks for medical and dental instruments, devices, and equipment; presoaks for flatware, cooking ware, and table ware; or presoaks for meat cutting equipment; for machine warewashing; for laundry and textile cleaning and destaining; for carpet cleaning and destaining; for cleaning-in-place (CIP) and destaining-in-place; for cleaning and destaining food processing surfaces and equipment; for drain cleaning; presoaks for cleaning; and the like.

Although not limiting to the present disclosure, enzymes suitable for the detergent compositions can act by degrading or altering one or more types of soil residues encountered on an instrument or device thus removing the soil or making the soil more removable by a surfactant or other component of the cleaning composition. Both degradation and alteration of soil residues can improve detergency by reducing the physicochemical forces that bind the soil to the instrument or device being cleaned, e.g., the soil becomes more water soluble. For example, one or more proteases can cleave complex, macro molecular protein structures present in soil residues into simpler short chain molecules which are, of themselves, more readily desorbed from surfaces, solubilized or otherwise more easily removed by detersive solutions containing said proteases.

Suitable enzymes include a protease, an amylase, a lipase, a gluconase, a cellulase, a peroxidase, or a mixture thereof of any suitable origin, such as vegetable, animal, bacterial, fungal or yeast origin. Preferred selections are influenced by factors such as pH-activity and/or stability optima, thermostability, and stability to active detergents, builders and the like. In this respect, bacterial or fungal enzymes are preferred, such as bacterial amylases and proteases, and fungal cellulases. Preferably the enzyme is a protease, a lipase, an amylase, or a combination thereof.

"Detersive enzyme", as used herein, means an enzyme having a cleaning, destaining or otherwise beneficial effect as a component of a solid detergent composition for instruments, devices, or equipment, such as medical or dental 60 instruments, devices, or equipment; or for laundry, textiles, warewashing, cleaning-in-place, drains, carpets, meat cutting tools, hard surfaces, personal care, or the like. Preferred detersive enzymes include a hydrolase such as a protease, an amylase, a lipase, or a combination thereof. Preferred enzymes in solid detergent compositions for cleaning medical or dental devices or instruments include a protease, an amylase, a cellulase, a lipase, or a combination thereof. Preferred enzymes in solid detergent compositions for food processing surfaces and equipment include a protease, a lipase, an amylase, a gluconase, or a combination thereof. Preferred enzymes in solid detergent compositions for laundry or textiles include a protease, a cellulase, a lipase, a peroxidase, or a combination thereof. Preferred enzymes in solid detergent compositions for carpets include a protease, an amylase, or a combination thereof. Preferred enzymes in solid detergent compositions for meat cutting tools include a protease, a lipase, or a combination thereof. Preferred enzymes in solid detergent compositions for hard surfaces include a protease, a lipase, an amylase, or a combination thereof. Preferred enzymes in solid detergent compositions for drains include a protease, a lipase, an amylase, or a combination thereof.

Enzymes are normally incorporated into a solid detergent composition according to the disclosure in an amount sufficient to yield effective cleaning during a washing or presoaking procedure. An amount effective for cleaning refers to an amount that produces a clean, sanitary, and, preferably, corrosion free appearance to the material cleaned, particularly for medical or dental devices or instruments. An amount effective for cleaning also can refer to an amount that produces a cleaning, stain removal, soil removal, whitening deodorizing, or freshness improving effect on substrates such as medical or dental devices or instruments and the like. Such a cleaning effect can be achieved with amounts of enzyme as low as about 0.1 wt-% of the detergent composition.

In detergent compositions of the present disclosure, suitable cleaning can typically be achieved when an enzyme is also preferably present at about 1 to about 35 wt-%; preferably about 2 to about 15 wt-%; preferably about 3 to about 10 wt-%; preferably about 4 to about 8 wt-%; preferably about 4, about 5, about 6, about 7, or about 8 wt-%. The higher enzyme levels are typically desirable in highly concentrated cleaning or presoak formulations. A presoak is preferably formulated for use upon a dilution of about 1:500, or to a formulation concentration of about 2000 to about 4000 ppm, which puts the use concentration of the enzyme at about 20 to about 40 ppm.

Commercial enzymes, such as alkaline proteases, are obtainable in liquid or dried form, are sold as raw aqueous solutions or in assorted purified, processed and compounded forms, and include about 0.1% to about 80% by weight active enzyme generally in combination with stabilizers, buffers, cofactors, impurities and inert vehicles. The actual active enzyme content depends upon the method of manufacture and is not critical; assuming the solid detergent composition has the desired enzymatic activity. The particular enzyme chosen for use in the process and products of this disclosure depends upon the conditions of final utility, including the physical product form, use pH, use temperature, and soil types to be degraded or altered. The enzyme can be chosen to provide optimum activity and stability for any given set of utility conditions.

A valuable reference on enzymes is "Industrial Enzymes", Scott, D., in Kirk-Othmer Encyclopedia of Chemical Technology, 3rd Edition, (editors Grayson, M. and EcKroth, D.) Vol. 9, pp. 173 224, John Wiley & Sons, New York, 1980.

In some other embodiments, the enzyme in the detergent composition is a single enzyme. In some other embodiments, the enzyme in the detergent composition is a mixture of two or more enzymes. In some other embodiments, the enzyme in the composition is a protease, amylase, lipase, hydrolase, cellulase, gluconase, peroxidase, mannanase, or a mixture thereof. In some other embodiments, the enzyme is a protease, amylase, lipase, cellulose, peroxidase, gluconase, or mixture thereof. In some other embodiments, the enzyme in the detergent compositions disclosed here is a protease, amylase, lipase, or mixture thereof. In some other embodiments, the enzyme is a protease, amylase, or mixture thereof. In some other embodiments, the enzyme is a protease, lipase, or mixture thereof. In some other embodiments, the enzyme is an amylase, lipase, or mixture thereof. In some other embodiments, the enzyme is a protease. In some other embodiments, the enzyme is an amylase. In yet some other embodiments, the enzyme is a lipase.

In some embodiments, the detergent composition disclosed here has from about 0.1 wt-% to about 35 wt-%, 0.1 wt-% to about 30 wt-%, 0.1 wt-% to about 25 wt-%, 0.1 wt-% to about 15 wt-%, 0.1 wt-% to about 10 wt-%, 0.1 wt-% to about 5 wt-%, about 0.5 wt-% to about 5 wt-%, about 0.1 wt-% to about 1 wt-%, about 1 wt-% to about 10 wt-%, 0.1 wt-% to about 1 wt-%, about 1 wt-% to about 5 wt-%, 5 wt-% to about 10 wt-%, 10 wt-% to about 15 wt-%, about 15 wt-% to about 20 wt-%, 20 wt-% to about 25 wt-%, 25 wt-% to about 30 wt-%, 30 wt-% to about 35 wt-%, about 0.1 wt-%, about 0.5 wt-%, about 1 wt-%, about 2 wt-%, about 3 wt-%, about 4 wt-%, about 5 wt-%, about 6 wt-%, about 7 wt-%, about 8 wt-%, about 9 wt-%, about 10 wt-%, about 15 wt-%, about 20 wt-%, about 25 wt-%, about 30 wt-%, about 32 wt-%, or about 35 wt-% of the enzyme.

The detergent composition of the current disclosure had further been found, surprisingly, to have a significantly stabilized enzyme, especially, protease, lipase and/or amylase, activity toward digesting proteins and enhancing soil removal in their use solution. Applicant surprisingly discovered that through using a specific type of phosphonates alone or another specific amine phosphonate salts in a detergent composition, the enzymes in a use solution made from a detergent composition of the present disclosure stay active much longer than those from the detergent compositions that do not contain phosphonates disclosed here. As shown in this disclosure, a use solution produced from the solid detergent of the present disclosure, both protease and lipase stay active for a much longer time. More stable the enzymes are, the longer they are effective in removing soil, protein, or starch (and fats if lipases are included). As a result, the detergent composition disclosed here is also more effective.

Because of the superior stability of enzymes in the detergent composition of the present disclosure, it is possible for the composition to use less enzymes and to be free of other stabilizers or other ingredients commonly found in existing detergent compositions. Some stabilizers could be liquid and difficult to be included in a solid detergent composition, or could lead to undesirable reactions with other ingredients. Some stabilizers raise health/safety/labeling concerns in a concentrated composition (e.g. GHS label icon warnings that are not desired). At a minimum stabilizers add complexity to a formula and take up "formulation space" for other functional ingredients. It is an extra advantage of using the disclosed disclosure that no or a reduced amount of other stabilizers is used to produce the detergent disclosed here.

Alkaline Source

The detergent compositions and methods, according to the present disclosure includes an effective amount of alkaline source. The alkaline source in turn comprises one or more alkaline compounds. In general, an effective amount of the alkaline source should be considered as an amount that provides a use solution having a pH of at least about 8. When the use solution has a pH of between about 8 and about 10, it can be considered mildly alkaline, and when the pH is greater than about 12, the use solution can be considered caustic. In general, it is desirable to provide the use solution as a mildly alkaline cleaning composition because it is considered to be safer than the caustic based use compositions.

The alkaline source can include an alkali metal carbonate, an alkali metal hydroxide, alkaline metal silicate, or a mixture thereof. Suitable metal carbonates that can be used include, for example, sodium or potassium carbonate, bicarbonate, sesquicarbonate, or a mixture thereof. Suitable alkali metal hydroxides that can also be used include, for example, sodium, lithium, or potassium hydroxide. Examples of useful alkaline metal silicates include sodium or potassium silicate (with $M_2O:SiO_2$ ratio of 2.4 to 5:1, M representing an alkali metal) or metasilicate. The alkaline source may also include a metal borate such as sodium or potassium borate, and the like.

The alkaline source may also include ethanolamines, urea sulfate, amines, amine salts, and quaternary ammonium. The simplest cationic amines, amine salts and quaternary ammonium compounds can be schematically drawn thus:

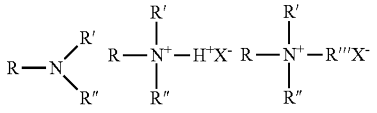

in which, R represents a long alkyl chain, R', R", and R''' may be either long alkyl chains or smaller alkyl or aryl groups or hydrogen and X represents an anion.

The alkaline source can be added to the composition in the form of solid. For example, alkali metal hydroxides are commercially available as a solid in the form of prilled solids or beads having a mix of particle sizes ranging from 25 about 12-100 U.S. mesh. For example, an alkali metal hydroxide may be added to the solid detergent composition in a variety of solid forms, including for example in the form of solid beads. Alkali metal hydroxides are commercially available.

The alkaline source is preferably in an amount to enhance the cleaning of a substrate and improve soil removal performance of the composition. In general, it is expected that the concentrate will include the alkaline source in an amount of at least about 5 wt-%, at least about 10 wt-%, or at least about 15 wt-%. The pressed solid detergent composition can include between about 10 wt-% and about 95 wt-%, preferably between about 15 wt-% and about 70 wt-%, between about 20 wt-% and about 60 wt-%, and even more preferably between about 70 wt-% and about 95 wt-% of the alkaline source.

In some embodiments, the detergent compositions disclosed here contains a metal carbonate, metal bicarbonate, metal silicate, or mixture thereof as their alkaline source. In some other embodiments, the detergent compositions disclosed here contains a metal carbonate, metal bicarbonate, or mixture thereof as their alkaline source. In some embodiments, the alkaline source in the detergent compositions disclosed here is an alkali metal carbonate, alkali metal bicarbonate solid, alkali metal silicate, or mixture thereof. In some other embodiments, the alkaline source in the detergent compositions disclosed here is an alkali metal carbonate, alkali metal bicarbonate, or a mixture thereof. In some other embodiments, the alkaline source in the detergent compositions disclosed here is a mixture of an alkali metal carbonate and alkali metal bicarbonate. In some other embodiments, the alkaline source in the detergent compositions disclosed here is just an alkali metal carbonate (e.g. all ash). In some embodiments, the alkaline source in the detergent compositions disclosed here is sodium carbonate, sodium bicarbonate, sodium metal silicate, or a mixture thereof. In some embodiments, the alkaline source in the detergent compositions disclosed here is sodium carbonate and sodium bicarbonate. In some embodiments, the alkaline source in the detergent compositions disclosed here is just sodium carbonate.

In some embodiments, the detergent produced from the disclosed detergent compositions or method has about 1 wt % to about 90 wt %, 5 wt % to about 85 wt %, 15 wt % to about 80 wt %, 20 wt % to about 75 wt %, 25 wt % to about 70 wt %, 30 wt % to about 65 wt %, 35 wt % to about 60 wt %, 40 wt % to about 55 wt %, or 45 wt % to about 50 wt % of the alkaline source. In some other embodiments, the detergent produced from the disclosed detergent compositions or method has about 80 wt % to about 90 wt %, about 70 wt % to about 80 wt %, about 60 wt % to about 70 wt %, about 50 wt % to about 60 wt %, about 40 wt % to about 50 wt %, about 30 wt % to about 40 wt %, about 20 wt % to about 30 wt %, about 10 wt % to about 10 wt %, about 1 wt % to about 10 wt %, or about 0.1 wt % to about 1 wt % of the alkaline source. In some embodiments, the detergent produced from the disclosed detergent compositions or method has about 90 wt %, about 85 wt %, about 80 wt %, about 75 wt %, about 70 wt %, about 65 wt %, about 60 wt %, about 55 wt %, about 50 wt %, about 45 wt %, about 40 wt %, about 35 wt %, about 30 wt %, about 25 wt %, about 20 wt %, about 15 wt %, about 10 wt %, about 5 wt %, about 1 wt %, or about 0.5 wt % of the alkaline source. In some other embodiments, the detergent produced from the disclosed compositions and methods has about 10 wt % to about 90 wt %, 20 wt % to about 90 wt %, 30 wt % to about 90 wt %, 40 wt % to about 90 wt %, 50 wt % to about 90 wt %, 60 wt % to about 90 wt %, 70 wt % to about 90 wt %, about 85 wt %, 75 wt %, about 65 wt %, about 55 wt %, about 45 wt %, about 35 wt %, about 25 wt %, about 15 wt %, or about 5 wt % of the alkaline source.

In some embodiments, the detergent compositions include a sufficient amount of the alkaline source to provide the use composition with a pH of from about 8 to about 12. In some other embodiment, the detergent compositions include a sufficient amount of the alkaline source to provide the use composition with a pH of from about 8 to about 11, from about 8 to about 9, about 9 to about 12, about 9 to about 11, about 9 to about 10, about 8, about 9, about 10, about 11, about 12, about 8.5, about 9.5, about 10.5, or about 11.5.

In some embodiments, the detergent compositions disclosed here may include additional alkaline compounds, such as alkali metal sesquicarbonate, alkali hydroxide, metasilicate, urea sulfate, amine, amine salt, quaternary ammonia, hydrate thereof, or a mixture of two or more thereof, as additional alkaline source.

In one aspect, provided herein is a composition that comprises an enzyme, a phosphonate represented by a formula of

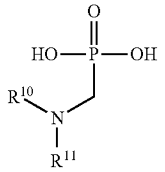

or salt thereof, and an alkaline source; wherein the enzyme is a protease, amylase, lipase, cellulose, peroxidase, gluconase, or mixture thereof; the alkaline source is a metal carbonate, metal bicarbonate, metal silicate, or mixture thereof; $R^{10}$ is hydrogen, a substituted alkyl, 2-$(EO)_n$-biphosphonateamine-ethyl, 2-$(PO)_n$-biphosphonateamine-isopropyl, phosphonate, phosphonate ester, or derivative thereof, and $R^{11}$ is hydrogen, a substituted alkyl, 2-$(EO)_n$-biphosphonateamine-ethyl, 2-$(PO)_n$-biphosphonateamine-isopropyl, phosphonate, phosphonate ester, or derivative thereof; with a proviso that $R^{10}$ and $R^{11}$ are both $—CH_2—PO(OH)_2$ groups.

In some other embodiments, $R^{11}$ is $—CH_2—PO(OH)_2$ group. In yet some other embodiments, $R^{11}$ is $—CH_2—PO(OH)_2$ group and $R^{10}$ is a substituted alkyl. In some embodiments, $R^{11}$ is $—CH_2—PO(OH)_2$ group and $R^{10}$ is an phosphonate, phosphonate ester, or derivative thereof.

In some embodiments, the phosphonate is

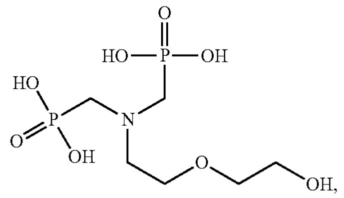

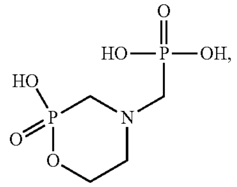

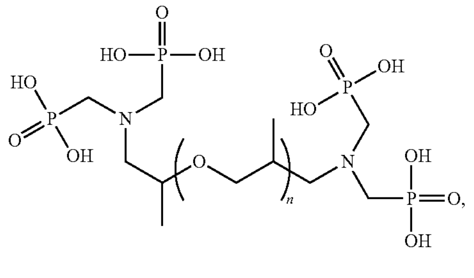

aminomethyl phosphonic acid, or a mixture thereof, wherein n is an integer of 1-30.

In some embodiments, the phosphonate is aminotrimethylene phosphonic acid (ATMP). In some other embodiments, the phosphonate is diglycolamine phosphonate (DGAP).

In some embodiments, the phosphonate is a fully neutralized salt of phosphonebutane tricarboxylic acid (PBTC) by an alkanolamine. In some other embodiments, the phosphonate is a fully neutralized salt of 1-hydroxy ethylidene-1,1-diphosphonic acid (HEDP) by an alkanolamine. The alkanolamine can be monoethanolamine, diethanolamine, triethanolamine, isopropylamine, or a mixture thereof.

In some embodiments, the alkaline source is a metal carbonate and metal bicarbonate. In some other embodiments, the molar ratio of the metal carbonate and the metal bicarbonate is from about 0.25:1 to about 1:0.25, from 0.5:1 to 1:0.5, or from 0.75:1 to 1:0.75. In some other embodiments, the alkaline source is a metal carbonate (e.g. all ash). In some embodiments, the alkaline source is an alkali metal carbonate and alkali metal bicarbonate. In some other embodiments, the molar ratio of the alkali metal carbonate and the alkali metal bicarbonate is from about 0.25:1 to about 1:0.25, from 0.5:1 to 1:0.5, or from 0.75:1 to 1:0.75. In some other embodiments, the alkaline source is an alkali metal carbonate (all ash).

In some embodiments, the enzyme is a protease, amylase, lipase, or mixture thereof. In some embodiments, the enzyme is a protease, amylase, or mixture thereof. In some embodiments, the enzyme is a protease, lipase, or mixture thereof. In some embodiments, the enzyme is a protease. In some other embodiments, the enzyme is an amylase, lipase, or mixture thereof. In some other embodiments, the enzyme is an amylase. In yet some other embodiments, the enzyme is a lipase.

In some embodiments, in a use solution of the composition, the enzyme retains at least 15% of its activity at 120° F. for at least 4 hours. In some other embodiments, in a use solution of the composition, the enzyme retains at least 20% of its activity at 120° F. for at least 4 hours. In some embodiments, in a use solution of the detergent composition, the enzyme retains at least 15%, 20%, 30%, 40%, 50%, 60%, 70%, 80%, or 90% of its activity at 120° F. for at least 240 minutes.

In some embodiments, the composition comprises from about 0.1 wt-% to about 5 wt-%, from 0.5 wt-% to about 3 wt-%, from about 1 wt-% to about 1.5 wt-% of an enzyme, from about 0.01 wt-% to about 2 wt-%, from 0.05 wt-% to about 1.5 wt-%, or from 0.1 wt-% to about 1 wt-% of a phosphonate represented by a formula of

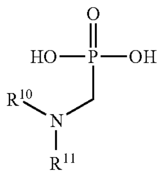

or salt thereof, and from about 50 wt-% to about 95 wt-%, from about 50 wt-% to 90 wt-%, from about 60 wt-% to about 90 wt-%, from about 70 wt-% to about 90 wt-%, or from about 80 wt-% to about 90 wt % of an alkaline source. In some of these embodiments, the phosphonate is aminotrimethylene phosphonic acid (ATMP). In some others of these embodiments, the phosphonate is diglycolamine phosphonate (DGAP). In some of these embodiments, the alkaline source is a mixture of alkali metal carbonate and alkali metal bicarbonate with a ratio of from 0.25:1 to 1:0.5, from 0.5:1 to 1:0.5, or from 0.75:1 to 1:0.75. In some others of these embodiments, the alkaline source is alkali metal carbonate (all ash).

In some embodiments, the composition comprises an enzyme, a phosphonate represented by a formula of

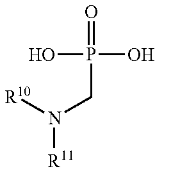

or salt thereof, an alkaline source and an amine. In some embodiments, the amine is about 0.1 wt-% to about 35 wt-%, 0.1 wt-% to about 30 wt-%, 0.1 wt-% to about 25 wt-%, 0.1 wt-% to about 15 wt-%, 0.1 wt-% to about 10 wt-%, 0.1 wt-% to about 5 wt-%, about 0.5 wt-% to about 5 wt-%, about 0.1 wt-% to about 1 wt-%, about 1 wt-% to about 10 wt-%, 0.1 wt-% to about 1 wt-%, about 1 wt-% to about 5 wt-%, 5 wt-% to about 10 wt-%, 10 wt-% to about 15 wt-%, about 15 wt-% to about 20 wt-%, 20 wt-% to about 25 wt-%, 25 wt-% to about 30 wt-%, 30 wt-% to about 35 wt-%, about 0.1 wt-%, about 0.5 wt-%, about 1 wt-%, about 2 wt-%, about 3 wt-%, about 4 wt-%, about 5 wt-%, about 6 wt-%, about 7 wt-%, about 8 wt-%, about 9 wt-%, about 10 wt-%, about 15 wt-%, about 20 wt-%, about 25 wt-%, about 30 wt-%, about 32 wt-%, or about 35 wt-% of the about 0.1-35 wt-% of the composition.

In some other embodiments, the amine is an alkanolamine or a mixture thereof. In some other embodiments, the amine is monoethanolamine, diethanolamine, triethanolamine, isopropylamine, or a mixture thereof. In some other embodiments, the amine of the amine phosphonate salt is a $C_{2-6}$ alkylamine or mixture thereof. The alkylamine of course can be a mono-, di-, or tri-amine. In some embodiments, the composition has a molar ratio of the phosphonate to the amine is from about 0.5:1 to 1:0.5.

In some embodiments, the composition comprises an enzyme, a phosphonate represented by a formula of

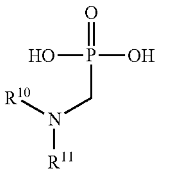

or salt thereof, an alkaline source, and a metal hydroxide, tripoly phosphate, or mixture thereof. In some embodiments, the composition comprises an enzyme, a phosphonate represented by a formula of

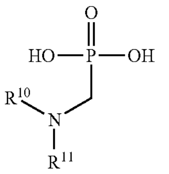

or salt thereof, an alkaline source, an amine, and a metal hydroxide, tripoly phosphate, or mixture thereof.

In some other embodiments, the composition comprises an enzyme, a phosphonate represented by a formula of

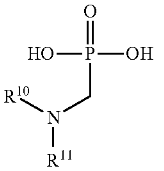

or salt thereof, an alkaline source, a metal hydroxide, tripoly phosphate, or mixture thereof, and one or more additional functional ingredients comprising an oxidizer, builder or water conditioner/water conditioning agent, peroxyacid and its initializer, chelant, threshold agent, crystal modifier; sanitizing agent, defoaming agent, anti-redeposition agent, bleaching agent, solubility modifier, dispersant, rinse aid, polymer, metal protecting agent, stabilizing agent, corrosion inhibitor, sequestrant and/or chelating agent, fragrance and/or dye, rheology modifier or thickener, nonionic surfactant, cationic surfactant, or zwitterionic surfactant, hydrotrope or coupler, or combination thereof.

In some other embodiments, the composition comprises an enzyme, a phosphonate represented by a formula of

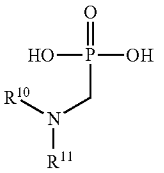

or salt thereof, an alkaline source, an amine, a metal hydroxide, tripoly phosphate, or mixture thereof, and one or more additional functional ingredients comprising an oxidizer, builder or water conditioner/water conditioning agent, peroxyacid and its initializer, chelant, threshold agent, crystal modifier; sanitizing agent, defoaming agent, anti-redeposition agent, bleaching agent, solubility modifier, dispersant, rinse aid, polymer, metal protecting agent, stabilizing agent, corrosion inhibitor, sequestrant and/or chelating agent, fragrance and/or dye, rheology modifier or thickener, nonionic surfactant, cationic surfactant, or zwitterionic surfactant, hydrotrope or coupler, or combination thereof.

In some embodiments, the composition comprises from about 2 wt-% to about 15 wt-% or from about 5 wt-% to 10 wt-% of a water conditioning agent. In some other embodiments, the composition comprises from about 0.1 wt-% to about 5 wt-%, from about 0.5 wt-% to about 4 wt-%, or from about 1 wt-% to about 3 wt-% of a surfactant.

In other aspect, the disclosure is a composition that comprises an enzyme, an alkaline source, and an amine phosphonate salt; wherein the amine salt is a product of a phosphonate represented by a formula of

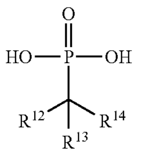

and an amine, the enzyme is a protease, amylase, lipase, cellulose, peroxidase, gluconase, or mixture thereof; the alkaline source comprises a metal carbonate, metal bicarbonate, metal silicate, or mixture thereof; $R^{12}$ is hydroxyl, methyl, —$PO(OH)_2$, —$CH_2COOH$, a substituted alkyl, phosphonate, ester thereof, salt thereof, or derivative thereof; $R^{13}$ is hydroxyl, methyl, —$PO(OH)_2$, —$CH_2COOH$, a substituted alkyl, phosphonate, ester thereof, salt thereof, or derivative thereof; and $R^{14}$ is hydroxyl, methyl, —$PO(OH)_2$, —$CH_2COOH$, a substituted alkyl, phosphonate, ester thereof, salt thereof, or derivative thereof.

In some other embodiments, one of $R^{12}$, $R^{13}$, and $R^{14}$ is hydroxyl, methyl, —$PO(OH)_2$, —$CH_2COOH$, ester thereof, salt thereof, or derivative thereof.

In some embodiments, the phosphonate of the amine phosphonate salt is $PO(OH)_2(C(CH_2COOH)_3)$, PBTC. In other embodiments, the phosphonate of the amine phosphonate salt is $C(CH_3)(OH)(PO(OH)_2)_2$, HEDP.

In some embodiments, the amine of the amine phosphonate salt is an alkanolamine or a mixture thereof. In other embodiments, the amine of the amine phosphonate salt is monoethanolamine, diethanolamine, triethanolamine, isopropylamine, or a mixture thereof. In some other embodiments, the amine of the amine phosphonate salt is a $C_{2-6}$ alkylamine or mixture thereof. The alkylamine of course can be a mono-, di-, or tri-amine. In some embodiments, the composition has a molar ratio of the phosphonate to the amine is from about 0.5:1 to 1:0.5. In some embodiments, the amine phosphonate salt is only partially neutralized. In some other embodiments, the amine phosphonate salt is fully neutralized by the amine.

In some embodiments, the enzyme is protease, amylase, lipase, or mixture thereof. In some other embodiments, the enzyme is protease, amylase, or mixture thereof. In some embodiments, the enzyme is a protease, lipase, or mixture thereof. In some embodiments, the enzyme is a protease. In some other embodiments, the enzyme is an amylase, lipase, or mixture thereof. In some other embodiments, the enzyme is an amylase. In yet some other embodiments, the enzyme is a lipase.

In some embodiments, the alkaline source of the composition is a metal carbonate and metal bicarbonate. In some other embodiments, a molar ratio of the metal carbonate to the metal bicarbonate is from about 0.5:1 to about 1:0.5, from 0.5:1 to 1:0.5, or from 0.75:1 to 1:0.75. In some embodiments, the alkaline source is a metal carbonate. In some embodiments, the alkaline source of the composition is an alkali metal carbonate and alkali metal bicarbonate. In some other embodiments, a molar ratio of the alkali metal carbonate to the alkali metal bicarbonate is from about 0.5:1 to about 1:0.5, from 0.5:1 to 1:0.5, or from 0.75:1 to 1:0.75. In some embodiments, the alkaline source is an alkali metal carbonate. In some embodiments, the alkaline source of the composition is sodium carbonate and sodium bicarbonate. In some other embodiments, a molar ratio of sodium carbonate to sodium bicarbonate is from about 0.5:1 to about 1:0.5, from 0.5:1 to 1:0.5, or from 0.75:1 to 1:0.75. In some embodiments, the alkaline source is sodium carbonate.

In some embodiments, the composition comprises from about 0.1 wt-% to about 5 wt-%, from 0.5 wt-% to about 3 wt-%, from about 1 wt-% to about 1.5 wt-% of an enzyme, from about 0.01 wt-% to about 2 wt-%, from 0.05 wt-% to about 1.5 wt-%, or from 0.1 wt-% to about 1 wt-% of an amine phosphonate salt; wherein the amine salt is a product of a phosphonate represented by a formula of

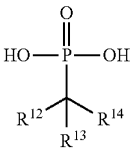

and an amine, and from about 50 wt-% to about 95 wt-%, from about 50 wt-% to 90 wt-%, from about 60 wt-% to about 90 wt-%, from about 70 wt-% to about 90 wt-%, or from about 80 wt-% to about 90 wt % of an alkaline source. In some of these embodiments, the phosphonate is a fully neutralized salt of phosphonebutane tricarboxylic acid (PBTC) by an alkanolamine. In some others of these embodiments, the phosphonate is a fully neutralized salt of 1-hydroxy ethylidene-1,1-diphosphonic acid (HEDP) by an alkanolamine. The alkanolamine can be monoethanolamine, diethanolamine, triethanolamine, isopropylamine, or a mixture thereof. In some of these embodiments, the alkaline source is a mixture of alkali metal carbonate and alkali metal bicarbonate with a ratio of from 0.25:1 to 1:0.5, from 0.5:1 to 1:0.5, or from 0.75:1 to 1:0.75. In some others of these embodiments, the alkaline source is alkali metal carbonate (all ash).

In some embodiments, in a use solution of the composition, the enzyme retains at least 15% of its activity at 120° F. for at least 40 minutes. In some other embodiments, in a use solution of the detergent composition, the enzyme retains at least 20% of its activity at 120° F. for at least 4 hours. In some embodiments, in a use solution of the detergent composition, the enzyme retains at least 15%, 20%, 30%, 40%, 50%, 60%, 70%, 80%, or 90% of its activity at 120° F. for at least 240 minutes.

In some other embodiments, the amine phosphonate salt is about 0.1 wt-% to about 35 wt-%, 0.1 wt-% to about 30 wt-%, 0.1 wt-% to about 25 wt-%, 0.1 wt-% to about 15 wt-%, 0.1 wt-% to about 10 wt-%, 0.1 wt-% to about 5 wt-%, about 0.5 wt-% to about 5 wt-%, about 0.1 wt-% to about 1 wt-%, about 1 wt-% to about 10 wt-%, 0.1 wt-% to about 1 wt-%, about 1 wt-% to about 5 wt-%, 5 wt-% to about 10 wt-%, 10 wt-% to about 15 wt-%, about 15 wt-% to about 20 wt-%, 20 wt-% to about 25 wt-%, 25 wt-% to about 30 wt-%, 30 wt-% to about 35 wt-%, about 0.1 wt-%, about 0.5 wt-%, about 1 wt-%, about 2 wt-%, about 3 wt-%, about 4 wt-%, about 5 wt-%, about 6 wt-%, about 7 wt-%, about 8 wt-%, about 9 wt-%, about 10 wt-%, about 15 wt-%, about 20 wt-%, about 25 wt-%, about 30 wt-%, about 32 wt-%, or about 35 wt-% of the about 0.1-35 wt-% of the composition.

In some embodiments, the composition further comprises a metal hydroxide, tripoly phosphate, or mixture thereof. In some other embodiments, the composition further comprises one or more additional functional ingredients comprising an oxidizer, builder or water conditioner/water conditioning agent, peroxyacid and its initializer, chelant, threshold agent, crystal modifier; sanitizing agent, defoaming agent, anti-redeposition agent, bleaching agent, solubility modifier, dispersant, rinse aid, polymer, metal protecting agent, stabilizing agent, corrosion inhibitor, sequestrant and/or chelating agent, fragrance and/or dye, rheology modifier or thickener, nonionic surfactant, cationic surfactant, or zwitterionic surfactant, hydrotrope or coupler, or combination thereof.

In some embodiments, the composition further comprises a metal hydroxide, tripoly phosphate, or mixture thereof and one or more additional functional ingredients. The additional functional can be an oxidizer, builder or water conditioner/water conditioning agent, peroxyacid and its initializer, chelant, threshold agent, crystal modifier; sanitizing agent, defoaming agent, anti-redeposition agent, bleaching agent, solubility modifier, dispersant, rinse aid, polymer, metal protecting agent, stabilizing agent, corrosion inhibitor, sequestrant and/or chelating agent, fragrance and/or dye, rheology modifier or thickener, nonionic surfactant, cationic surfactant, or zwitterionic surfactant, hydrotrope or coupler, or combination thereof.

In some embodiments, the composition comprises from about 2 wt-% to about 15 wt-% or from about 5 wt-% to 10 wt-% of a water conditioning agent. In some other embodiments, the composition comprises from about 0.1 wt-% to about 5 wt-%, from about 0.5 wt-% to about 4 wt-%, or from about 1 wt-% to about 3 wt-% of a surfactant.

In yet another aspect, the disclosure is a solid detergent composition comprising: an alkaline source, a phosphonate, and an enzyme; wherein the alkaline source comprises a metal carbonate, metal bicarbonate, metal silicate, or mixture thereof; the enzyme is a protease, amylase, lipase, cellulase, peroxidase, gluconase, or mixture thereof; the phosphonate is represented by a formula of

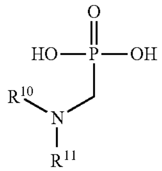

or salt thereof, wherein $R^{10}$ is hydrogen, a substituted alkyl, 2-$(EO)_n$-biphosphonateamine-ethyl, 2-$(PO)_n$-biphosphonateamine-isopropyl, phosphonate, phosphonate ester, or derivative thereof, and $R^{11}$ is hydrogen, a substituted alkyl, 2-$(EO)_n$-biphosphonateamine-ethyl, 2-$(PO)_n$-biphosphonateamine-isopropyl, phosphonate, phosphonate ester, or derivative thereof; with a proviso that $R^{10}$ and $R^{11}$ are both $-CH_2-PO(OH)_2$ groups in the molecule, the composition is mixed and used to produce a solid detergent.

In some embodiments, the solid detergent is produced by a cast, extrude, or press process. In other embodiments, the solid detergent is produced by a press process. In some embodiments, the solid detergent is a block, tablet, or particulate. In some other embodiments, the solid detergent is a multi-use solid detergent.

In some embodiments, the solid detergent has a dimensional stability and has a growth exponent of less than 3% if heated at a temperature of 122° F. In some other embodiments, the solid detergent has a dimensional stability and has a growth exponent of less than 2% if heated at a temperature of 122° F.

In some other embodiments, $R^{11}$ is $-CH_2-PO(OH)_2$ group. In yet some other embodiments, $R^{11}$ is $-CH_2-PO(OH)_2$ group and $R^{10}$ is a substituted alkyl. In some embodiments, $R^{11}$ is $-CH_2-PO(OH)_2$ group and $R^{10}$ is an phosphonate, phosphonate ester, or derivative thereof.

In some embodiments, the phosphonate is

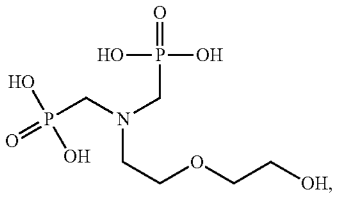

-continued

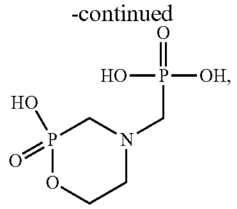

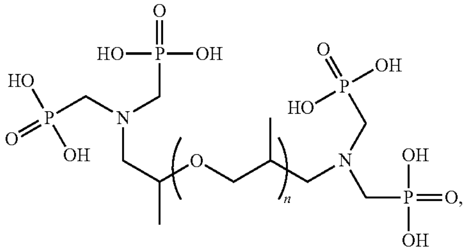

aminomethyl phosphonic acid, or a mixture thereof, wherein n is an integer of 1-30.

In some embodiments, the alkaline source is a metal carbonate and metal bicarbonate. In some other embodiments, the molar ratio of the metal carbonate and the metal bicarbonate is from about 0.25:1 to about 1:0.25. In some embodiments, the alkaline source is a metal carbonate. In some embodiments, the alkaline source of the composition is an alkali metal carbonate and alkali metal bicarbonate. In some other embodiments, a molar ratio of the alkali metal carbonate to the alkali metal bicarbonate is from about 0.5:1 to about 1:0.5. In some embodiments, the alkaline source is an alkali metal carbonate. In some embodiments, the alkaline source of the composition is sodium carbonate and sodium bicarbonate. In some other embodiments, a molar ratio of sodium carbonate to sodium bicarbonate is from about 0.5:1 to about 1:0.5. In some embodiments, the alkaline source is sodium carbonate.

In some embodiments, the enzyme is a protease, amylase, lipase, or mixture thereof. In some embodiments, the enzyme is a protease, amylase, or mixture thereof. In some embodiments, the enzyme is a protease, lipase, or mixture thereof. In some embodiments, the enzyme is a protease. In some other embodiments, the enzyme is an amylase, lipase, or mixture thereof. In some other embodiments, the enzyme is an amylase. In yet some other embodiments, the enzyme is a lipase.

In some embodiments, the composition comprises from about 0.1 wt-% to about 5 wt-%, from 0.5 wt-% to about 3 wt-%, from about 1 wt-% to about 1.5 wt-% of an enzyme, from about 0.01 wt-% to about 2 wt-%, from 0.05 wt-% to about 1.5 wt-%, or from 0.1 wt-% to about 1 wt-% of a phosphonate represented by a formula of

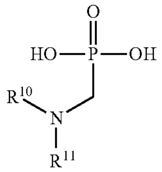

or salt thereof, and from about 50 wt-% to about 95 wt-%, from about 50 wt-% to 90 wt-%, from about 60 wt-% to about 90 wt-%, from about 70 wt-% to about 90 wt-%, or from about 80 wt-% to about 90 wt % of an alkaline source. In some of these embodiments, the phosphonate is aminotrimethylene phosphonic acid (ATMP). In some others of these embodiments, the phosphonate is diglycolamine phosphonate (DGAP). In some of these embodiments, the alkaline source is a mixture of alkali metal carbonate and alkali metal bicarbonate with a ratio of from 0.25:1 to 1:0.5, from 0.5:1 to 1:0.5, or from 0.75:1 to 1:0.75. In some others of these embodiments, the alkaline source is alkali metal carbonate (all ash).

In some embodiments, in a use solution of the solid detergent composition, the enzyme retains at least 15% of its activity at 120° F. for at least 4 hours. In some other embodiments, in a use solution of the solid detergent composition, the enzyme retains at least 50% of its activity at 120° F. for at least 4 hours. In some embodiments, in a use solution of the solid detergent composition, the enzyme retains at least 15%, 20%, 30%, 40%, 50%, 60%, 70%, 80%, or 90% of its activity at 120° F. for at least 240 minutes.

In some embodiments, the solid detergent composition further comprises an amine. In some embodiments, the amine is about 0.1 wt-% to about 35 wt-%, 0.1 wt-% to about 30 wt-%, 0.1 wt-% to about 25 wt-%, 0.1 wt-% to about 15 wt-%, 0.1 wt-% to about 10 wt-%, 0.1 wt-% to about 5 wt-%, about 0.5 wt-% to about 5 wt-%, about 0.1 wt-% to about 1 wt-%, about 1 wt-% to about 10 wt-%, 0.1 wt-% to about 1 wt-%, about 1 wt-% to about 5 wt-%, 5 wt-% to about 10 wt-%, 10 wt-% to about 15 wt-%, about 15 wt-% to about 20 wt-%, 20 wt-% to about 25 wt-%, 25 wt-% to about 30 wt-%, 30 wt-% to about 35 wt-%, about 0.1 wt-%, about 0.5 wt-%, about 1 wt-%, about 2 wt-%, about 3 wt-%, about 4 wt-%, about 5 wt-%, about 6 wt-%, about 7 wt-%, about 8 wt-%, about 9 wt-%, about 10 wt-%, about 15 wt-%, about 20 wt-%, about 25 wt-%, about 30 wt-%, about 32 wt-%, or about 35 wt-% of the about 0.1-35 wt-% of the solid detergent composition.

In some embodiments, the composition has a molar ratio of the phosphonate to the amine is from about 0.5:1 to 1:0.5. In some other embodiments, the amine is monoethanolamine, diethanolamine, triethanolamine, isopropylamine, or a mixture thereof. In some other embodiments, the amine of the amine phosphonate salt is a $C_{2-6}$ alkylamine or mixture thereof. The alkylamine of course can be a mono-, di-, or tri-amine.

In some embodiments, the solid detergent composition further comprises a metal hydroxide, tripoly phosphate, or mixture thereof. In some other embodiments, the composition comprises one or more additional functional ingredients comprising an oxidizer, builder or water conditioner/water conditioning agent, peroxyacid and its initializer, chelant, threshold agent, crystal modifier; sanitizing agent, defoaming agent, anti-redeposition agent, bleaching agent, solubility modifier, dispersant, rinse aid, polymer, metal protecting agent, stabilizing agent, corrosion inhibitor, sequestrant and/or chelating agent, fragrance and/or dye, rheology modifier or thickener, nonionic surfactant, cationic surfactant, or zwitterionic surfactant, hydrotrope or coupler, and combination thereof.

In some embodiments, the composition further comprises a metal hydroxide, tripoly phosphate, or mixture thereof, an amine and one or more additional functional ingredients. In some other embodiments, the composition further comprises a metal hydroxide, tripoly phosphate, or mixture thereof and an amine. In yet some other embodiments, the composition further comprises an amine and one or more additional functional ingredients. The additional ingredient can be an oxidizer, builder or water conditioner/water conditioning agent, peroxyacid and its initializer, chelant, threshold agent, crystal modifier; sanitizing agent, defoaming agent, anti-redeposition agent, bleaching agent, solubility modifier, dispersant, rinse aid, polymer, metal protecting agent, stabilizing agent, corrosion inhibitor, sequestrant and/or chelating agent, fragrance and/or dye, rheology modifier or thickener, nonionic surfactant, cationic surfactant, or zwitterionic surfactant, hydrotrope or coupler, and combination thereof.

In some embodiments, the composition comprises from about 2 wt-% to about 15 wt-% or from about 5 wt-% to 10 wt-% of a water conditioning agent. In some other embodiments, the composition comprises from about 0.1 wt-% to about 5 wt-%, from about 0.5 wt-% to about 4 wt-%, or from about 1 wt-% to about 3 wt-% of a surfactant.

In another aspect, the disclosure is a solid detergent composition that comprises an alkaline source, an enzyme, and an amine phosphonate salt; wherein the alkaline source comprises a metal carbonate, metal bicarbonate, metal silicate, or mixture thereof; the enzyme is a protease, amylase, lipase, cellulase, peroxidase, gluconase, or mixture thereof; the amine phosphonate salt is a product of a phosphonate represented by a formula of

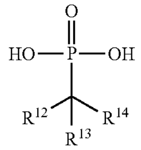

and an amine, wherein $R^{12}$ is hydroxyl, methyl, —$PO(OH)_2$, —$CH_2COOH$, a substituted alkyl, phosphonate, ester thereof, salt thereof, or derivative thereof; $R^{13}$ is hydroxyl, methyl, —$PO(OH)_2$, —$CH_2COOH$, a substituted alkyl, phosphonate, ester thereof, salt thereof, or derivative thereof; and $R^{14}$ is hydroxyl, methyl, —$PO(OH)_2$, —$CH_2COOH$, a substituted alkyl, phosphonate, ester thereof, salt thereof, or derivative thereof; and the composition is mixed and used to produce a solid detergent.

In some embodiments, the solid detergent is produced by a cast, extrude, or press process. In other embodiments, the solid detergent is produced by a press process. In some embodiments, the solid detergent is a block, tablet, or particulate. In some other embodiments, the solid detergent is a multi-use solid detergent.

In some embodiments, the solid detergent has a dimensional stability and has a growth exponent of less than 3% if heated at a temperature of 122° F. In some other embodiments, the solid detergent has a dimensional stability and has a growth exponent of less than 2% if heated at a temperature of 122° F.

In some other embodiments, one of $R^{12}$, $R^{13}$, and $R^{14}$ is hydroxyl, methyl, —$PO(OH)_2$, —$CH_2COOH$, ester thereof, salt thereof, or derivative thereof.

In some embodiments, the phosphonate of the amine phosphonate salt is $PO(OH)_2(C(CH_2COOH)_3)$, PBTC. In other embodiments, the phosphonate of the amine phosphonate salt is $C(CH_3)(OH)(PO(OH)_2)_2$, HEDP. In yet another embodiments, the amine of the amine phosphonate salt is an alkanolamine, monoethanolamine, diethanolamine, triethanolamine, ethanolamine, isopropylamine, or a mixture thereof. In some other embodiments, the amine of the amine phosphonate salt is a $C_{2-6}$ alkylamine or mixture thereof. The alkylamine of course can be a mono-, di-, or tri-amine. In some embodiments, the composition has a molar ratio of the phosphonate to the amine is from about 0.5:1 to 1:0.5.

In some embodiments, the enzyme is protease, amylase, lipase, or mixture thereof. In some other embodiments, the enzyme is protease, amylase, or mixture thereof. In some embodiments, the enzyme is a protease, lipase, or mixture thereof. In some embodiments, the enzyme is a protease. In some other embodiments, the enzyme is an amylase, lipase, or mixture thereof. In some other embodiments, the enzyme is an amylase. In yet some other embodiments, the enzyme is a lipase.

In some embodiments, the alkaline source of the composition is a metal carbonate and metal bicarbonate. In some other embodiments, a molar ratio of the metal carbonate to the metal bicarbonate is from about 0.25:1 to about 1:0.25, from 0.5:1 to 1:0.5, or from 0.75:1 to 1:0.75. In some other embodiments, the alkaline source is a metal carbonate. In some embodiments, the alkaline source of the composition is an alkali metal carbonate and alkali metal bicarbonate. In some other embodiments, a molar ratio of the alkali metal carbonate to the alkali metal bicarbonate is from about 0.5:1 to about 1:0.5. In some embodiments, the alkaline source is an alkali metal carbonate. In some embodiments, the alkaline source of the composition is sodium carbonate and sodium bicarbonate. In some other embodiments, a molar ratio of sodium carbonate to sodium bicarbonate is from about 0.5:1 to about 1:0.5. In some embodiments, the alkaline source is sodium carbonate.

In some embodiments, the composition comprises from about 0.1 wt-% to about 5 wt-%, from 0.5 wt-% to about 3 wt-%, from about 1 wt-% to about 1.5 wt-% of an enzyme, from about 0.01 wt-% to about 2 wt-%, from 0.05 wt-% to about 1.5 wt-%, or from 0.1 wt-% to about 1 wt-% of an amine phosphonate salt; wherein the amine salt is a product of a phosphonate represented by a formula of

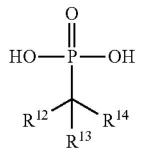

and an amine, and from about 50 wt-% to about 95 wt-%, from about 50 wt-% to 90 wt-%, from about 60 wt-% to about 90 wt-%, from about 70 wt-% to about 90 wt-%, or from about 80 wt-% to about 90 wt % of an alkaline source. In some of these embodiments, the phosphonate is a fully neutralized salt of phosphonebutane tricarboxylic acid (PBTC) by an alkanolamine. In some others of these embodiments, the phosphonate is a fully neutralized salt of 1-hydroxy ethylidene-1,1-diphosphonic acid (HEDP) by an alkanolamine. The alkanolamine can be monoethanolamine, diethanolamine, triethanolamine, isopropylamine, or a mixture thereof.

In some of these embodiments, the alkaline source is a mixture of alkali metal carbonate and alkali metal bicarbonate with a ratio of from 0.25:1 to 1:0.5, from 0.5:1 to 1:0.5, or from 0.75:1 to 1:0.75. In some others of these embodiments, the alkaline source is alkali metal carbonate (all ash). In some embodiments, the amine phosphonate salt is only partially neutralized. In some other embodiments, the amine phosphonate salt is fully neutralized by the amine.

In some embodiments, in a use solution of the solid detergent composition, the enzyme retains at least 15% of its activity at 120° F. for at least 4 hours. In some other embodiments, in a use solution of the solid detergent composition, the enzyme retains at least 50% of its activity at 120° F. for at least 4 hours. In some embodiments, in a use solution of the solid detergent composition, the enzyme retains at least 15%, 20%, 30%, 40%, 50%, 60%, 70%, 80%, or 90% of its activity at 120° F. for at least 240 minutes.

In some other embodiments, the amine phosphonate salt is about 0.1 wt-% to about 35 wt-%, 0.1 wt-% to about 30 wt-%, 0.1 wt-% to about 25 wt-%, 0.1 wt-% to about 15 wt-%, 0.1 wt-% to about 10 wt-%, 0.1 wt-% to about 5 wt-%, about 0.5 wt-% to about 5 wt-%, about 0.1 wt-% to about 1 wt-%, about 1 wt-% to about 10 wt-%, 0.1 wt-% to about 1 wt-%, about 1 wt-% to about 5 wt-%, 5 wt-% to about 10 wt-%, 10 wt-% to about 15 wt-%, about 15 wt-% to about 20 wt-%, 20 wt-% to about 25 wt-%, 25 wt-% to about 30 wt-%, 30 wt-% to about 35 wt-%, about 0.1 wt-%, about 0.5 wt-%, about 1 wt-%, about 2 wt-%, about 3 wt-%, about 4 wt-%, about 5 wt-%, about 6 wt-%, about 7 wt-%, about 8 wt-%, about 9 wt-%, about 10 wt-%, about 15 wt-%, about 20 wt-%, about 25 wt-%, about 30 wt-%, about 32 wt-%, or about 35 wt-% of the about 0.1-35 wt-% of the composition.

In some embodiments, the composition further comprises a metal hydroxide, tripoly phosphate, or mixture thereof. In some other embodiments, the composition further comprises one or more additional functional ingredients comprising an oxidizer, builder or water conditioner/water conditioning agent, peroxyacid and its initializer, chelant, threshold agent, crystal modifier; sanitizing agent, defoaming agent, anti-redeposition agent, bleaching agent, solubility modifier, dispersant, rinse aid, polymer, metal protecting agent, stabilizing agent, corrosion inhibitor, sequestrant and/or chelating agent, fragrance and/or dye, rheology modifier or thickener, nonionic surfactant, cationic surfactant, or zwitterionic surfactant, hydrotrope or coupler, and combination thereof.

In some embodiments, the composition further comprises a metal hydroxide, tripoly phosphate, or mixture thereof and one or more additional functional ingredients. The additional ingredient can be an oxidizer, builder or water conditioner/water conditioning agent, peroxyacid and its initializer, chelant, threshold agent, crystal modifier; sanitizing agent, defoaming agent, anti-redeposition agent, bleaching agent, solubility modifier, dispersant, rinse aid, polymer, metal protecting agent, stabilizing agent, corrosion inhibitor, sequestrant and/or chelating agent, fragrance and/or dye, rheology modifier or thickener, nonionic surfactant, cationic surfactant, or zwitterionic surfactant, hydrotrope or coupler, and combination thereof.

In some embodiments, the composition comprises from about 2 wt-% to about 15 wt-% or from about 5 wt-% to 10 wt-% of a water conditioning agent. In some other embodiments, the composition comprises from about 0.1 wt-% to about 5 wt-%, from about 0.5 wt-% to about 4 wt-%, or from about 1 wt-% to about 3 wt-% of a surfactant.

Additional Functional Ingredients

In some embodiments, the disclosed compositions contain additional ingredients. These ingredients can be in solid or liquid form and therefore be mixed with other components of the disclosed compositions.

The functional ingredients provide desired properties and functionalities to the detergent composition. For the purpose of this application, the term "functional ingredients" includes an ingredient that when dispersed or dissolved in a use and/or concentrate, such as an aqueous solution, provides a beneficial property in a particular use. Some particular examples of functional ingredients are discussed in more detail below, although the particular materials discussed are given by way of example only, and that a broad variety of other functional ingredients may be used. For example, many of the functional ingredients discussed below relate to materials used in cleaning applications.

However, other embodiments may include functional ingredients for use in other applications.

Exemplary additional functional ingredients include for example: builders or water conditioners/water conditioning agents, including detergent builders; chelants; threshold agents; crystal modifiers; hardening agents; bleaching agents; fillers; defoaming agents; anti-redeposition agents; stabilizing agents; dispersants; glass and metal corrosion inhibitors; fragrances and dyes; thickeners; etc. Further description of suitable additional functional ingredients is set forth in U.S. patent application Ser. No. 12/977,340, which is incorporated herein by reference in its entirety.

In some embodiments, the blocks produced from the disclosed method, process, or composition further comprises additional functional ingredient comprising an oxidizer, peroxyacid and its initializer, sanitizing agent, defoaming agent, anti-redeposition agent, bleaching agent, solubility modifier, dispersant, threshold agent, crystal modifier, phosphonate, binding agent, rinse aid, polymer, metal protecting agent, stabilizing agent, corrosion inhibitor, sequestrant and/or chelating agent, fragrance and/or dye, rheology modifier or thickener, anionic surfactant, nonionic surfactant, cationic surfactant, amphoteric surfactant, zwitterionic surfactant, hydrotrope or coupler, and combination thereof.

Anionic Surfactants

The method of adjusting dispense rate of a solid detergent block of a detergent composition, the process to produce a solid detergent block with a predetermined dispense rate, or the press solid composition according to this disclosure includes a first solid comprising an effective amount of one or more anionic surfactants.

Anionic surfactants are surface active substances in which the charge on the hydrophobe is negative; or surfactants in which the hydrophobic section of the molecule carries no charge unless the pH is elevated to neutrality or above (e.g., carboxylic acids). Carboxylate, sulfonate, sulfate and phosphate are the polar (hydrophilic) solubilizing groups found in anionic surfactants. Of the cations (counter ions) associated with these polar groups, sodium, lithium and potassium impart water solubility; ammonium and substituted ammonium ions provide both water and oil solubility; and, calcium, barium, and magnesium promote oil solubility. As those skilled in the art understand, anionics are excellent detersive surfactants and are therefore favored additions to heavy duty detergent compositions.

Anionic sulfate surfactants suitable for use in the present compositions include alkyl ether sulfates, alkyl sulfates, the linear and branched primary and secondary alkyl sulfates, alkyl ethoxysulfates, fatty oleyl glycerol sulfates, alkyl phenol ethylene oxide ether sulfates, the $C_5$-$C_{17}$ acyl-N—($C_1$-$C_4$ alkyl) and —N—($C_1$-$C_2$ hydroxyalkyl) glucamine sulfates, and sulfates of alkylpolysaccharides such as the sulfates of alkylpolyglucoside, and the like. Also included are the alkyl sulfates, alkyl poly(ethyleneoxy) ether sulfates and aromatic poly(ethyleneoxy) sulfates such as the sulfates or condensation products of ethylene oxide and nonyl phenol (usually having 1 to 6 oxyethylene groups per molecule).

Anionic sulfonate surfactants suitable for use in the present compositions also include alkyl sulfonates, the linear and branched primary and secondary alkyl sulfonates, and the aromatic sulfonates with or without substituents.

Anionic carboxylate surfactants suitable for use in the present compositions include carboxylic acids (and salts), such as alkanoic acids (and alkanoates), ester carboxylic acids (e.g., alkyl succinates), ether carboxylic acids, sulfonated fatty acids, such as sulfonated oleic acid, and the like. Such carboxylates include alkyl ethoxy carboxylates, alkyl aryl ethoxy carboxylates, alkyl polyethoxy polycarboxylate surfactants and soaps (e.g., alkyl carboxyls). Secondary carboxylates useful in the present compositions include those which contain a carboxyl unit connected to a secondary carbon. The secondary carbon can be in a ring structure, e.g., as in p-octyl benzoic acid, or as in alkyl-substituted cyclohexyl carboxylates. The secondary carboxylate surfactants typically contain no ether linkages, no ester linkages and no hydroxyl groups. Further, they typically lack nitrogen atoms in the head-group (amphiphilic portion). Suitable secondary soap surfactants typically contain 11-13 total carbon atoms, although more carbons atoms (e.g., up to 16) can be present. Suitable carboxylates also include acylamino acids (and salts), such as acylgluamates, acyl peptides, sarcosinates (e.g., N-acyl sarcosinates), taurates (e.g., N-acyl taurates and fatty acid amides of methyl tauride), and the like.

Suitable anionic surfactants include alkyl or alkylaryl ethoxy carboxylates of the following formula:

$$R—O—(CH_2CH_2O)_n(CH_2)_m—CO_2X \quad (3)$$

in which R is a $C_8$ to $C_{22}$ alkyl group or

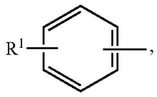

in which $R^1$ is a $C_4$-$C_{16}$ alkyl group; n is an integer of 1-20; m is an integer of 1-3; and X is a counter ion, such as hydrogen, sodium, potassium, lithium, ammonium, or an amine salt such as monoethanolamine, diethanolamine or triethanolamine. In some embodiments, n is an integer of 4 to 10 and m is 1. In some embodiments, R is a $C_8$-$C_{16}$ alkyl group. In some embodiments, R is a $C_{12}$-$C_{14}$ alkyl group, n is 4, and m is 1.

In other embodiments, R is

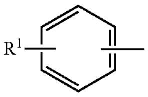

and $R^1$ is a $C_6$-$C_{12}$ alkyl group. In still yet other embodiments, $R^1$ is a $C_9$ alkyl group, n is 10 and m is 1.

Such alkyl and alkylaryl ethoxy carboxylates are commercially available. These ethoxy carboxylates are typically available as the acid forms, which can be readily converted to the anionic or salt form. Commercially available carboxylates include, Neodox 23-4, a $C_{12-13}$ alkyl polyethoxy (4) carboxylic acid (Shell Chemical), and Emcol CNP-110, a $C_9$ alkylaryl polyethoxy (10) carboxylic acid (Witco Chemical). Carboxylates are also available from Clariant, e.g., the product Sandopan® DTC, a $C_{13}$ alkyl polyethoxy (7) carboxylic acid.

Nonionic Surfactants

Useful nonionic surfactants are generally characterized by the presence of an organic hydrophobic group and an organic hydrophilic group and are typically produced by the condensation of an organic aliphatic, alkyl aromatic or polyoxyalkylene hydrophobic compound with a hydrophilic alkaline oxide moiety which in common practice is ethylene oxide or a polyhydration product thereof, polyethylene glycol. Practically any hydrophobic compound having a hydroxyl, carboxyl, amino, or amido group with a reactive hydrogen atom can be condensed with ethylene oxide, or its polyhydration adducts, or its mixtures with alkoxylenes such as propylene oxide to form a nonionic surface-active agent. The length of the hydrophilic polyoxyalkylene moiety which is condensed with any particular hydrophobic compound can be readily adjusted to yield a water dispersible or water soluble compound having the desired degree of balance between hydrophilic and hydrophobic properties. Useful nonionic surfactants include:

Block polyoxypropylene-polyoxyethylene polymeric compounds based upon propylene glycol, ethylene glycol, glycerol, trimethylolpropane, and ethylenediamine as the initiator reactive hydrogen compound. Examples of polymeric compounds made from a sequential propoxylation and ethoxylation of initiator are commercially available from BASF Corp. One class of compounds are difunctional (two reactive hydrogens) compounds formed by condensing ethylene oxide with a hydrophobic base formed by the addition of propylene oxide to the two hydroxyl groups of propylene glycol. This hydrophobic portion of the molecule weighs from about 1,000 to about 4,000. Ethylene oxide is then added to sandwich this hydrophobe between hydrophilic groups, controlled by length to constitute from about 10% by weight to about 80% by weight of the final molecule. Another class of compounds are tetra-flinctional block copolymers derived from the sequential addition of propylene oxide and ethylene oxide to ethylenediamine. The molecular weight of the propylene oxide hydrotype ranges from about 500 to about 7,000; and, the hydrophile, ethylene oxide, is added to constitute from about 10% by weight to about 80% by weight of the molecule.

Condensation products of one mole of alkyl phenol wherein the alkyl chain, of straight chain or branched chain configuration, or of single or dual alkyl constituent, contains from about 8 to about 18 carbon atoms with from about 3 to about 50 moles of ethylene oxide. The alkyl group can, for example, be represented by diisobutylene, di-amyl, polymerized propylene, iso-octyl, nonyl, and di-nonyl. These surfactants can be polyethylene, polypropylene, and polybutylene oxide condensates of alkyl phenols. Examples of commercial compounds of this chemistry are available on the market under the trade names Igepal® manufactured by Rhone-Poulenc and Triton® manufactured by Union Carbide.

Condensation products of one mole of a saturated or unsaturated, straight or branched chain alcohol having from about 6 to about 24 carbon atoms with from about 3 to about 50 moles of ethylene oxide. The alcohol moiety can consist of mixtures of alcohols in the above delineated carbon range or it can consist of an alcohol having a specific number of carbon atoms within this range. Examples of like commercial surfactant are available under the trade names Lutensol™, Dehydol™ manufactured by BASF, Neodol™ manufactured by Shell Chemical Co. and Alfonic™ manufactured by Vista Chemical Co.

Condensation products of one mole of saturated or unsaturated, straight or branched chain carboxylic acid having from about 8 to about 18 carbon atoms with from about 6 to about 50 moles of ethylene oxide. The acid moiety can consist of mixtures of acids in the above defined carbon atoms range or it can consist of an acid having a specific number of carbon atoms within the range. Examples of commercial compounds of this chemistry are available on the market under the trade names Disponil or Agnique manufactured by BASF and Lipopeg™ manufactured by Lipo Chemicals, Inc.

In addition to ethoxylated carboxylic acids, commonly called polyethylene glycol esters, other alkanoic acid esters formed by reaction with glycerides, glycerin, and polyhydric (saccharide or sorbitan/sorbitol) alcohols have application in this disclosure for specialized embodiments, particularly indirect food additive applications. All of these ester moieties have one or more reactive hydrogen sites on their molecule which can undergo further acylation or ethylene oxide (alkoxide) addition to control the hydrophilicity of these substances. Care must be exercised when adding these fatty ester or acylated carbohydrates to compositions of the present disclosure containing amylase and/or lipase enzymes because of potential incompatibility.

Examples of nonionic low foaming surfactants include:

Compounds from (1) which are modified, essentially reversed, by adding ethylene oxide to ethylene glycol to provide a hydrophile of designated molecular weight; and, then adding propylene oxide to obtain hydrophobic blocks on the outside (ends) of the molecule. The hydrophobic portion of the molecule weighs from about 1,000 to about 3,100 with the central hydrophile including 10% by weight to about 80% by weight of the final molecule. These reverse Pluronics™ are manufactured by BASF Corporation under the trade name Pluronic™ R surfactants. Likewise, the Tetronic™ R surfactants are produced by BASF Corporation by the sequential addition of ethylene oxide and propylene oxide to ethylenediamine. The hydrophobic portion of the molecule weighs from about 2,100 to about 6,700 with the central hydrophile including 10% by weight to 80% by weight of the final molecule.

Compounds from groups (1), (2), (3) and (4) which are modified by "capping" or "end blocking" the terminal hydroxy group or groups (of multi-functional moieties) to reduce foaming by reaction with a small hydrophobic molecule such as propylene oxide, butylene oxide, benzyl chloride; and, short chain fatty acids, alcohols or alkyl halides containing from 1 to about 5 carbon atoms; and mixtures thereof. Also included are reactants such as thionyl chloride which convert terminal hydroxy groups to a chloride group. Such modifications to the terminal hydroxy group may lead to all-block, block-heretic, heretic-block or all-heretic nonionics.

Additional examples of effective low foaming nonionics include:

The alkylphenoxypolyethoxyalkanols of U.S. Pat. No. 2,903,486 issued Sep. 8, 1959 to Brown et al. and represented by the formula

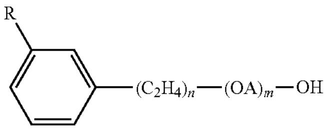

in which R is an alkyl group of 8 to 9 carbon atoms, A is an alkylene chain of 3 to 4 carbon atoms, n is an integer of 7 to 16, and m is an integer of 1 to 10.

The polyalkylene glycol condensates of U.S. Pat. No. 3,048,548 issued Aug. 7, 1962 to Martin et al. having alternating hydrophilic oxyethylene chains and hydrophobic oxypropylene chains where the weight of the terminal hydrophobic chains, the weight of the middle hydrophobic unit and the weight of the linking hydrophilic units each represent about one-third of the condensate.

The defoaming nonionic surfactants disclosed in U.S. Pat. No. 3,382,178 issued May 7, 1968 to Lissant et al. having the general formula $Z[(OR)_nOH]z$ wherein Z is alkoxylatable material, R is a radical derived from an alkylene oxide which can be ethylene and propylene and n is an integer from, for example, 10 to 2,000 or more and z is an integer determined by the number of reactive oxyalkylatable groups.

The conjugated polyoxyalkylene compounds described in U.S. Pat. No. 2,677,700, issued May 4, 1954 to Jackson et al. corresponding to the formula $Y(C_3H_6O)_n(C_2H_4O)_mH$ wherein Y is the residue of organic compound having from about 1 to 6 carbon atoms and one reactive hydrogen atom, n has an average value of at least about 6.4, as determined by hydroxyl number and m has a value such that the oxyethylene portion constitutes about 10% to about 90% by weight of the molecule.

The conjugated polyoxyalkylene compounds described in U.S. Pat. No. 2,674,619, issued Apr. 6, 1954 to Lundsted et al. having the formula $Y[(C_3H_6O_n(C_2H_4O)_mH]_x$ wherein Y is the residue of an organic compound having from about 2 to 6 carbon atoms and containing x reactive hydrogen atoms in which x has a value of at least about 2, n has a value such that the molecular weight of the polyoxypropylene hydrophobic base is at least about 900 and m has value such that the oxyethylene content of the molecule is from about 10% to about 90% by weight. Compounds falling within the scope of the definition for Y include, for example, propylene glycol, glycerine, pentaerythritol, trimethylolpropane, ethylenediamine and the like. The oxypropylene chains optionally, but advantageously, contain small amounts of ethylene oxide and the oxyethylene chains also optionally, but advantageously, contain small amounts of propylene oxide.

Additional conjugated polyoxyalkylene surface-active agents which are advantageously used in the compositions of this disclosure correspond to the formula: $P[(C_3H_6O)_n(C_2H_4O)_mH]_x$ wherein P is the residue of an organic compound having from about 8 to 18 carbon atoms and containing x reactive hydrogen atoms in which x has a value of 1 or 2, n has a value such that the molecular weight of the polyoxyethylene portion is at least about 44 and m has a value such that the oxypropylene content of the molecule is from about 10% to about 90% by weight. In either case the oxypropylene chains may contain optionally, but advantageously, small amounts of ethylene oxide and the oxyethylene chains may contain also optionally, but advantageously, small amounts of propylene oxide.

Polyhydroxy fatty acid amide surfactants suitable for use in the present compositions include those having the structural formula $R_2CON_{R1}Z$ in which: R1 is H, $C_1$-$C_4$ hydrocarbyl, 2-hydroxy ethyl, 2-hydroxy propyl, ethoxy, propoxy group, or a mixture thereof; $R_2$ is a $C_5$-$C_{31}$ hydrocarbyl, which can be straight-chain; and Z is a polyhydroxyhydrocarbyl having a linear hydrocarbyl chain with at least 3 hydroxyls directly connected to the chain, or an alkoxylated derivative (preferably ethoxylated or propoxylated) thereof. Z can be derived from a reducing sugar in a reductive amination reaction; such as a glycityl moiety.

The alkyl ethoxylate condensation products of aliphatic alcohols with from about 0 to about 25 moles of ethylene oxide are suitable for use in the present compositions. The alkyl chain of the aliphatic alcohol can either be straight or branched, primary or secondary, and generally contains from 6 to 22 carbon atoms.

The ethoxylated $C_6$-$C_{18}$ fatty alcohols and $C_6$-$C_{18}$ mixed ethoxylated and propoxylated fatty alcohols are suitable surfactants for use in the present compositions, particularly those that are water soluble. Suitable ethoxylated fatty alcohols include the $C_6$-$C_{18}$ ethoxylated fatty alcohols with a degree of ethoxylation of from 3 to 50.

Suitable nonionic alkylpolysaccharide surfactants, particularly for use in the present compositions include those disclosed in U.S. Pat. No. 4,565,647, Llenado, issued Jan. 21, 1986. These surfactants include a hydrophobic group containing from about 6 to about 30 carbon atoms and a polysaccharide, e.g., a polyglycoside, hydrophilic group containing from about 1.3 to about 10 saccharide units. Any reducing saccharide containing 5 or 6 carbon atoms can be used, e.g., glucose, galactose and galactosyl moieties can be substituted for the glucosyl moieties. (Optionally the hydrophobic group is attached at the 2-, 3-, 4-, etc. positions thus giving a glucose or galactose as opposed to a glucoside or galactoside.) The intersaccharide bonds can be, e.g., between the one position of the additional saccharide units and the 2-, 3-, 4-, and/or 6-positions on the preceding saccharide units.

Fatty acid amide surfactants suitable for use the present compositions include those having the formula: $R_6CON(R_7)_2$ in which $R_6$ is an alkyl group containing from 7 to 21 carbon atoms and each $R_7$ is independently hydrogen, $C_1$-$C_4$ alkyl, $C_1$-$C_4$ hydroxyalkyl, or $-(C_2H_4O)_XH$, where x is in the range of from 1 to 3.

A useful class of non-ionic surfactants include the class defined as alkoxylated amines or, most particularly, alcohol alkoxylated/aminated/alkoxylated surfactants. These non-ionic surfactants may be at least in part represented by the general formulae: $R^{20}$—$(PO)_SN$-$(EO)_tH$, $R^{20}$—$(PO)_SN$-$(EO)_tH(EO)_tH$, and $R^{20}$—$N(EO)_tH$; in which $R^{20}$ is an alkyl, alkenyl or other aliphatic group, or an alkyl-aryl group of from 8 to 20, preferably 12 to 14 carbon atoms, EO is oxyethylene, PO is oxypropylene, s is 1 to 20, preferably 2-5, t is 1-10, preferably 2-5, and u is 1-10, preferably 2-5. Other variations on the scope of these compounds may be represented by the alternative formula: $R^{20}$—$(PO)_V$—$N[(EO)_wH][(EO)_zH]$ in which $R^{20}$ is as defined above, v is 1 to 20 (e.g., 1, 2, 3, or 4 (preferably 2)), and w and z are independently 1-10, preferably 2-5. These compounds are represented commercially by a line of products sold by Huntsman Chemicals as nonionic surfactants. A preferred chemical of this class includes Surfonic™ PEA 25 Amine Alkoxylate. Preferred nonionic surfactants for the compositions of the disclosure include alcohol alkoxylates, EO/PO block copolymers, alkylphenol alkoxylates, and the like.

The treatise *Nonionic Surfactants*, edited by Schick, M. J., Vol. 1 of the Surfactant Science Series, Marcel Dekker, Inc., New York, 1983 is an excellent reference on the wide variety of nonionic compounds generally employed in the practice of the present disclosure. A typical listing of nonionic classes, and species of these surfactants, is given in U.S. Pat. No. 3,929,678 issued to Laughlin and Heuring on Dec. 30, 1975. Further examples are given in "Surface Active Agents and detergents" (Vol. I and II by Schwartz, Perry and Berch).

Semi-Polar Nonionic Surfactants

The semi-polar type of nonionic surface active agents are another class of nonionic surfactant useful in compositions of the present disclosure. Generally, semi-polar nonionics are high foamers and foam stabilizers, which can limit their application in CIP systems. However, within compositional embodiments of this disclosure designed for high foam cleaning methodology, semi-polar nonionics would have immediate utility. The semi-polar nonionic surfactants include the amine oxides, phosphine oxides, sulfoxides and their alkoxylated derivatives.

Amine oxides are tertiary amine oxides corresponding to the general formula:

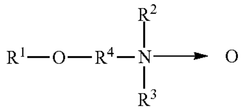

wherein the arrow is a conventional representation of a semi-polar bond; and, $R^1$, $R^2$, and $R^3$ may be aliphatic, aromatic, heterocyclic, alicyclic, or combinations thereof. Generally, for amine oxides of detergent interest, $R^1$ is an alkyl radical of from about 8 to about 24 carbon atoms; $R^2$ and $R^3$ are alkyl or hydroxyalkyl of 1-3 carbon atoms or a mixture thereof; $R^2$ and $R^3$ can be attached to each other, e.g. through an oxygen or nitrogen atom, to form a ring structure; $R^4$ is an alkylene or a hydroxyalkylene group containing 2 to 3 carbon atoms; and n ranges from 0 to about 20.

Useful water soluble amine oxide surfactants are selected from the coconut or tallow alkyl di-(lower alkyl) amine oxides, specific examples of which are dodecyldimethylamine oxide, tridecyldimethylamine oxide, etradecyldimethylamine oxide, pentadecyldimethylamine oxide, hexadecyldimethylamine oxide, heptadecyldimethylamine oxide, octadecyldimethylaine oxide, dodecyldipropylamine oxide, tetradecyldipropylamine oxide, hexadecyldipropylamine oxide, tetradecyldibutylamine oxide, octadecyldibutylamine oxide, bis(2-hydroxyethyl)dodecylamine oxide, bis(2-hydroxyethyl)-3-dodecoxy-1-hydroxypropylamine oxide, dimethyl-(2-hydroxydodecyl)amine oxide, 3,6,9-trioctadecyldimethylamine oxide and 3-dodecoxy-2-hydroxypropyldi-(2-hydroxyethyl)amine oxide.

Useful semi-polar nonionic surfactants also include the water soluble phosphine oxides having the following structure:

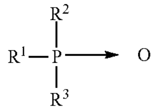

wherein the arrow is a conventional representation of a semi-polar bond; and, $R^1$ is an alkyl, alkenyl or hydroxyalkyl moiety ranging from 10 to about 24 carbon atoms in chain length; and, $R^2$ and $R^3$ are each alkyl moieties separately selected from alkyl or hydroxyalkyl groups containing 1 to 3 carbon atoms.

Examples of useful phosphine oxides include dimethyldecylphosphine oxide, dimethyltetradecylphosphine oxide, methylethyltetradecylphosphone oxide, dimethylhexadecylphosphine oxide, diethyl-2-hydroxyoctyldecylphosphine oxide, bis(2-hydroxyethyl)dodecylphosphine oxide, and bis(hydroxymethyl)tetradecylphosphine oxide.

Semi-polar nonionic surfactants useful herein also include the water soluble sulfoxide compounds which have the structure:

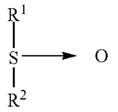

wherein the arrow is a conventional representation of a semi-polar bond; and, $R^1$ is an alkyl or hydroxyalkyl moiety of about 8 to about 28 carbon atoms, from 0 to about 5 ether linkages and from 0 to about 2 hydroxyl substituents; and $R^2$ is an alkyl moiety consisting of alkyl and hydroxyalkyl groups having 1 to 3 carbon atoms.

Useful examples of these sulfoxides include dodecyl methyl sulfoxide; 3-hydroxy tridecyl methyl sulfoxide; 3-methoxy tridecyl methyl sulfoxide; and 3-hydroxy-4-dodecoxybutyl methyl sulfoxide.

Semi-polar nonionic surfactants for the compositions of the disclosure include dimethyl amine oxides, such as lauryl dimethyl amine oxide, myristyl dimethyl amine oxide, cetyl dimethyl amine oxide, combinations thereof, and the like. Useful water soluble amine oxide surfactants are selected from the octyl, decyl, dodecyl, isododecyl, coconut, or tallow alkyl di-(lower alkyl) amine oxides, specific examples of which are octyldimethylamine oxide, nonyldimethylamine oxide, decyldimethylamine oxide, undecyldimethylamine oxide, dodecyldimethylamine oxide, iso-dodecyldimethyl amine oxide, tridecyldimethylamine oxide, tetradecyldimethylamine oxide, pentadecyldimethylamine oxide, hexadecyldimethylamine oxide, heptadecyldimethylamine oxide, octadecyldimethylaine oxide, dodecyldipropylamine oxide, tetradecyldipropylamine oxide, hexadecyldipropylamine oxide, tetradecyldibutylamine oxide, octadecyldibutylamine oxide, bis(2-hydroxyethyl)dodecylamine oxide, bis(2-hydroxyethyl)-3-dodecoxy-1-hydroxypropylamine oxide, dimethyl-(2-hydroxydodecyl) amine oxide, 3,6,9-trioctadecyldimethylamine oxide and 3-dodecoxy-2-hydroxypropyldi-(2-hydroxyethyl)amine oxide.

Suitable nonionic surfactants suitable for use with the compositions of the present disclosure include alkoxylated surfactants. Suitable alkoxylated surfactants include EO/PO copolymers, capped EO/PO copolymers, alcohol alkoxylates, capped alcohol alkoxylates, mixtures thereof, or the like. Suitable alkoxylated surfactants for use as solvents include EO/PO block copolymers, such as the Pluronic and reverse Pluronic surfactants; alcohol alkoxylates, such as Dehypon LS-54 ($R-(EO)_5(PO)_4$) and Dehypon LS-36 ($R-(EO)_3(PO)_6$); and capped alcohol alkoxylates, such as Plurafac LF221 and Tegoten EC11; mixtures thereof, or the like.

Cationic Surfactants

Surface active substances are classified as cationic if the charge on the hydrotrope portion of the molecule is positive. Surfactants in which the hydrotrope carries no charge unless the pH is lowered close to neutrality or lower, but which are then cationic (e.g. alkyl amines), are also included in this group. In theory, cationic surfactants may be synthesized from any combination of elements containing an "onium" structure RnX+Y— and could include compounds other than nitrogen (ammonium) such as phosphorus (phosphonium) and sulfur (sulfonium). In practice, the cationic surfactant field is dominated by nitrogen containing compounds, probably because synthetic routes to nitrogenous cationics are simple and straightforward and give high yields of product, which can make them less expensive.

Cationic surfactants preferably include, more preferably refer to, compounds containing at least one long carbon chain hydrophobic group and at least one positively charged nitrogen. The long carbon chain group may be attached directly to the nitrogen atom by simple substitution; or more preferably indirectly by a bridging functional group or groups in so-called interrupted alkylamines and amido amines. Such functional groups can make the molecule more hydrophilic and/or more water dispersible, more easily water solubilized by co-surfactant mixtures, and/or water soluble. For increased water solubility, additional primary, secondary or tertiary amino groups can be introduced or the amino nitrogen can be quaternized with low molecular weight alkyl groups. Further, the nitrogen can be a part of branched or straight chain moiety of varying degrees of unsaturation or of a saturated or unsaturated heterocyclic ring. In addition, cationic surfactants may contain complex linkages having more than one cationic nitrogen atom.

The surfactant compounds classified as amine oxides, amphoterics and zwitterions are themselves typically cationic in near neutral to acidic pH solutions and can overlap surfactant classifications. Polyoxyethylated cationic surfactants generally behave like nonionic surfactants in alkaline solution and like cationic surfactants in acidic solution.

The simplest cationic amines, amine salts and quaternary ammonium compounds can be schematically drawn thus:

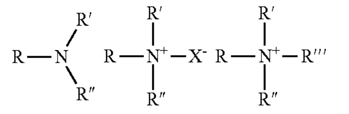

in which, R represents an alkyl chain, R', R", and R'" may be either alkyl chains or aryl groups or hydrogen and X represents an anion. The amine salts and quaternary ammonium compounds are preferred for practical use in this disclosure due to their high degree of water solubility.

The majority of large volume commercial cationic surfactants can be subdivided into four major classes and additional sub-groups known to those or skill in the art and described in "Surfactant Encyclopedia", *Cosmetics & Toiletries*, Vol. 104 (2) 86-96 (1989). The first class includes alkylamines and their salts. The second class includes alkyl imidazolines. The third class includes ethoxylated amines. The fourth class includes quaternaries, such as alkylbenzyldimethylammonium salts, alkyl benzene salts, heterocyclic ammonium salts, tetra alkylammonium salts, and the like. Cationic surfactants are known to have a variety of properties that can be beneficial in the present compositions. These desirable properties can include detergency in compositions of or below neutral pH, antimicrobial efficacy, thickening or gelling in cooperation with other agents, and the like.

Cationic surfactants useful in the compositions of the present disclosure include those having the formula $R^1{}_mR^2{}_xY_LZ$ wherein each $R^1$ is an organic group containing a straight or branched alkyl or alkenyl group optionally substituted with up to three phenyl or hydroxy groups and optionally interrupted by up to four of the following structures:

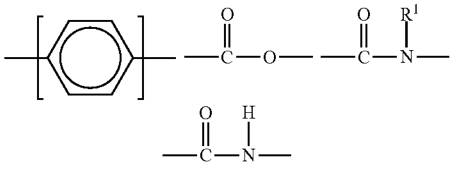

or an isomer or mixture of these structures, and which contains from about 8 to 22 carbon atoms. The $R^1$ groups can additionally contain up to 12 ethoxy groups. m is a number from 1 to 3. Preferably, no more than one $R^1$ group in a molecule has 16 or more carbon atoms when m is 2 or more than 12 carbon atoms when m is 3. Each $R^2$ is an alkyl or hydroxyalkyl group containing from 1 to 4 carbon atoms or a benzyl group with no more than one $R^2$ in a molecule being benzyl, and x is a number from 0 to 11, preferably from 0 to 6. The remainder of any carbon atom positions on the Y group are filled by hydrogens.

Y is can be a group including, but not limited to:

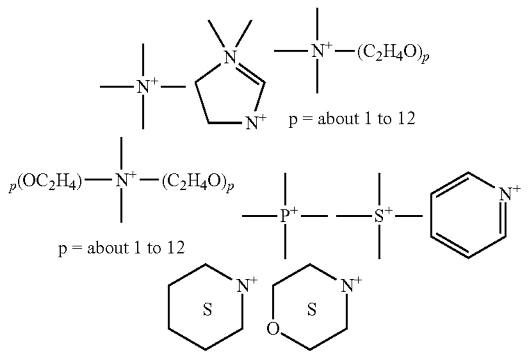

or a mixture thereof. Preferably, L is 1 or 2, with the Y groups being separated by a moiety selected from $R^1$ and $R^2$ analogs (preferably alkylene or alkenylene) having from 1 to about 22 carbon atoms and two free carbon single bonds when L is 2. Z is a water soluble anion, such as a halide, sulfate, methylsulfate, hydroxide, or nitrate anion, particularly preferred being chloride, bromide, iodide, sulfate or methyl sulfate anions, in a number to give electrical neutrality of the cationic component.

Amphoteric Surfactants

Amphoteric, or ampholytic, surfactants contain both a basic and an acidic hydrophilic group and an organic hydrophobic group. These ionic entities may be any of anionic or cationic groups described herein for other types of surfactants. A basic nitrogen and an acidic carboxylate group are the typical functional groups employed as the basic and acidic hydrophilic groups. In a few surfactants, sulfonate, sulfate, phosphonate or phosphate provide the negative charge.

Amphoteric surfactants can be broadly described as derivatives of aliphatic secondary and tertiary amines, in which the aliphatic radical may be straight chain or branched and wherein one of the aliphatic substituents contains from about 8 to 18 carbon atoms and one contains an anionic water solubilizing group, e.g., carboxy, sulfo, sulfato, phosphato, or phosphono. Amphoteric surfactants are subdivided into two major classes known to those of skill in the art and described in "Surfactant Encyclopedia" *Cosmetics & Toiletries*, Vol. 104 (2) 69-71 (1989), which is herein incorporated by reference in its entirety. The first class includes acyl/dialkyl ethylenediamine derivatives (e.g. 2-alkyl hydroxyethyl imidazoline derivatives) and their salts. The second class includes N-alkylamino acids and their salts. Some amphoteric surfactants can be envisioned as fitting into both classes.

Amphoteric surfactants can be synthesized by methods known to those of skill in the art. For example, 2-alkyl hydroxyethyl imidazoline is synthesized by condensation and ring closure of a long chain carboxylic acid (or a derivative) with dialkyl ethylenediamine. Commercial amphoteric surfactants are derivatized by subsequent hydrolysis and ring-opening of the imidazoline ring by alkylation—for example with chloroacetic acid or ethyl acetate.

During alkylation, one or two carboxy-alkyl groups react to form a tertiary amine and an ether linkage with differing alkylating agents yielding different tertiary amines.

Long chain imidazole derivatives having application in the present disclosure generally have the general formula:

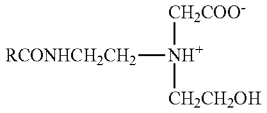

(MONO)ACETATE

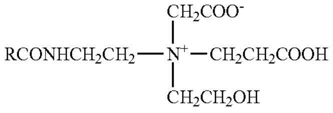

(DI)PROPIONATE

Neutral pH Zwitternion

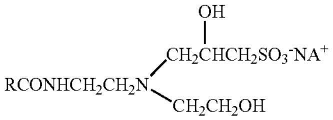

AMPHOTERIC SULFONATE wherein R is an acyclic hydrophobic group containing from about 8 to 18 carbon atoms and M is a cation to neutralize the charge of the anion, generally sodium. Commercially prominent imidazoline-derived amphoterics that can be employed in the present compositions include for example: Cocoamphopropionate, Cocoamphocarboxy-propionate, Cocoamphoglycinate, Cocoamphocarboxy-glycinate, Cocoamphopropyl-sulfonate, and Cocoamphocarboxy-propionic acid. Amphocarboxylic acids can be produced from fatty imidazolines in which the dicarboxylic acid functionality of the amphodicarboxylic acid is diacetic acid and/or dipropionic acid.

The carboxymethylated compounds (glycinates) described herein above frequently are called betaines. Betaines are a special class of amphoteric discussed herein below in the section entitled, Zwitterion Surfactants.

Long chain N-alkylamino acids are readily prepared by reaction $RNH_2$, in which $R{=}C_8$-$C_{18}$ straight or branched chain alkyl, fatty amines with halogenated carboxylic acids. Alkylation of the primary amino groups of an amino acid leads to secondary and tertiary amines. Alkyl substituents may have additional amino groups that provide more than one reactive nitrogen center. Most commercial N-alkylamine acids are alkyl derivatives of beta-alanine or beta-N(2-carboxyethyl) alanine. Examples of commercial N-alkylamino acid ampholytes having application in this disclosure include alkyl beta-amino dipropionates, $RN(C_2H_4COOM)_2$ and $RNHC_2H_4COOM$. In an embodiment, R can be an acyclic hydrophobic group containing from about 8 to about 18 carbon atoms, and M is a cation to neutralize the charge of the anion.

Suitable amphoteric surfactants include those derived from coconut products such as coconut oil or coconut fatty acid. Additional suitable coconut derived surfactants include as part of their structure an ethylenediamine moiety, an alkanolamide moiety, an amino acid moiety, e.g., glycine, or a combination thereof; and an aliphatic substituent of from about 8 to 18 (e.g., 12) carbon atoms. Such a surfactant can also be considered an alkyl amphodicarboxylic acid. These amphoteric surfactants can include chemical structures represented as: $C_{12}$-alkyl-C(O)—NH—$CH_2$—$CH_2$—$N^+$($CH_2$—$CH_2$—$CO_2Na)_2$—$CH_2$—$CH_2$—OH or $C_{12}$-alkyl-C(O)—N(H)—$CH_2$—$CH_2$—$N^+$($CH_2$—$CO_2Na)_2$—$CH_2$—$CH_2$—OH. Disodium cocoampho dipropionate is one suitable amphoteric surfactant and is commercially available under the tradename Miranol™ FBS from Rhodia Inc., Cranbury, N.J. Another suitable coconut derived amphoteric surfactant with the chemical name disodium cocoampho diacetate is sold under the tradename Mirataine™ JCHA, also from Rhodia Inc., Cranbury, N.J.

A typical listing of amphoteric classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch). Each of these references are herein incorporated by reference in their entirety.

Zwitterionic Surfactants

Zwitterionic surfactants can be thought of as a subset of the amphoteric surfactants and can include an anionic charge. Zwitterionic surfactants can be broadly described as derivatives of secondary and tertiary amines, derivatives of heterocyclic secondary and tertiary amines, or derivatives of quaternary ammonium, quaternary phosphonium or tertiary sulfonium compounds. Typically, a zwitterionic surfactant includes a positive charged quaternary ammonium or, in some cases, a sulfonium or phosphonium ion; a negative charged carboxyl group; and an alkyl group. Zwitterionics generally contain cationic and anionic groups which ionize to a nearly equal degree in the isoelectric region of the molecule and which can develop strong" inner-salt" attraction between positive-negative charge centers. Examples of such zwitterionic synthetic surfactants include derivatives of aliphatic quaternary ammonium, phosphonium, and sulfonium compounds, in which the aliphatic radicals can be straight chain or branched, and wherein one of the aliphatic substituents contains from 8 to 18 carbon atoms and one contains an anionic water solubilizing group, e.g., carboxy, sulfonate, sulfate, phosphate, or phosphonate.

Betaine and sultaine surfactants are exemplary zwitterionic surfactants for use herein. A general formula for these compounds is:

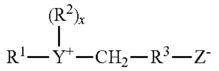

wherein $R^1$ contains an alkyl, alkenyl, or hydroxyalkyl radical of from 8 to 18 carbon atoms having from 0 to 10 ethylene oxide moieties and from 0 to 1 glyceryl moiety; Y is selected from the group consisting of nitrogen, phosphorus, and sulfur atoms; $R^2$ is an alkyl or monohydroxy alkyl group containing 1 to 3 carbon atoms; x is 1 when Y is a sulfur atom and 2 when Y is a nitrogen or phosphorus atom, $R^3$ is an alkylene or hydroxy alkylene or hydroxy alkylene of from 1 to 4 carbon atoms and Z is a radical selected from the group consisting of carboxylate, sulfonate, sulfate, phosphonate, and phosphate groups.

Examples of zwitterionic surfactants having the structures listed above include: 4-[N,N-di(2-hydroxyethyl)-N-octadecylammonio]-butane-1-carboxylate; 5-[S-3-hydroxypropyl-S-hexadecylsulfonio]-3-hydroxypentane-1-sulfate; 3-[P,P-diethyl-P-3,6,9-trioxatetracosanephosphonio]-2-hydroxypropane-1-phosphate; 3-[N,N-dipropyl-N—3-dodecoxy-2-hydroxypropyl-ammonio]-propane-1-phosphonate; 3-(N,N-dimethyl-N-hexadecylammonio)-propane-1-sulfonate; 3-(N,N-dimethyl-N-hexadecylammonio)-2-hydroxy-propane-1-sulfonate; 4-[N,N-di(2(2-hydroxyethyl)-N(2-hydroxydodecyl)ammonio]-butane-1-carboxylate; 3-[S-ethyl-S-(3-dodecoxy-2-hydroxypropyl)sulfonio]-propane-1-phosphate; 3-[P,P-dimethyl-P-dodecylphosphonio]-propane-1-phosphonate; and S[N,N-di(3-hydroxypropyl)-N-hexadecylammonio]-2-hydroxy-pentane-1-sulfate. The alkyl groups contained in said detergent surfactants can be straight or branched and saturated or unsaturated.

The zwitterionic surfactant suitable for use in the present compositions includes a betaine of the general structure:

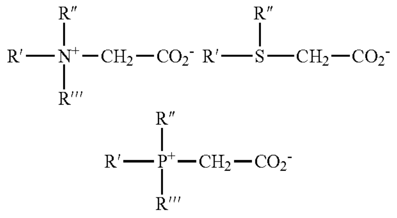

These surfactant betaines typically do not exhibit strong cationic or anionic characters at pH extremes nor do they show reduced water solubility in their isoelectric range. Unlike “external” quaternary ammonium salts, betaines are compatible with anionics. Examples of suitable betaines include coconut acylamidopropyldimethyl betaine; hexadecyl dimethyl betaine; $C_{12-14}$ acylamidopropylbetaine; $C_{8-14}$ acylamidohexyldiethyl betaine; 4-$C_{14-16}$ acylmethylamidodiethylammonio-1-carboxybutane; $C_{16-18}$ acylamidodimethylbetaine; $C_{12-16}$ acylamidopentanediethylbetaine; and $C_{12-16}$ acylmethylamidodimethylbetaine.

Sultaines useful in the present disclosure include those compounds having the formula $(R(R^1)_2N^+R^2SO^{3-}$, in which R is a $C_6$-$C_{18}$ hydrocarbyl group, each $R^1$ is typically independently $C_1$-$C_3$ alkyl, e.g., methyl, and $R^2$ is a $C_1$-$C_6$ hydrocarbyl group, e.g., a $C_1$-$C_3$ alkylene or hydroxyalkylene group.

A typical listing of zwitterionic classes, and species of these surfactants, is given in U.S. Pat. No. 3,929,678 issued to Laughlin and Heuring on Dec. 30, 1975. Further examples are given in “Surface Active Agents and Detergents” (Vol. I and II by Schwartz, Perry and Berch). Each of these references are herein incorporated in their entirety.

Defoaming Agent

A defoaming agent for reducing the stability of foam may also be included in the warewashing composition. Examples of defoaming agents include, but are not limited to: ethylene oxide/propylene block copolymers such as those available under the name Pluronic N-3; silicone compounds such as silica dispersed in polydimethylsiloxane, polydimethylsiloxane, and functionalized polydimethylsiloxane such as those available under the name Abil B9952; fatty amides, hydrocarbon waxes, fatty acids, fatty esters, fatty alcohols, fatty acid soaps, ethoxylates, mineral oils, polyethylene glycol esters, and alkyl phosphate esters such as monostearyl phosphate. A discussion of defoaming agents may be found, for example, in U.S. Pat. No. 3,048,548 to Martin et al., U.S. Pat. No. 3,334,147 to Brunelle et al., and U.S. Pat. No. 3,442,242 to Rue et al., the disclosures of which are incorporated herein by reference. When the concentrate includes a defoaming agent, the defoaming agent can be provided in an amount of between approximately 0.0001% and approximately 10% by weight, between approximately 0.001% and approximately 5% by weight, or between approximately 0.01% and approximately 1.0% by weight.

Concentrate and Use Solutions for Methods of Use

The detergent compositions as provided in a block are concentrate compositions. In general, a concentrate refers to a composition that is intended to be diluted with water to provide a use solution that contacts an object to provide the desired cleaning, rinsing, or the like.

A use solution may be prepared from the concentrate by diluting the concentrate with water at a dilution ratio that provides a use solution having desired detersive properties. The water that is used to dilute the concentrate to form the use composition can be referred to as water of dilution or a diluent, and can vary from one location to another. The typical dilution factor is between approximately 1 and approximately 10,000 but will depend on factors including water hardness, the amount of soil to be removed and the like. A concentrate may be diluted at a ratio of between about 1:10 and about 1:10,000 concentrate to water. Particularly, A concentrate is diluted at a ratio of between about 1:100 and about 1:5,000 concentrate to water. More particularly, a concentrate may be diluted at a ratio of between about 1:250 and about 1:2,000 concentrate to water.

In an aspect of the disclosure, a use solution of the detergent compositions has between about 10 ppm to about 6000 ppm alkaline source. In a preferred aspect of the disclosure, a use solution of the detergent composition has between about 500 ppm to about 4000 ppm alkaline source. In a still further preferred aspect of the disclosure, a use solution of the detergent composition has between 2500 ppm to about 3500 ppm alkaline source. In addition, without being limited according to the disclosure, all ranges recited are inclusive of the numbers defining the range and include each integer within the defined range.

In an aspect of the disclosure, the detergent composition preferably provides efficacious cleaning at low use dilutions, e.g., require less volume to clean effectively. In an aspect, the detergent composition may be diluted in water prior to use at dilutions ranging from about 1/16 oz./gal. to about 2 oz./gal. or more. A detergent composition that requires less volume to achieve the same or better cleaning efficacy and provides hardness scale control and/or other benefits at low use dilutions is desirable.

In some aspects, the detergent compositions are contacted by a diluent, such as water to generate a concentrate and/or use solution for the various applications of use.

In some aspects, the present disclosure provides methods for removing soils from a surface, e.g., a hard surface, and/or bleaching a surface. In some embodiments, the method comprises contacting a use solution of the detergent compositions with a surface, and removing the composition from the surface after an amount of time sufficient to facilitate soil removal and/or bleaching. The contacting step can last for any suitable time. In some embodiments, the contacting step lasts for at least 10 seconds, 20 seconds, 30 seconds, 40 seconds, 50 seconds, 1 minute, 10 minutes, 30 minutes, 1 hour, 2 hours, 4 hours, 8 hours, 16 hours, 1 day, 3 days, 1 week, or longer. The detergent composition can contact the surface (or target for soil removal and/or bleaching) in any suitable manner. In some embodiments, the detergent composition is applied by means of a spray, a foam, soaking or the like.

The methods can be used to achieve any suitable removal of soil (e.g., cleaning), sanitizing, disinfecting, bleaching and/or reduction of the microbial population in and/or on the surface or target. In some embodiments, the methods can be used to reduce the microbial population by at least one log 10. In other embodiments, the present methods can be used to reduce the microbial population in and/or on the target or the treated target composition by at least two log 10. In still other embodiments, the present methods can be used to reduce the microbial population in and/or on the target or the treated target composition by at least three log 10.

In some embodiments, the method further comprises rinsing the surface. In some embodiments, the method further comprises a mechanical application of force, agitation and/or pressure to assist in removing the soils and/or bleaching the surface.

The methods of the present disclosure can be used to remove a variety of soils from a variety of surfaces and/or bleaching a variety of surfaces. For example, surfaces suitable for cleaning using the methods of the present disclosure include, but are not limited to, walls, floors, ware, dishes, flatware, pots and pans, heat exchange coils, ovens, fryers, smoke houses, sewer drain lines, and the like.

In some embodiments, the methods of the present disclosure are followed by only a rinse step. In other embodiments, the methods of the present disclosure are followed by a conventional CIP method suitable for the surface to be cleaned. In still yet other embodiments, the methods of the present disclosure are followed by a CIP method such as those described in U.S. Pat. Nos. 8,398,781 and 8,114,222 entitled "Methods for Cleaning Industrial Equipment with Pre-treatment," both of which are hereby incorporated by reference in their entirety.

Methods of Use

In another aspect, disclosed here is a method of cleaning, sanitizing and/or bleaching comprising generating a use solution of the disclosed compositions that comprise an alkaline source, an enzyme, and a specific type of phosphonate or amine phosphonate salt.

In yet another aspect, disclosed here is a method of cleaning, sanitizing and/or bleaching comprising generating a use solution of the disclosed compositions that comprise an alkaline source, an enzyme, and a specific type of phosphonate or amine phosphonate salt, and contacting a surface or object in need of cleaning and sanitizing with the use solution.

In some embodiments, the use solution of the disclosed detergent compositions has maintained at least 15% of its enzyme activity after 240 minutes of its generation. In some other embodiments, the use solution of the disclosed detergent composition has maintained at least 20% of its enzyme activity after 120 minutes of its generation.

In yet another aspect, the disclosure is a method of stabilizing an enzyme in a solid detergent. The method comprises adding a phosphonate of formula

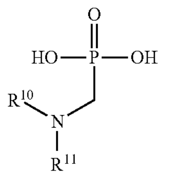

or salt thereof, or an amine phosphonate salt in an existing detergent composition containing an enzyme, wherein $R^{10}$ and $R^{11}$ are independently hydrogen, a substituted carboxylic acid, phosphonate, ethanol, diglyco, substituted alkyl, 2-$(EO)_n$-biphosphonateamine-ethyl, 2-$(PO)_n$-biphosphonateamine-isopropyl, or phosphonate-methyl; the amine phosphonate salt is a product of a phosphonate of formula

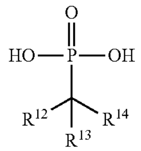

and an amine, and $R^{12}$, $R^{13}$, and $R^{14}$ are independently hydroxyl, methyl, $—PO(OH)_2$, $—CH_2COOH$, a substituted alkyl, phosphonate, ester thereof, salt thereof, or derivative thereof.

All publications and patent applications in this specification are indicative of the level of ordinary skill in the art to which this disclosure pertains. All publications and patent applications are herein incorporated by reference to the same extent as if each individual publication or patent application was specifically and individually indicated as incorporated by reference.

EXAMPLES

Embodiments of the present disclosure are further defined in the following non-limiting Examples. It should be understood that these Examples, while indicating certain embodiments of the disclosure, are given by way of illustration only. From the above discussion and these Examples, one skilled in the art can ascertain the essential characteristics of this disclosure, and without departing from the spirit and scope thereof, can make various changes and modifications of the embodiments of the disclosure to adapt it to various usages and conditions. Thus, various modifications of the embodiments of the disclosure, in addition to those shown and described herein, will be apparent to those skilled in the art from the foregoing description. Such modifications are also intended to fall within the scope of the appended claims.

The following materials are used in the Examples:

Bio-Terge® AS-90-90% active $C_{14}$-$C_{16}$ alpha olefin sulfonate (AOS);

Ufaryl DL90C—90% $C_{10}$-$C_{13}$ active linear alkylbenzene sulfonate (LAS), drum dried powder;

Belclene 200—50% active 500-100 MW polymaleic acid;

Acusol™ 445N—45% active polyacrylic acid (4500-10000 MW);

Acusol™ 445ND—45% active polyacrylic acid (4500-10,000 MW), spray dried;

Acusol™ 820—a Hydrophobically modified Alkali Soluble acrylic polymer Emulsion (HASE) with unusually high aqueous thickening and stabilising efficiency;

Acusol™ 929—46% active polyacrylic acid (~10,000-15,000 MW);

Dense Ash—Sodium Carbonate;

Light Ash—Sodium Carbonate;

Sodium Bicarbonate, granular;

PEG 8000—Polyethylene glycol with an average molecular weight of 8,000;

Powder Bicarb—Sodium bicarbonate, in powder;

CMC—7LT—carboxymethylcellulose;

LAE 24—7—Linear alcohol ethoxylate (7 moles EO);

ATMP—Aminotri (methylene phosphonic acid);

AMPA—Aminomethyl phosphonic acid;

PBTC—Phosphonebutane tricarboxylic acid; Bayhibit AM;

STPP—sodium tripolyphosphate;

HEDP—1-hydroxy ethylidene-1,1-diphosphonic acid, Dequest 2010;

DGAP—Diglycolamine phosphonate, Scale inhibitor 2588;

MEAP—Monoethanolamine phosphonate, Scale inhibitor 2670;

PAPEMP—Polyamino Polyether Methylene Phosphonic Acid, Kemguard 8010;

PSO—Phosphinosuccinic Mix from Nalco, Nalco TX15712SQ.

Example 1

The enzyme activities in the detergents with different phosphonate levels were tested at 4000 ppm in 5 grains per gallon (GPG) water at 120° F. with various time points collected up to 4 hours, after a use solution was generated from the detergent composition. During the tests, the samples at different time points were collected and immediately frozen in an acetone/dry ice bath and stored in −80° C. before the activity of the enzyme was evaluated. For the use of such an assay, t=0 min was the reference point for 100% enzyme activity.

Assays of enzyme activity in formulations (% retention) were conducted to simulate a presoak condition in a beaker using the chemistry, temperature, and pH conditions relevant to manual warewash or presoak applications. Enzyme activity is an indicator of the stability of the enzyme in the detergent, specifically in an aqueous use solution within a sump (which is under conditions of high pH, temperature and dilution).

The analysis by protease assay was conducted as follows. For the assays, a detergent composition was used to generate an aqueous use solution evaluated herein. The components in the tested detergent compositions are listed in Table 1.

Enzyme activity under presoak or manual warewash conditions was traced quantitatively using a standard protease assay. Samples were prepared under bench top conditions, whereby the use solution from a detergent composition or detergent was obtained and maintained at a presoak or manual warewash temperature in a stirring water bath. After the time course for assessing enzyme stability is initiated, aliquots were taken at various time points and flash-frozen. A time=0 sample was prepared for each series by dissolving the detergent formulation at room temperature, mixing thoroughly, and flash freezing. Samples were thawed and diluted as necessary in an assay buffer usually for use in the protease assay. A glycine buffer at pH 9.0 is used here. The assay monitored the direct reaction of the protease on a small, commercially available peptidyl substrate, with liberation of the product providing correlation to the active enzyme content. The product was detected using a plate reader with an appreciable dynamic range (upper absorbance limit of the instrument >3.5). Enzyme activity levels were assessed relative to a calibration curve with average values for replicate tests used to map protease stability under presoak or manual warewash use conditions. Enzyme retention at each time point was calculated as the % enzyme activity relative to the time=0 sample.

The analysis by lipase and amylase assay was conducted similarly, except with a different substrate and buffers. For lipase activity, the substrate is p-nitrophenyl valerate, and for amylase, the substrate is an ethylidene substrate (EPS). The buffer used in lipase assay is TRIS (Tris(hydroxymethyl)aminomethane) buffer at pH 8.0, and in amylase assay HEPES (4-(2-hydroxyethyl)-1-piperazineethanesulfonic acid) buffer at pH 8.0.

The phosphonates and their concentration levels evaluated are listed in Table 2. The phosphonate structures and their overall effects on enzyme activity are listed in Table 3. The relative enzyme activities in a use solution of the tested detergent compositions containing a different phosphonate at different concentrations over a period time are listed in Table 4A-Table 4E, Table 5A-Table 5E, and Table 6A-Table 6F.

TABLE 1

List of the Components and their weight percentage in the Tested Detergent Compositions

| Raw Material | Base Formula[a] | All Ash Formula[a] |
|---|---|---|
| Sodium carbonate | 47.47 (35-55) | 85.09 (50-90) |
| Sodium bicarbonate | 37.62 (30-45) | |
| Alpha olefin sulfonate | 4 (0.1-10) | 4 (0.1-10) |
| Enzyme | 1.3 (0.1-5) | 1.3 (0.1-5) |
| Water Conditioning Agents | 7.61 (2-15) | 7.61 (2-15) |
| Triethanolamine | Added to neutralize HEDP and PBTC (see results) | |
| Surfactant | 2 (0.1-5) | 2 (0.1-5) |

[a]The values in brackets are exemplary preferred ranges for the respective ingredient in the tested compositions.

TABLE 2

List of Phosphonates and their Concentration Levels that were Evaluated for Their Effect on Enzyme Activity.

| Name | Levels tested |
|---|---|
| ATMP - aminotris (methylenephosphonic acid) | 0.3% active<br>0.6% active<br>0.1% elemental phosphorus |
| PBTC - Phosphono butanetricarboxylic acid | 0.3% active<br>0.6% active<br>0.1% elemental phosphorus<br>0.3% active neutralized with triethanolamine |
| HEDP - Etidronic acid | 0.3% active<br>0.6% active<br>0.1% elemental phosphorus<br>0.3% active neutralized with triethanolamine |
| DGAP - Diglycolamine phosphonate | 0.3% active<br>0.6% active<br>0.1% elemental phosphorus |
| MEAP - Monoethanolamine phosphonate | 0.3% active<br>0.6% active<br>0.1% elemental phosphorus |
| PAPEMP - Polyamino Polyether Methylene Phosphonic Acid | 0.3% active<br>0.6% active<br>0.1% elemental phosphorus |
| PSO | 0.3% active<br>0.6% active<br>0.1% elemental phosphorus |
| AMPA - Aminomethyl phosphoric acid | 0.3% active<br>0.6% active<br>0.1% elemental phosphorus |

TABLE 3
| List of Phosphonates, Their Structures, and Effects on Enzyme Activity | | |
|---|---|---|
| Name | Structure | Stability |
| ATMP | 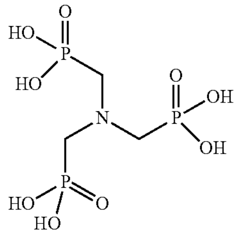 [SMILES: O=P(O)(O)CN(CP(=O)(O)O)CP(=O)(O)O] | Yes |
| PBTC | 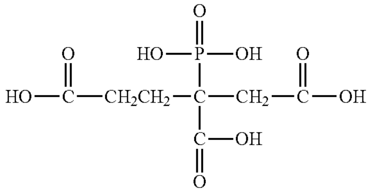 | No |
| HEDP | 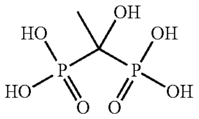 | No |
| DGAP | 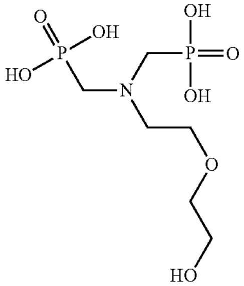 [SMILES: O=P(O)(O)CN(CCOCCO)CP(=O)(O)O] | Yes |
| PAPEMP | 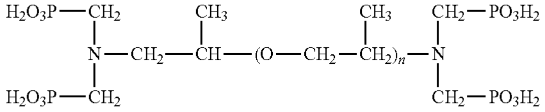 | Yes |
| PSO (mix) | 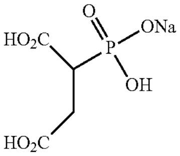 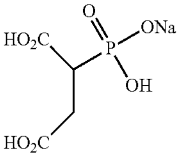 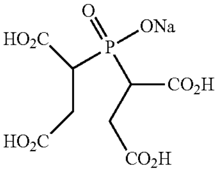 | No |

TABLE 3-continued

| List of Phosphonates, Their Structures, and Effects on Enzyme Activity | | |
|---|---|---|
| Name | Structure | Stability |
| | 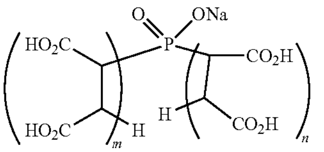 m + n > 2 | |
| | 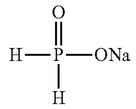 | |
| | 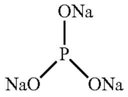 | |
| | 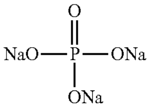 | |
| | 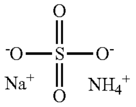 | |
| MEAP | 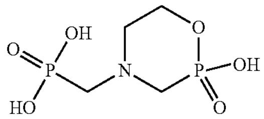 [SMILES: O=P(O)(O)CN1CCOP(=O)(O)C1] | Yes |
| AMPA | 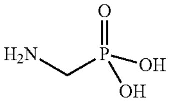 | Yes |
| Triethanolamine | 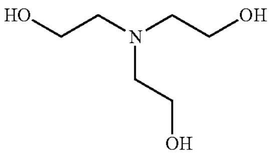 | Yes, when neutralized with a phosphonate |

TABLE 4A

Relative Protease Enzyme Activity in a Use Solution of the Detergent Compositions Containing a Protease and Various Phosphonates at a Level of 0.3 wt-% at 120° F.

| time (min) | No Phosphorous | ATMP | PBTC | HEDP |
|---|---|---|---|---|
| Blank | −2.79% | −1.41% | −0.82% | −0.90% |
| 0 | 43.38% | 100.00% | 100.00% | 100.00% |
| 5 | 100.00% | 94.95% | 52.04% | 52.21% |
| 10 | 75.23% | 94.68% | 30.98% | 32.95% |
| 20 | 53.12% | 89.76% | 14.75% | 15.91% |
| 40 | 34.98% | 87.06% | 7.33% | 8.68% |
| 60 | 24.31% | 83.93% | 5.15% | 5.52% |
| 90 | 19.75% | 80.79% | 4.01% | 4.10% |
| 120 | 13.39% | 76.31% | 2.91% | 3.10% |
| 150 | 12.48% | 73.96% | 2.21% | 2.39% |
| 180 | 12.46% | 70.37% | 1.52% | 1.65% |

TABLE 4A-continued

Relative Protease Enzyme Activity in a Use Solution of the Detergent Compositions Containing a Protease and Various Phosphonates at a Level of 0.3 wt-% at 120° F.

| | | | | |
|---|---|---|---|---|
| 210 | 10.72% | 65.72% | 1.01% | 1.36% |
| 240 | 9.69% | 63.75% | 0.63% | 1.20% |

| time (min) | DGAP | MEAP | PAPEMP | PSO | AMPA |
|---|---|---|---|---|---|
| Blank | −0.34% | −0.66% | −0.07% | −0.19% | −1.80% |
| 0 | 100.00% | 100.00% | 100.00% | 100.00% | 85.83% |
| 5 | 100.00% | 103.02% | 100.00% | 52.04% | 100.00% |
| 10 | 98.30% | 98.29% | 107.31% | 36.88% | 86.30% |
| 20 | 92.44% | 96.59% | 109.98% | 19.71% | 78.58% |
| 40 | 91.75% | 90.19% | 105.51% | 10.45% | 63.30% |
| 60 | 89.16% | 82.48% | 100.17% | 7.19% | 51.37% |
| 90 | 79.16% | 79.14% | 89.50% | 5.10% | 44.31% |
| 120 | 84.87% | 72.58% | 96.21% | 3.55% | 37.90% |
| 150 | 82.96% | 68.59% | 99.48% | 3.35% | 31.17% |
| 180 | 82.44% | 63.56% | 93.74% | 3.21% | 28.70% |
| 210 | 75.52% | 58.70% | 86.60% | 2.75% | 25.64% |
| 240 | 76.14% | 60.60% | 92.79% | 2.27% | 22.72% |

TABLE 4B

Relative Protease Enzyme Activity in a Use Solution of the Detergent Compositions Containing a Protease and Various Phosphonates at a Level of 0.6 wt-% at 120° F.

| time (min) | ATMP | PBTC | HEDP | DGAP | MEAP | PAPEMP | PSO | AMPA |
|---|---|---|---|---|---|---|---|---|
| Blank | 0.31% | 0.05% | −2.35% | −1.75% | −0.43% | 0.48% | 0.16% | −2.15% |
| 0 | 100.00% | 100.00% | 100.00% | 100.00% | 100.00% | 100.00% | 100.00% | 100.00% |
| 5 | 91.70% | 60.27% | 69.69% | 105.28% | 106.85% | 98.49% | 59.03% | 109.27% |
| 10 | 102.58% | 35.81% | 51.90% | 100.03% | 101.06% | 96.69% | 34.62% | 94.52% |
| 20 | 100.03% | 16.27% | 27.67% | 101.24% | 104.08% | 93.71% | 14.30% | 84.97% |
| 40 | 97.16% | 7.44% | 12.41% | 100.88% | 95.75% | 92.60% | 6.47% | 77.92% |
| 60 | 92.31% | 4.84% | 7.62% | — | 95.13% | 92.60% | 4.30% | 75.86% |
| 90 | 89.99% | 2.96% | 4.70% | 98.76% | 86.12% | 86.28% | 3.15% | 62.50% |
| 120 | 91.60% | 1.76% | 2.94% | 93.04% | 85.48% | 88.30% | 1.60% | 54.43% |
| 150 | 86.21% | 1.32% | 1.79% | 88.27% | 80.22% | 89.66% | 1.15% | 51.19% |
| 180 | 89.08% | 0.91% | 0.92% | 86.23% | 82.71% | 86.90% | 0.86% | 47.47% |
| 210 | 89.86% | 0.70% | 0.71% | 88.24% | 70.64% | 87.49% | 0.70% | 43.42% |
| 240 | 82.33% | 0.39% | 0.45% | 89.57% | 72.77% | 86.53% | 0.74% | 40.00% |

TABLE 4C

Relative Protease Enzyme Activity in a Use Solution of the Detergent Compositions Containing a Protease and Various Phosphonates at a Level of 0.1% elemental phosphorus at 120° F.

| time (min) | ATMP | PBTC | HEDP | DGAP | MEAP | PAPEMP | PSO | AMPA |
|---|---|---|---|---|---|---|---|---|
| Blank | −0.33% | −0.15% | −0.67% | −0.51% | −0.97% | −1.75% | −1.49% | −1.85% |
| 0 | 100.00% | 100.00% | 100.00% | 100.00% | 100.00% | 100.00% | 100.00% | 107.11% |
| 5 | 122.55% | 86.68% | 77.74% | 98.29% | 119.22% | 95.74% | 53.94% | 100.00% |
| 10 | 116.65% | 55.40% | 53.71% | 103.47% | 118.42% | 95.47% | 28.39% | 99.75% |
| 20 | 115.14% | 23.91% | 23.58% | 101.47% | 113.68% | 92.78% | 10.95% | 84.62% |
| 40 | 107.73% | 8.20% | 9.12% | 88.60% | 108.32% | 86.55% | 2.62% | 70.58% |
| 60 | 102.70% | 4.68% | 5.36% | 86.17% | 105.97% | 87.49% | 1.03% | 62.19% |
| 90 | 111.18% | 2.99% | 3.76% | 85.84% | 95.99% | 86.61% | 0.29% | 49.17% |
| 120 | 106.19% | 2.04% | 2.44% | 83.06% | 91.30% | 86.34% | 0.76% | 43.34% |
| 150 | 96.80% | 1.54% | 1.45% | 81.53% | 82.74% | 84.01% | 1.05% | 38.26% |
| 180 | 93.35% | 1.01% | 0.74% | 76.41% | 81.94% | 71.92% | 1.20% | 34.55% |
| 210 | 90.51% | 0.73% | 0.64% | 74.23% | 79.85% | 80.74% | 1.32% | 32.27% |
| 240 | 88.60% | 0.42% | 0.45% | 72.01% | 75.73% | 79.08% | 1.52% | 28.25% |

TABLE 4D

Relative Protease Enzyme Activity in a Use Solution of the Detergent Compositions Containing a Protease and Various Phosphonates Neutralized with an Alkanolamine at a Level of 0.3 wt-% at 120° F.

| PBTC neutralized with TEA | HEDP neutralized with TEA | PSO neutralized with TEA | PBTC neutralized with MEA | HEDP neutralized with MEA | PSO neutralized with MEA | PBTC neutralized with IPA | HEDP neutralized with IPA | PSO neutralized with IPA |
|---|---|---|---|---|---|---|---|---|
| −0.84% | −0.67% | −0.89% | −2.17% | −3.15% | −3.24% | −2.66% | −3.00% | −2.13% |
| 100.00% | 100.00% | 100.00% | 100.00% | 100.00% | 100.00% | 100.00% | 100.00% | 100.00% |
| 100.00% | 100.00% | 97.66% | 87.92% | 91.36% | 91.94% | 73.74% | 102.03% | 94.42% |
| 89.46% | 92.11% | 76.32% | 65.16% | 74.15% | 70.31% | 52.09% | 85.18% | 68.24% |
| 73.58% | 77.81% | 67.03% | 48.64% | 60.15% | 48.71% | 38.16% | 65.55% | 45.69% |
| 52.71% | 55.84% | 48.91% | 36.58% | 41.89% | 32.24% | 31.66% | 48.32% | 37.11% |
| 39.31% | 43.76% | 38.11% | 27.37% | 32.68% | 23.13% | 25.45% | 38.50% | 26.83% |
| 28.74% | 30.12% | 28.75% | 20.02% | 24.63% | 17.02% | 18.30% | 28.67% | 19.73% |
| 23.33% | 22.99% | 24.12% | 14.33% | 19.44% | 13.58% | 13.92% | 22.10% | 15.94% |
| 16.83% | 19.37% | 20.99% | 10.42% | 15.29% | 11.49% | 12.46% | 16.09% | 13.39% |
| 15.04% | 17.13% | 17.03% | 12.17% | 13.78% | 10.56% | 10.39% | 16.19% | 11.79% |
| 13.21% | 14.12% | 15.22% | 10.85% | 11.80% | 8.01% | 8.14% | 14.38% | 8.28% |
| 10.57% | 13.15% | 13.69% | 9.37% | 11.33% | 7.33% | 7.14% | 12.80% | 7.09% |

TABLE 4E

Relative Protease Enzyme Activity in a Use Solution of the All Ash Detergent Compositions Containing a Protease and Various Phosphonates at a Level of 0.3 wt-% at 120° F.

| time (min) | ATMP | DGAP | PBTC | HEDP |
|---|---|---|---|---|
| Blank | 1.16% | 0.80% | −1.26% | −1.19% |
| 0 | 100.00% | 100.00% | 100.00% | 100.00% |
| 5 | 84.60% | 81.79% | 11.99% | 8.63% |
| 10 | 75.67% | 75.39% | 3.18% | 3.25% |
| 20 | 53.32% | 59.47% | −0.81% | 0.61% |
| 40 | 33.78% | 39.98% | −1.79% | −1.32% |
| 60 | 22.22% | 27.49% | −1.94% | −1.66% |
| 90 | 15.40% | 18.95% | −1.57% | −0.97% |
| 120 | 11.13% | 12.48% | −1.11% | −1.23% |
| 150 | 9.39% | 10.56% | −1.04% | −0.85% |
| 180 | 7.41% | 9.69% | −2.62% | −0.93% |
| 210 | 6.17% | 7.02% | −3.07% | −0.42% |
| 240 | 5.58% | 6.34% | −2.02% | −0.42% |

TABLE 5A

Relative Amylase Enzyme Activity in a Use Solution of the Detergent Compositions Containing a Protease and Various Phosphonates at a Level of 0.3 wt-% at 120° F.

| time (min) | No Phosphorous | ATMP | PBTC | HEDP | DGAP | MEAP | PAPEMP | PSO | AMPA |
|---|---|---|---|---|---|---|---|---|---|
| Blank | −4.42% | −1.41% | −0.83% | −0.92% | −5.35% | 4.36% | −4.91% | 3.80% | −0.50% |
| 0 | 26.50% | 100.00% | 100.00% | 100.00% | 39.01% | 100.00% | 45.92% | 100.00% | 82.13% |
| 5 | 100.00% | 89.47% | 96.90% | 81.99% | 100.00% | 100.65% | 100.00% | 92.97% | 100.00% |
| 10 | 96.04% | 82.94% | 94.03% | 90.32% | 113.48% | 102.68% | 101.33% | 83.56% | 95.55% |
| 20 | 92.60% | 79.67% | 86.69% | 95.23% | 112.07% | 102.07% | 101.28% | 90.12% | 101.29% |
| 40 | 94.11% | 90.79% | 83.68% | 84.92% | 110.36% | 91.36% | 89.91% | 91.75% | 80.17% |
| 60 | 100.70% | 89.94% | 86.51% | 72.27% | 109.99% | 93.57% | 93.07% | 91.41% | 80.10% |
| 90 | 90.23% | 94.47% | 84.89% | 79.95% | 118.04% | 94.85% | 89.58% | 90.27% | 87.43% |
| 120 | 93.38% | 95.08% | 85.85% | 84.46% | 110.39% | 102.84% | 89.74% | 90.00% | 92.65% |
| 150 | 93.75% | 94.00% | 76.25% | 79.54% | 111.92% | 93.01% | 92.85% | 91.32% | 93.49% |
| 180 | 99.53% | 90.87% | 81.01% | 84.18% | 112.24% | 96.46% | 87.45% | 88.35% | 102.37% |
| 210 | 102.48% | 94.61% | 81.99% | 69.49% | 115.96% | 100.65% | 93.95% | 78.96% | 103.78% |
| 240 | 96.48% | 96.54% | 81.88% | 88.63% | 110.74% | 103.40% | 108.16% | 86.96% | 102.93% |

TABLE 5B

Relative Amylase Enzyme Activity in a Use Solution of the Detergent Compositions Containing a Protease and Various Phosphonates at a Level of 0.6 wt-% at 120° F.

| time (min) | ATMP | PBTC | HEDP | DGAP | MEAP | PAPEMP | PSO | AMPA |
|---|---|---|---|---|---|---|---|---|
| Blank | 0.13% | −5.98% | −1.11% | −0.53% | −1.01% | −4.64% | −5.39% | −3.26% |
| 0 | 100.00% | 100.00% | 100.00% | 100.00% | 100.00% | 100.00% | 100.00% | 100.00% |
| 5 | 87.10% | 107.86% | 96.09% | 102.43% | 95.91% | 91.71% | 98.30% | 91.80% |
| 10 | 92.19% | 111.05% | 99.71% | 95.89% | 99.98% | 99.05% | 97.66% | 92.54% |
| 20 | 80.12% | 106.52% | 91.20% | 99.40% | 90.83% | 94.55% | 94.69% | 85.05% |

TABLE 5B-continued

Relative Amylase Enzyme Activity in a Use Solution of the Detergent Compositions Containing a Protease and Various Phosphonates at a Level of 0.6 wt-% at 120° F.

| time (min) | ATMP | PBTC | HEDP | DGAP | MEAP | PAPEMP | PSO | AMPA |
|---|---|---|---|---|---|---|---|---|
| 40 | 77.64% | 73.11% | 94.89% | 97.26% | 91.75% | 97.22% | 84.89% | 94.06% |
| 60 | 91.13% | 79.10% | 97.28% | 100.23% | 97.99% | 97.94% | 78.56% | 86.14% |
| 90 | 92.19% | 71.11% | 94.67% | 95.37% | 99.08% | 101.28% | 83.38% | 90.32% |
| 120 | 93.02% | 64.98% | 88.12% | 102.17% | 97.36% | 99.25% | 84.70% | 93.67% |
| 150 | 101.54% | 74.97% | 90.33% | 102.37% | 101.28% | 105.34% | 79.34% | 92.05% |
| 180 | 80.83% | 85.22% | 86.96% | 101.89% | 94.70% | 98.44% | 89.95% | 81.43% |
| 210 | 92.78% | 94.67% | 96.92% | 102.69% | 99.20% | 101.64% | 88.55% | 94.06% |
| 240 | 86.75% | 97.07% | 92.50% | 105.89% | 99.15% | 96.02% | 94.02% | 81.87% |

TABLE 5C

Relative Amylase Enzyme Activity in a Use Solution of the Detergent Compositions Containing a Protease and Various Phosphonates at a 0.1% elemental phosphorus level at 120° F.

| time (min) | ATMP | PBTC | HEDP | DGAP | MEAP | PAPEMP | PSO | AMPA |
|---|---|---|---|---|---|---|---|---|
| Blank | −1.95% | −1.50% | −3.71% | −4.45% | 5.88% | −3.90% | −4.72% | −3.90% |
| 0 | 82.19% | 90.07% | — | 100.00% | 100.00% | 100.00% | 100.00% | 97.43% |
| 5 | 100.00% | 100.00% | 100.00% | 98.51% | 95.47% | 85.10% | 87.63% | 100.00% |
| 10 | 107.32% | 98.00% | 97.58% | 108.49% | 112.93% | 95.50% | 86.00% | 102.34% |
| 20 | 106.35% | 89.44% | 90.30% | — | 117.67% | 96.02% | 82.60% | 105.43% |
| 40 | 100.35% | 90.60% | 81.48% | 97.68% | 122.41% | 91.46% | 68.15% | 92.18% |
| 60 | 106.09% | 86.05% | 83.84% | 97.62% | 125.44% | 97.42% | 72.63% | 92.23% |
| 90 | 101.79% | 90.47% | 85.26% | 99.36% | 127.99% | 89.60% | 71.93% | 96.88% |
| 120 | 104.38% | 89.11% | 82.59% | 92.67% | 123.91% | 99.26% | 65.82% | 92.96% |
| 150 | 101.75% | 88.36% | — | 98.24% | 120.88% | 101.88% | 69.91% | 103.38% |
| 180 | 103.89% | 82.80% | 75.47% | 93.89% | 113.29% | 91.85% | 75.23% | 102.05% |
| 210 | 100.38% | 84.45% | 85.77% | 107.33% | 112.78% | 99.00% | 74.61% | 91.32% |
| 240 | 107.10% | 91.39% | 81.23% | 103.75% | 118.72% | 96.59% | 76.21% | 99.25% |

TABLE 5D

Relative Amylase Enzyme Activity in a Use Solution of the Detergent Compositions Containing a Protease and Various Phosphonates Neutralized with an Alkanolamine at a Level of 0.3 wt-% at 120° F.

| PBTC neutralized with TEA | HEDP neutralized with TEA | PSO neutralized with TEA | PBTC neutralized with MEA | HEDP neutralized with MEA | PSO neutralized with MEA | PBTC neutralized with IPA | HEDP neutralized with IPA | PSO neutralized with IPA |
|---|---|---|---|---|---|---|---|---|
| 1.45% | 1.09% | 6.53% | 1.66% | 3.10% | 3.18% | −4.90% | −0.52% | −0.27% |
| 78.26% | 97.09% | 100.00% | 100.00% | 88.65% | 78.22% | 100.00% | 95.84% | 91.22% |
| 100.00% | 100.00% | 79.64% | 74.46% | 100.00% | 100.00% | 85.98% | 100.00% | 100.00% |
| 100.23% | 102.11% | 90.67% | 76.22% | 95.28% | 99.59% | 88.34% | 96.93% | 102.42% |
| 98.16% | 97.01% | 99.47% | 74.00% | 103.84% | 100.02% | 84.63% | 95.39% | 100.25% |
| 95.30% | 92.21% | 107.22% | 74.18% | 89.21% | 81.36% | 82.64% | 90.50% | 102.59% |
| 95.53% | 92.69% | 102.80% | 82.04% | 84.15% | 83.13% | 86.12% | 89.15% | 101.65% |
| 100.38% | 97.65% | 116.70% | 83.37% | 84.46% | 84.18% | 84.53% | 97.78% | 105.89% |
| 100.48% | 97.26% | 117.67% | 84.41% | 90.08% | 85.55% | 86.52% | 93.19% | 109.47% |
| 97.55% | 98.42% | 114.79% | 93.20% | 97.93% | 98.17% | 90.97% | 94.21% | 107.16% |
| 95.18% | 100.68% | 98.22% | 74.68% | 95.62% | 98.34% | 86.45% | 96.62% | 100.22% |
| 96.12% | 102.40% | 92.27% | 78.79% | 97.86% | 103.65% | 89.86% | 98.72% | 103.00% |
| 94.33% | 101.82% | 98.73% | 74.22% | 108.86% | 99.44% | 91.26% | 109.38% | 107.60% |

TABLE 5E

Relative Amylase Enzyme Activity in a Use Solution of the All Ash Detergent Compositions Containing a Protease and Various Phosphonates at a Level of 0.3 wt-% at 120° F.

| time (min) | ATMP | DGAP | PBTC | HEDP |
|---|---|---|---|---|
| Blank | −2.61% | 0.85% | 0.39% | 1.29% |
| 0 | 98.49% | 100.00% | 98.88% | 92.90% |
| 5 | 100.00% | 89.94% | 100.00% | 100.00% |

TABLE 5E-continued

Relative Amylase Enzyme Activity in a Use Solution of the All Ash Detergent Compositions Containing a Protease and Various Phosphonates at a Level of 0.3 wt-% at 120° F.

| time (min) | ATMP | DGAP | PBTC | HEDP |
|---|---|---|---|---|
| 10 | 98.40% | 87.50% | 94.76% | 97.04% |
| 20 | 97.90% | 88.87% | 90.04% | 87.85% |
| 40 | 91.03% | 86.87% | 63.67% | 70.85% |

TABLE 5E-continued

Relative Amylase Enzyme Activity in a Use Solution of the All Ash Detergent Compositions Containing a Protease and Various Phosphonates at a Level of 0.3 wt-% at 120° F.

| time (min) | ATMP | DGAP | PBTC | HEDP |
|---|---|---|---|---|
| 60 | 86.91% | 82.06% | 58.65% | 55.60% |
| 90 | 87.68% | 81.79% | 54.03% | 63.30% |
| 120 | 80.93% | 75.74% | 45.38% | 58.18% |
| 150 | 83.80% | 79.71% | 44.40% | 54.50% |
| 180 | 80.91% | 65.75% | 41.15% | 45.78% |
| 210 | 84.34% | 71.27% | 41.56% | 44.79% |
| 240 | 83.21% | 70.12% | 40.40% | 41.67% |

TABLE 6A

Relative Lipase Enzyme Activity in a Use Solution of the Detergent Composition Containing a Lipase and Various Phosphonates at a Level of 0.3 wt-% at 120° F.

| time (min) | No Phosphorous | ATMP | PBTC | HEDP | DGAP | MEAP | PAPEMP | PSO |
|---|---|---|---|---|---|---|---|---|
| Blank | −7.58% | −5.56% | −8.69% | −2.91% | −4.86% | −3.99% | −3.64% | −7.44% |
| 0 | 100.00% | 100.00% | 100.00% | 100.00% | 100.00% | 100.00% | 49.99% | 48.83% |
| 5 | 72.61% | 79.77% | 73.63% | 47.15% | 83.54% | 84.99% | 100.00% | 100.00% |
| 10 | 76.29% | 71.10% | 66.55% | 44.35% | 88.25% | 78.55% | 92.85% | 84.45% |
| 20 | 62.07% | 62.47% | 48.22% | 34.94% | 77.15% | 58.36% | 77.81% | 64.78% |
| 40 | 38.96% | 39.28% | 26.23% | 23.40% | 62.99% | 39.07% | 54.24% | 29.73% |
| 60 | 25.66% | 34.01% | 15.51% | 17.75% | 52.84% | 31.84% | 51.08% | 19.72% |
| 90 | 14.12% | 26.70% | 7.72% | 11.06% | 43.46% | 26.97% | 45.80% | 11.86% |
| 120 | 8.54% | 22.13% | 3.90% | 6.92% | 35.40% | 22.23% | 36.29% | 6.82% |
| 150 | 5.72% | 19.07% | 2.70% | 5.38% | 31.10% | 20.19% | 33.14% | 5.20% |
| 180 | −0.84% | 17.48% | −0.75% | 2.90% | 22.42% | 19.50% | 28.25% | 3.31% |
| 210 | 1.12% | 15.49% | −1.86% | 2.62% | 24.78% | 16.46% | 26.56% | 2.38% |
| 240 | 0.88% | 14.68% | −2.20% | 2.32% | 22.08% | 15.76% | 24.03% | 2.08% |

TABLE 6B

Relative Lipase Enzyme Activity in a Use Solution of the Detergent Composition Containing a Lipase and Various Phosphonates at a Level of 0.6 wt-% at 120° F.

| time (min) | ATMP | PBTC | HEDP | DGAP | MEAP | PAPEMP | PSO | AMPA |
|---|---|---|---|---|---|---|---|---|
| Blank | −2.73% | −2.06% | −1.35% | −2.99% | −2.42% | −3.29% | −3.68% | −1.32% |
| 0 | 100.00% | 100.00% | 100.00% | 100.00% | 100.00% | 100.00% | 100.00% | 100.00% |
| 5 | 93.26% | 61.52% | 62.99% | 95.36% | 95.37% | 86.04% | 67.75% | 80.17% |
| 10 | 87.80% | 62.20% | 59.92% | 100.58% | 90.69% | 83.42% | 48.43% | 64.48% |
| 20 | 81.36% | 44.99% | 48.34% | 94.94% | 83.63% | 73.22% | 32.89% | 49.45% |
| 40 | 60.03% | 31.89% | 33.30% | 93.85% | 72.89% | 64.86% | 14.07% | 37.77% |
| 60 | 56.12% | 23.30% | 23.22% | 86.18% | 69.90% | 59.26% | 10.48% | 26.82% |
| 90 | 49.58% | 16.36% | 17.91% | 76.99% | 65.92% | 47.33% | 8.07% | 19.59% |
| 120 | 42.20% | 12.11% | 14.72% | 71.87% | 59.18% | 42.05% | 5.40% | 15.84% |
| 150 | 37.91% | 9.68% | 12.63% | 72.77% | 53.85% | 38.58% | 4.42% | 15.01% |
| 180 | 33.77% | 6.06% | 7.01% | 64.17% | 51.72% | 29.04% | 2.99% | 13.23% |
| 210 | 32.19% | 6.80% | 8.08% | 63.68% | 47.03% | 31.37% | 5.01% | 12.05% |
| 240 | 29.80% | 5.96% | 5.20% | 56.85% | 42.96% | 29.77% | 2.12% | 11.16% |

TABLE 6C

Relative Lipase Enzyme Activity in a Use Solution of the Detergent Composition Containing a Lipase and Various Phosphonates at a Level of 0.1% elemental phosphorus at 120° F. or at room temperature.

| time (min) | ATMP | PBTC | HEDP | DGAP | MEAP | PAPEMP | PSO | AMPA |
|---|---|---|---|---|---|---|---|---|
| Blank | −3.96% | −1.76% | −1.60% | −3.52% | −3.13% | −2.56% | −1.04% | −3.14% |
| 0 | 100.00% | 100.00% | 100.00% | 100.00% | 100.00% | 100.00% | 100.00% | 100.00% |
| 5 | 82.14% | 87.75% | 79.12% | 88.13% | 81.36% | 91.09% | 58.47% | 79.03% |
| 10 | 78.45% | 73.69% | 67.70% | 80.42% | 84.98% | 83.66% | 52.95% | 77.51% |
| 20 | 64.87% | 56.53% | 51.16% | 74.76% | 71.62% | 75.51% | 43.79% | 62.55% |
| 40 | 45.84% | 25.32% | 25.69% | 49.43% | 57.03% | 58.49% | 27.97% | 53.26% |
| 60 | 37.66% | 19.97% | 19.99% | 46.05% | 47.80% | 54.87% | 18.63% | 44.19% |
| 90 | 30.16% | 15.95% | 16.10% | 39.53% | 41.02% | 48.29% | 13.24% | 33.99% |
| 120 | 25.91% | 12.52% | 13.04% | 34.69% | 31.46% | 42.46% | 11.36% | 28.67% |
| 150 | 21.51% | 11.11% | 11.14% | 28.57% | 28.32% | 38.07% | 9.72% | 23.85% |

TABLE 6C-continued

Relative Lipase Enzyme Activity in a Use Solution of the Detergent Composition Containing a Lipase and Various Phosphonates at a Level of 0.1% elemental phosphorus at 120° F. or at room temperature.

| time (min) | ATMP | PBTC | HEDP | DGAP | MEAP | PAPEMP | PSO | AMPA |
|---|---|---|---|---|---|---|---|---|
| 180 | 15.43% | 10.01% | 9.12% | 25.49% | 20.93% | 33.57% | 3.32% | 16.98% |
| 210 | 17.94% | 9.16% | 7.99% | 24.18% | 23.04% | 31.15% | 5.29% | 17.74% |
| 240 | 15.64% | 9.12% | 7.70% | 22.78% | 20.87% | 31.01% | 4.75% | 16.10% |

TABLE 6D

Relative Lipase Enzyme Activity in a Use Solution of the Detergent Composition Containing a Lipase and Various Phosphonates Neutralize With a Alkanolamine at a Level of 0.3 wt at 120° F. or at room temperature.

| PBTC neutralized with TEA | HEDP neutralized with TEA | PSO neutralized with TEA | PBTC neutralized with MEA | HEDP neutralized with MEA | PSO neutralized with MEA | PBTC neutralized with IPA | HEDP neutralized with IPA | PSO neutralized with IPA |
|---|---|---|---|---|---|---|---|---|
| −1.43% | −1.96% | −5.25% | −0.97% | −5.48% | −5.72% | 1.00% | 1.04% | −1.11% |
| 100.00% | 100.00% | 100.00% | 100.00% | 100.00% | 100.00% | 100.00% | 100.00% | 100.00% |
| 65.46% | 68.45% | 75.32% | 48.91% | 74.09% | 68.36% | 81.40% | — | 69.16% |
| 64.43% | 54.84% | 71.42% | 46.95% | 64.35% | 51.37% | 64.90% | 52.89% | 62.12% |
| 47.72% | 42.36% | 53.53% | 34.80% | 46.99% | 41.11% | 51.13% | 46.32% | 43.17% |
| 31.53% | 22.75% | 35.00% | 20.43% | 24.45% | 21.86% | — | 32.93% | 18.78% |
| 23.15% | 17.11% | 24.95% | 13.60% | 16.43% | 15.13% | — | 25.04% | 13.42% |
| 16.58% | 13.43% | 17.45% | 10.75% | 12.53% | 8.55% | 14.75% | 18.40% | 10.38% |
| 12.91% | 10.58% | 13.62% | 8.59% | 9.01% | 7.00% | 12.55% | 14.58% | 8.29% |
| 10.68% | 8.60% | 11.19% | 7.84% | 6.81% | 4.90% | 11.70% | 14.58% | 7.65% |
| 6.55% | 7.53% | 6.65% | 2.43% | 5.52% | 4.01% | 10.22% | — | 7.05% |
| 6.64% | 6.32% | 6.99% | 3.12% | 4.36% | 1.16% | 10.12% | 6.03% | 6.56% |
| 6.49% | 8.02% | 6.52% | 3.04% | 3.98% | 0.64% | 9.27% | 7.48% | 6.44% |

TABLE 6E

Relative Lipase Enzyme Activity in a Use Solution of the Detergent Composition Containing a Lipase and Various Phosphonates at a Level of 0.3 wt-% at room temperature.

| time (min) | PBTC at RT | HEDP at RT | PSO at RT | PBTC neutralized with TEA at RT | HEDP neutralized with TEA at RT | PSO neutralized with TEA at RT | PBTC neutralized with MEA at RT | HEDP neutralized with MEA at RT | PSO neutralized with MEA at RT | PBTC neutralized with IPA at RT | HEDP neutralized with IPA at RT | PSO neutralized with IPA at RT |
|---|---|---|---|---|---|---|---|---|---|---|---|---|
| Blank | −2.78% | −2.51% | 1.88% | 6.08% | 4.65% | −1.66% | −2.12% | −1.96% | −2.59% | 1.82% | −3.60% | −2.60% |
| 0 | 100.00% | 100.00% | 100.00% | 100.00% | 100.00% | 100.00% | 100.00% | 88.97% | 100.00% | 75.36% | 100.00% | 100.00% |
| 5 | 84.82% | 101.22% | 78.10% | 83.27% | 104.63% | 94.34% | 91.42% | 100.00% | 104.04% | 100.00% | 79.69% | 87.26% |
| 10 | 101.70% | 102.97% | 92.68% | 94.42% | 108.56% | 99.51% | 95.13% | 111.81% | 105.40% | 96.16% | 97.28% | 89.70% |
| 20 | 98.72% | 98.65% | 91.22% | 99.52% | 113.36% | 91.53% | 92.96% | 107.42% | 100.56% | 95.53% | 102.58% | 87.14% |
| 40 | 109.31% | 81.12% | 89.22% | 102.52% | 81.20% | 97.66% | 86.20% | 112.52% | 98.21% | 75.16% | 103.94% | 70.95% |
| 60 | 103.07% | 89.82% | 100.34% | 102.36% | 84.32% | 101.47% | 89.72% | 112.16% | 102.41% | 82.79% | 97.13% | 73.31% |
| 90 | 104.82% | 104.91% | 92.88% | 103.86% | 97.74% | 97.52% | 92.34% | 110.32% | 104.19% | 96.16% | 102.38% | 84.42% |
| 120 | 102.36% | 100.99% | 97.71% | 112.18% | 100.05% | 95.18% | 96.23% | 106.74% | 104.32% | 89.94% | 100.00% | 84.38% |
| 150 | 105.67% | 100.18% | 98.98% | 115.98% | 102.42% | 97.39% | 96.43% | 105.87% | 106.85% | 95.29% | 98.30% | 84.50% |
| 180 | 81.94% | 100.45% | 72.79% | 78.60% | 107.49% | 91.23% | 94.51% | 98.16% | 95.81% | 91.79% | 81.44% | 85.60% |
| 210 | 101.51% | 98.87% | 84.35% | 95.28% | 114.06% | 100.11% | 95.96% | 108.81% | 103.98% | 92.90% | 94.02% | 80.61% |
| 240 | 110.35% | 99.95% | 90.49% | 94.05% | 110.61% | 105.34% | 93.66% | 106.77% | 101.63% | 89.89% | 103.60% | 86.09% |

TABLE 6F

Relative Lipase Enzyme Activity in a Use Solution of the All Ash Detergent Composition Containing a Lipase and Various Phosphonates at a Level of 0.3 wt-% at 120° F.

| time (min) | ATMP | DGAP | PBTC | HEDP |
|---|---|---|---|---|
| Blank | 1.74% | 0.45% | −0.27% | −2.79% |
| 0 | 100.00% | 100.00% | 100.00% | 100.00% |
| 5 | 61.64% | 87.31% | 44.27% | 39.01% |
| 10 | 63.66% | 76.38% | 26.34% | 21.35% |

TABLE 6F-continued

Relative Lipase Enzyme Activity in a Use Solution of the All Ash Detergent Composition Containing a Lipase and Various Phosphonates at a Level of 0.3 wt-% at 120° F.

| time (min) | ATMP | DGAP | PBTC | HEDP |
|---|---|---|---|---|
| 20 | 54.08% | 57.74% | 13.39% | 7.45% |
| 40 | 41.20% | 40.00% | 3.62% | 0.88% |
| 60 | 36.19% | 33.56% | 1.82% | −0.91% |
| 90 | 30.66% | 25.59% | 0.36% | −1.68% |

TABLE 6F-continued

Relative Lipase Enzyme Activity in a Use Solution of the All Ash Detergent Composition Containing a Lipase and Various Phosphonates at a Level of 0.3 wt-% at 120° F.

| time (min) | ATMP | DGAP | PBTC | HEDP |
|---|---|---|---|---|
| 120 | 19.17% | 21.03% | 0.52% | −1.38% |
| 150 | 23.54% | 17.27% | 2.28% | −1.94% |
| 180 | 14.43% | 14.06% | 2.33% | −4.15% |
| 210 | 13.63% | 12.18% | 3.25% | −4.41% |
| 240 | 12.97% | 10.79% | 3.58% | −3.60% |

Figure 1B:
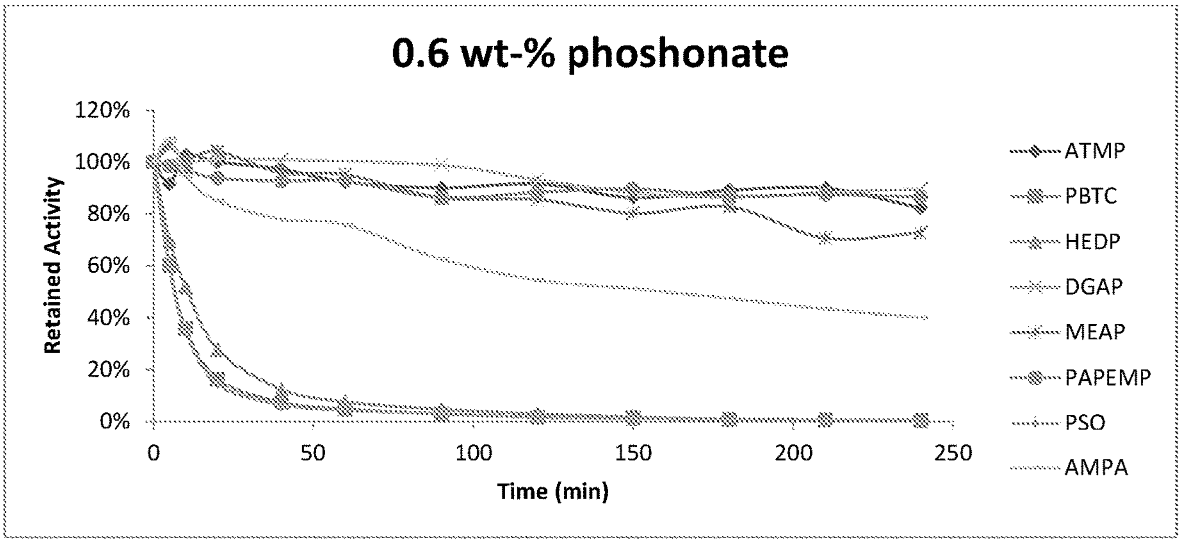
Figure 1C:
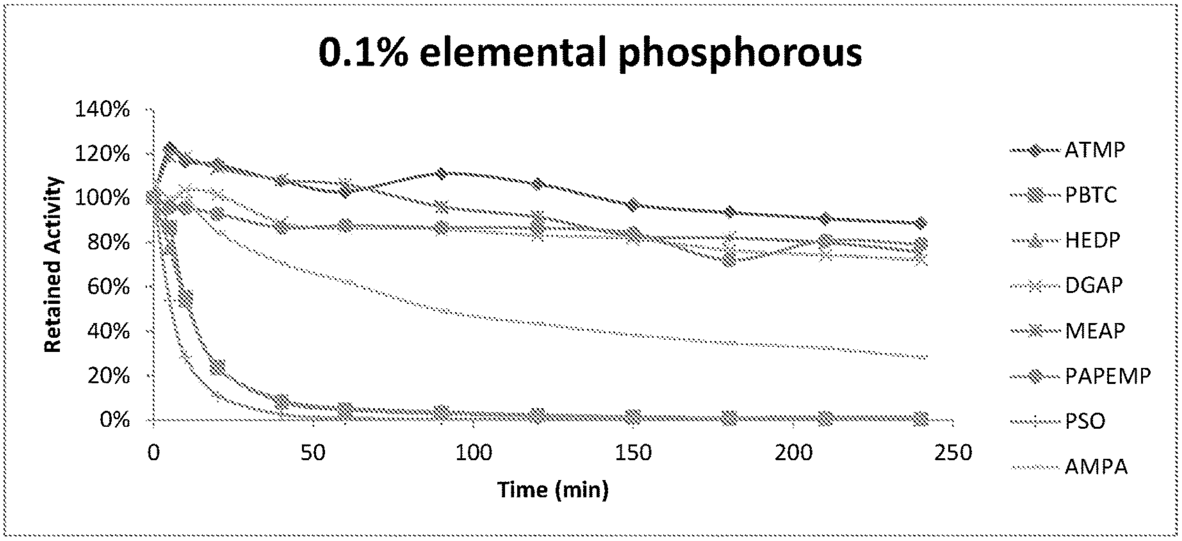
Figure 2A:
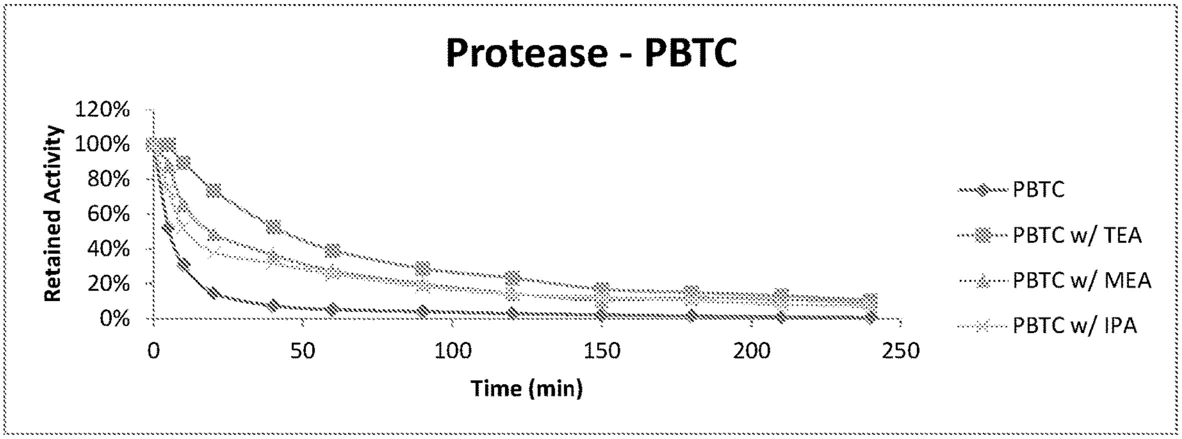
FIGS. 2A-FIG. 2D show the protease activities at different time points in the use solutions of the base or all ash formula detergent compositions containing a phosphonate with or without an alkanolamine at 120° F.
Figure 2B:
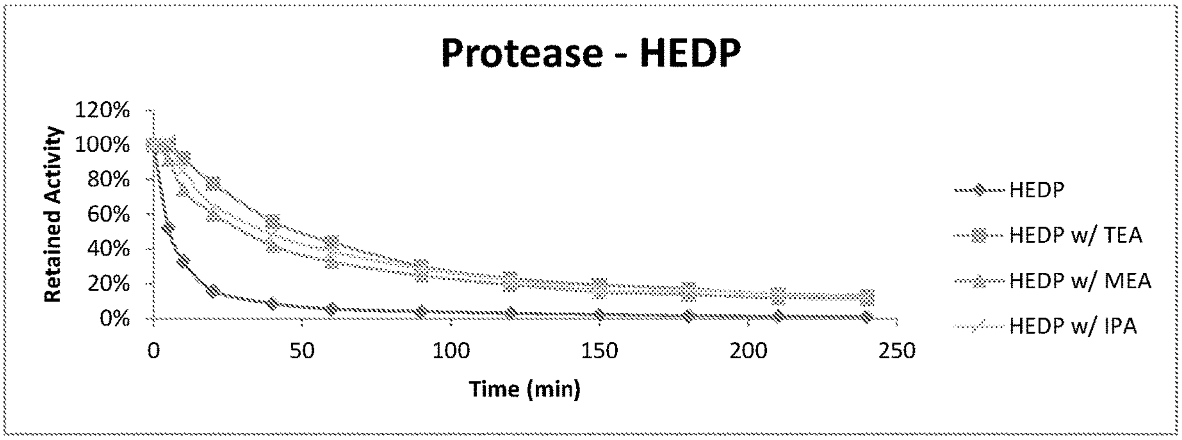
Figure 2C:
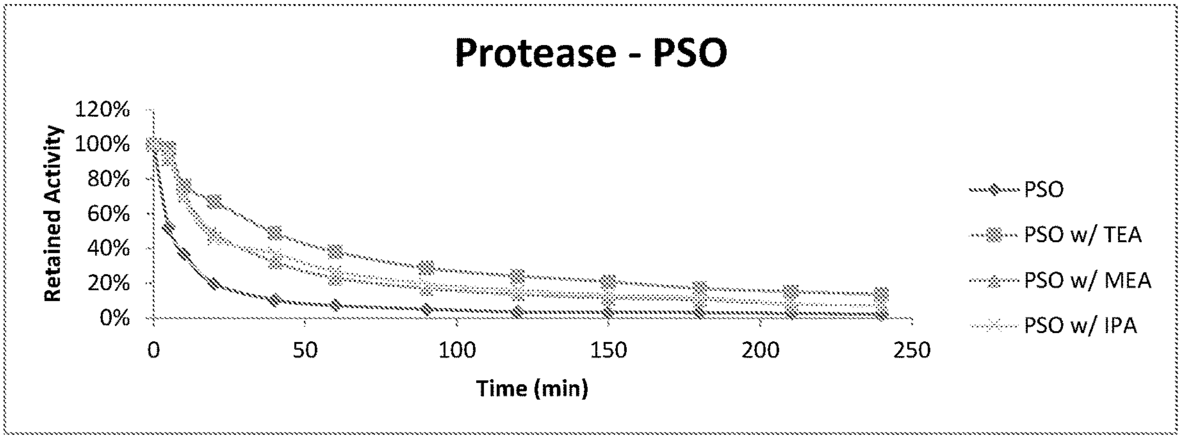
Figure 2D:
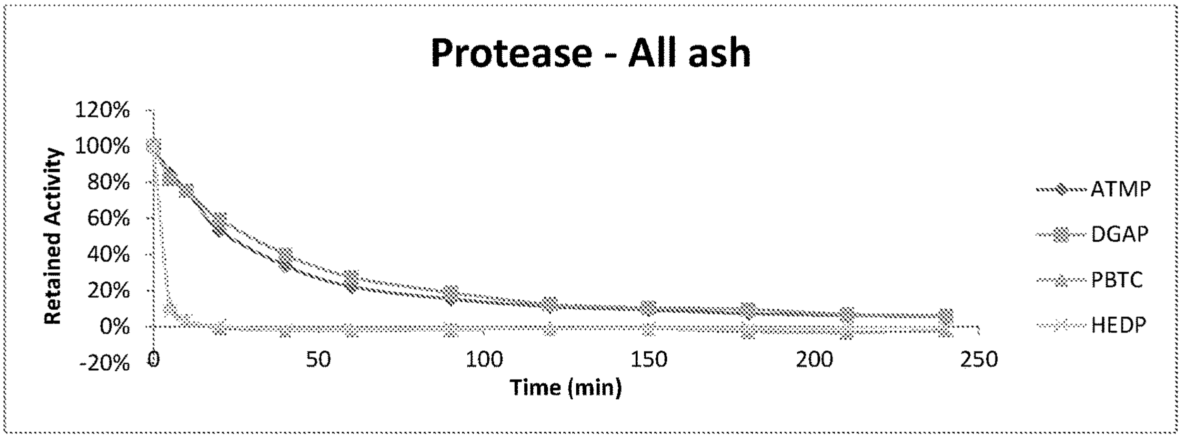
Figure 3A:
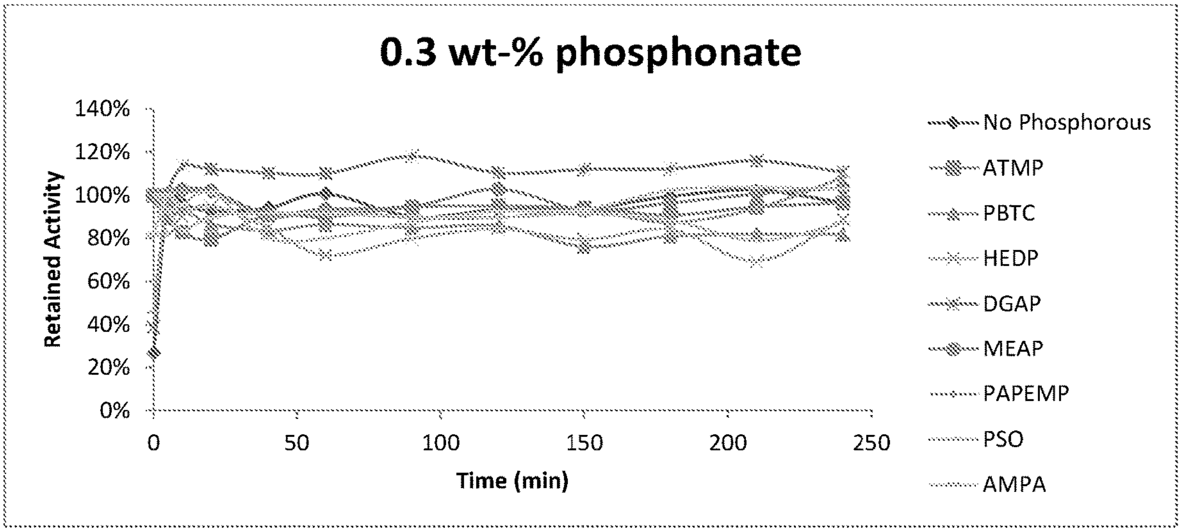
FIG. 3A-FIG. 3C show the amylase activities at different time points in the use solutions of the various base formula detergent compositions containing a phosphonate at different levels at 120° F.
Figure 3B:
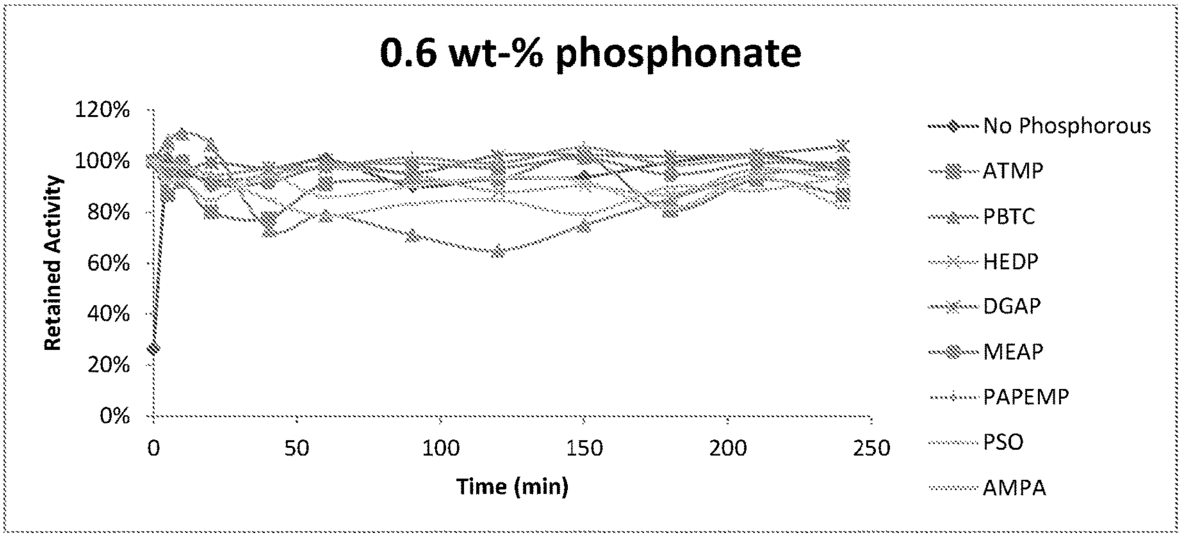
Figure 3C:
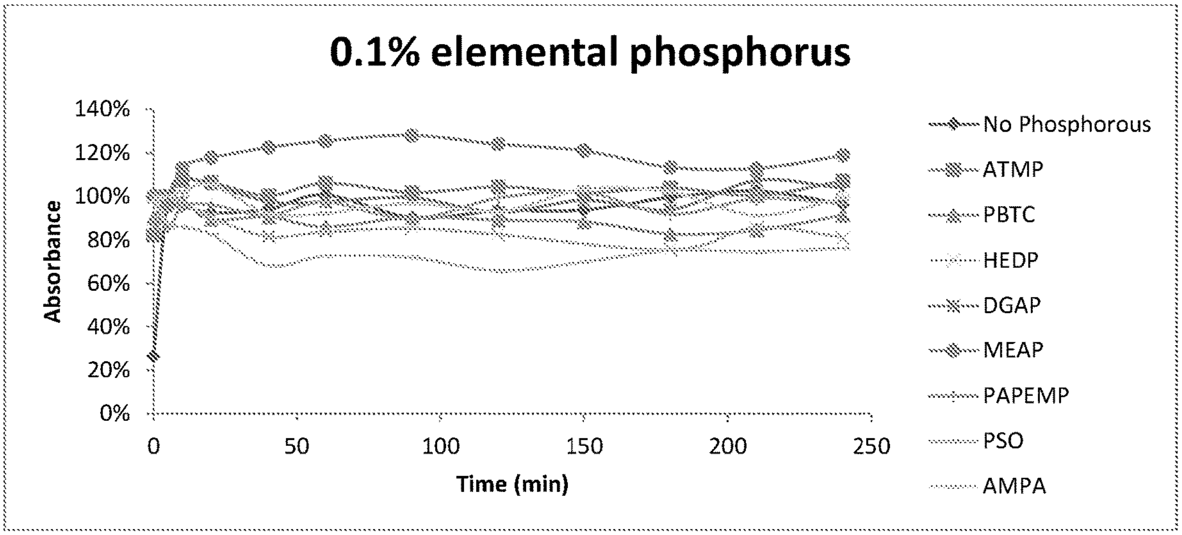
Figure 4A:
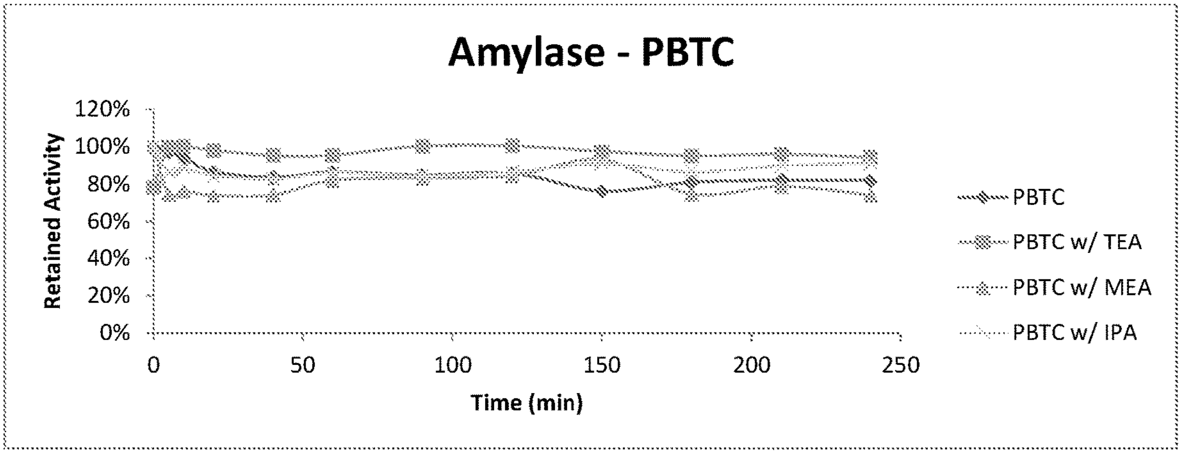
FIGS. 4A-FIG. 4D show the amylase activities at different time points in the use solutions of the base or all ash formula detergent compositions containing a phosphonate with or without an alkanolamine at 120° F.
Figure 4B:
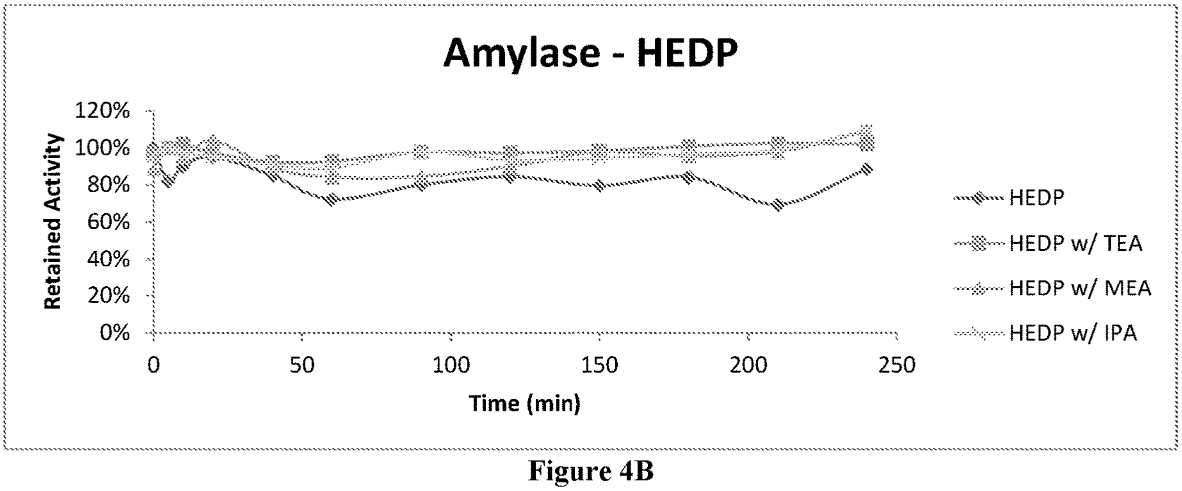
Figure 4C:
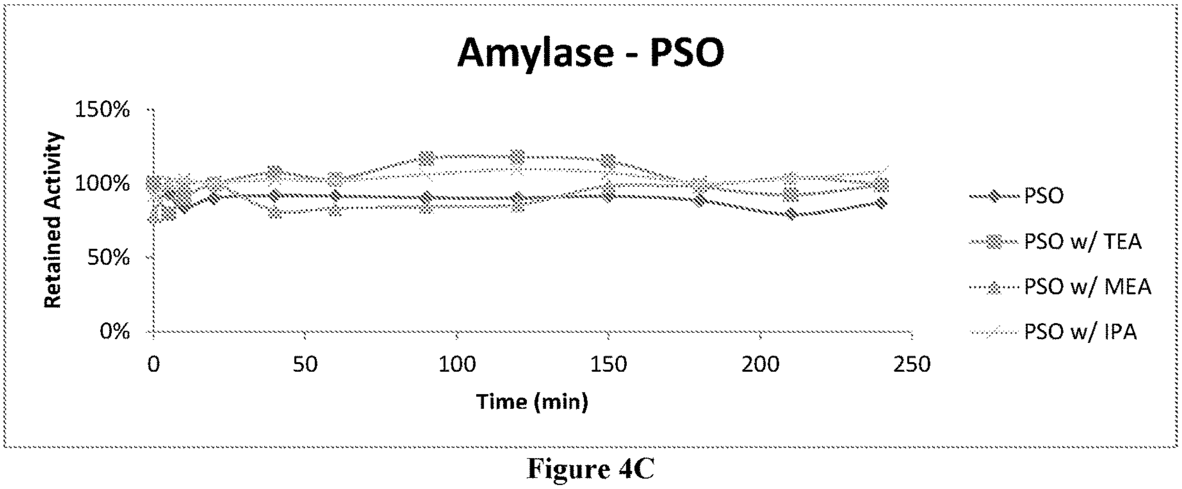
Figure 4D:
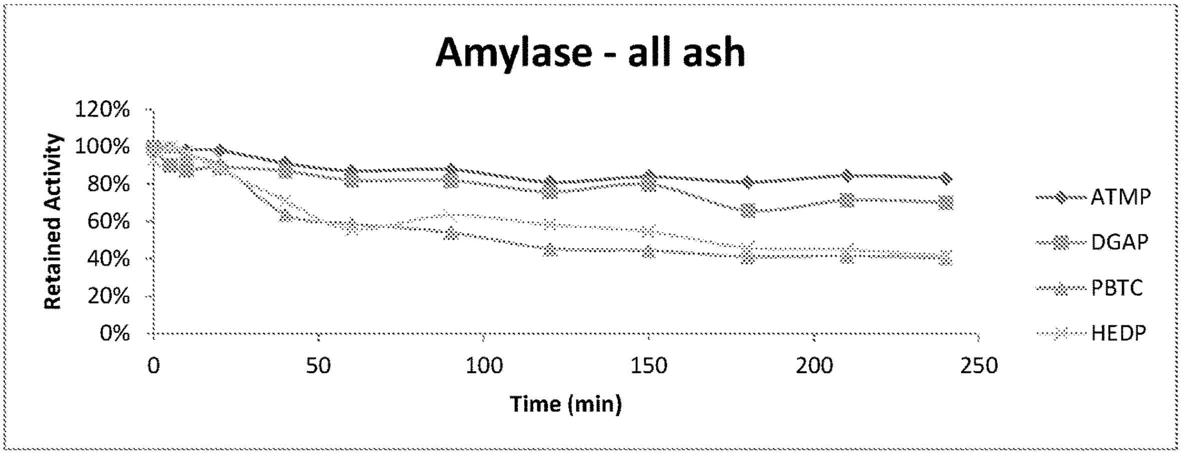
Figure 5A:
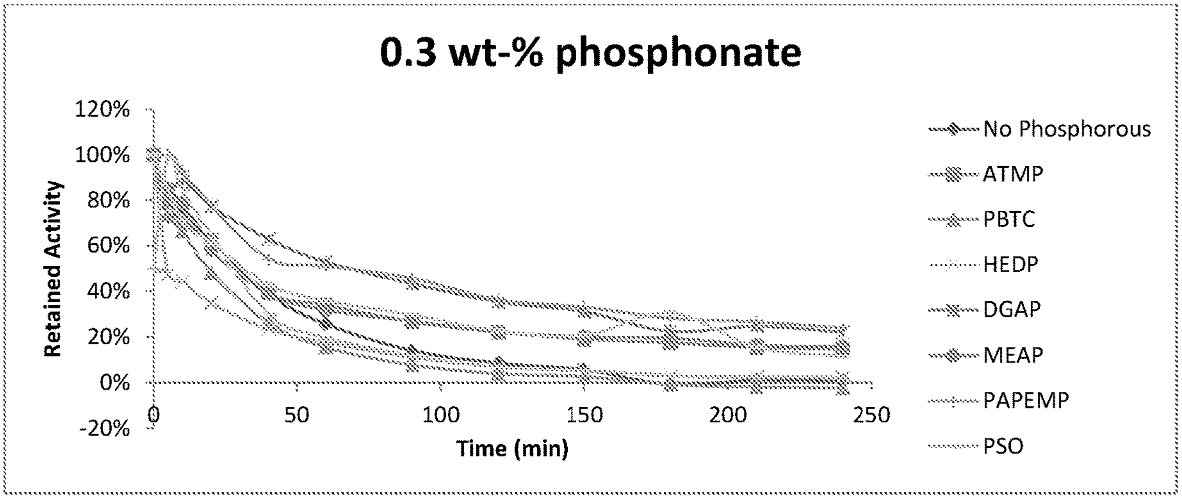
FIG. 5A-FIG. 5C show the lipase activities at different time points in the use solutions of the various base formula detergent compositions containing a phosphonate at different levels at 120° F.
Figure 5B:
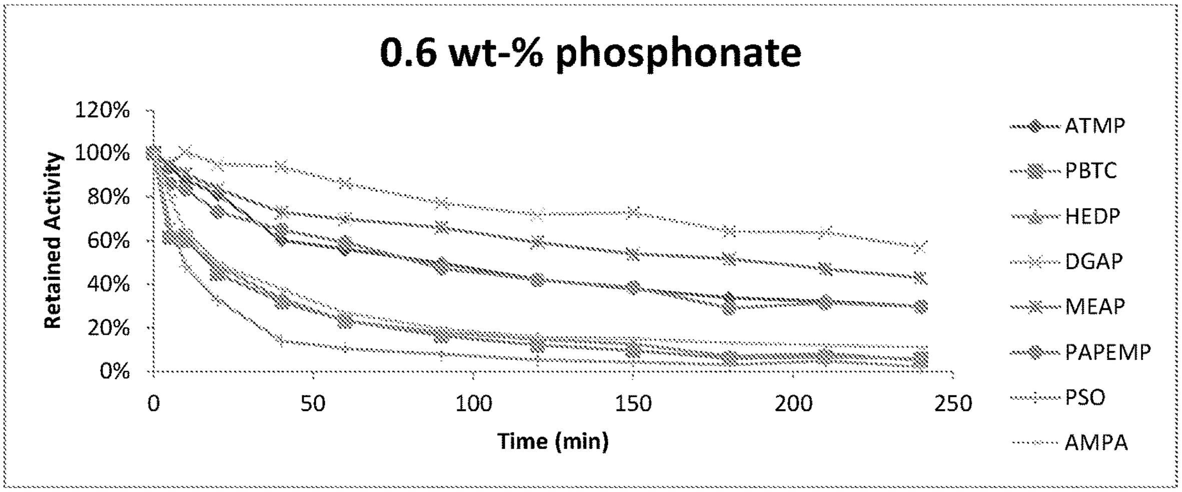
Figure 5C:
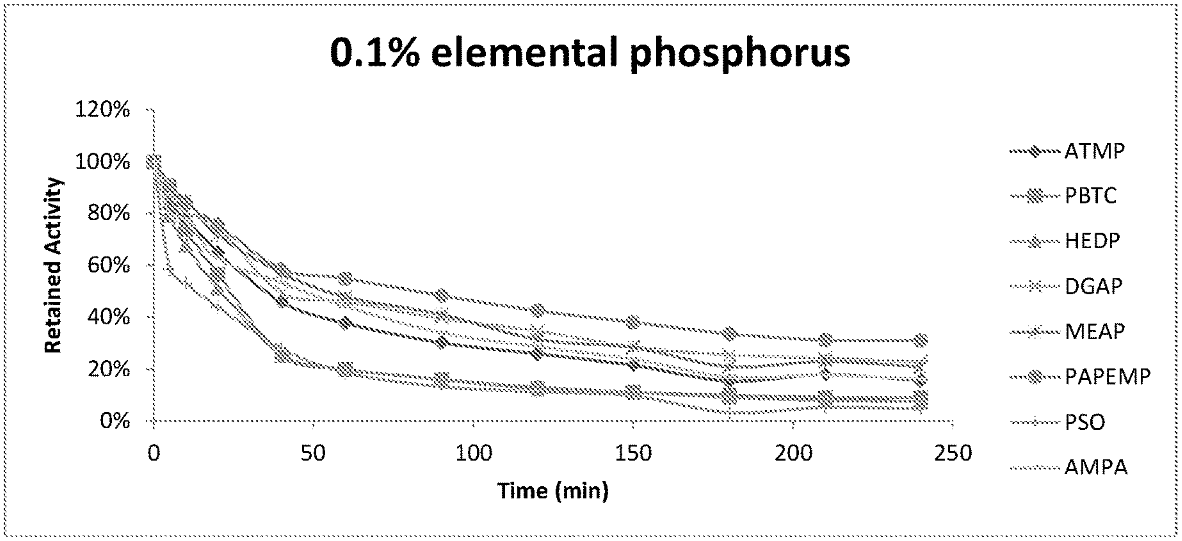
Figure 6A:
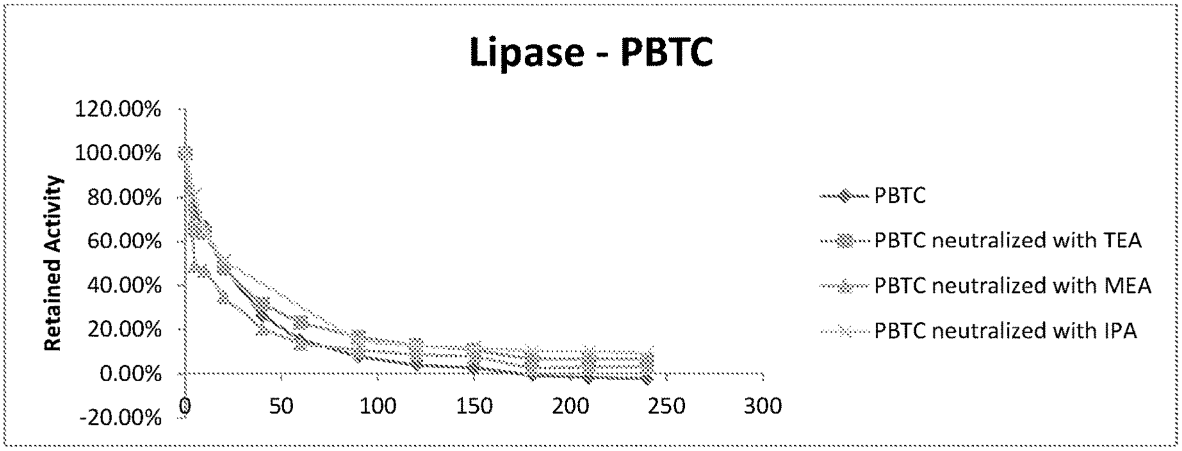
FIGS. 6A-FIG. 6G show the lipase activities at different time points in a use solution of the base or all ash formula detergent compositions containing a phosphonate with or without an alkanolamine at 120° F. or at room temperature.
Figure 6B:
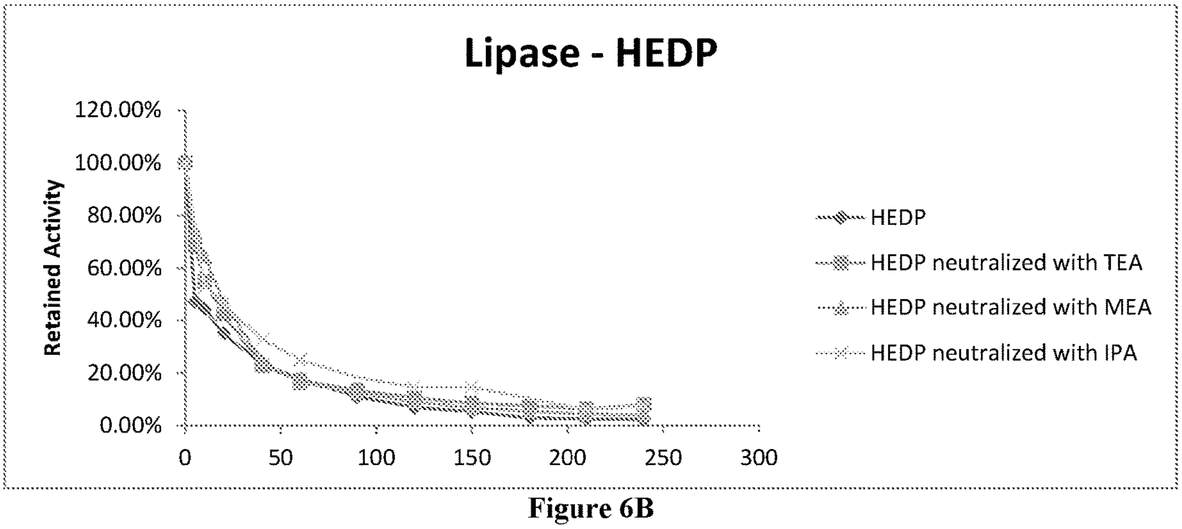
Figure 6C:
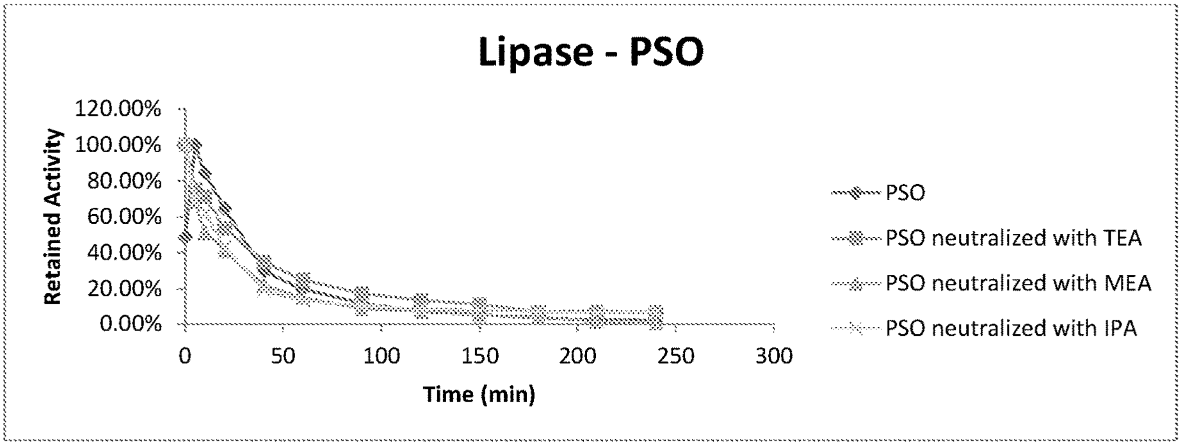
Figure 6D:
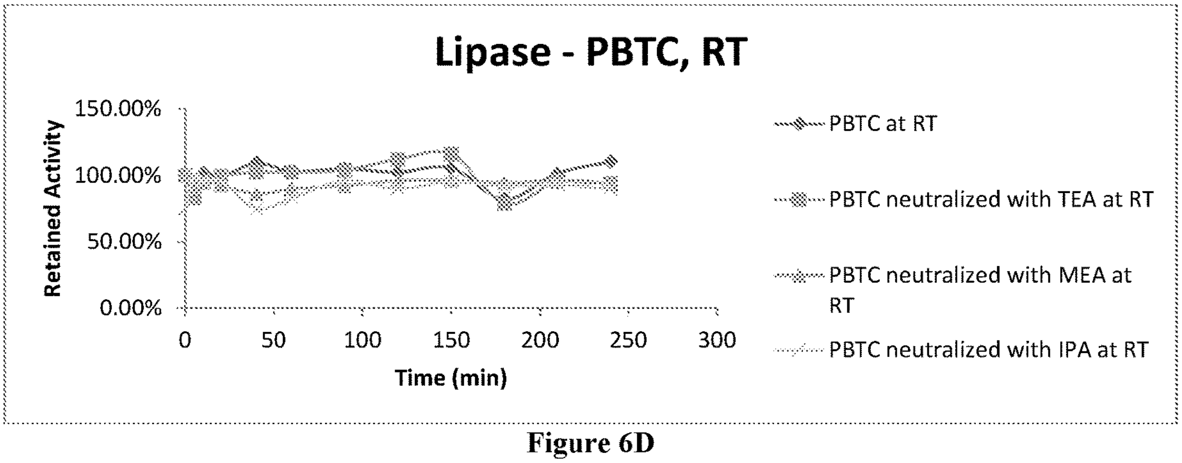
Figure 6E:
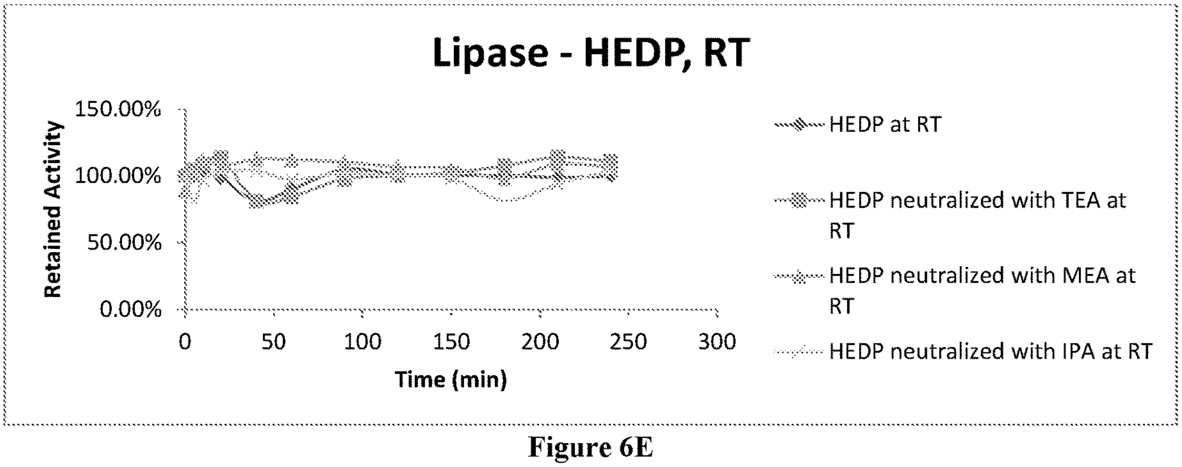
Figure 6F:
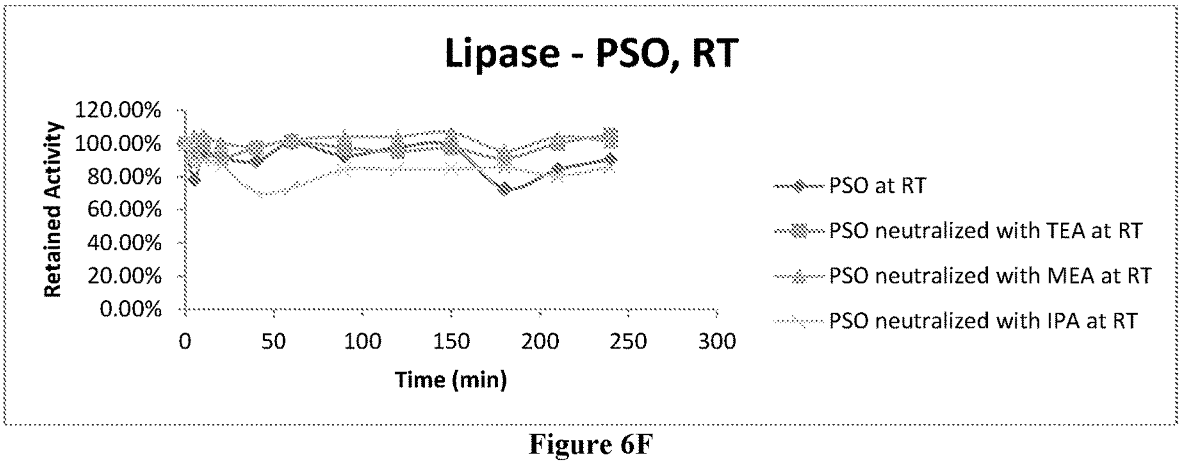
Figure 6G:
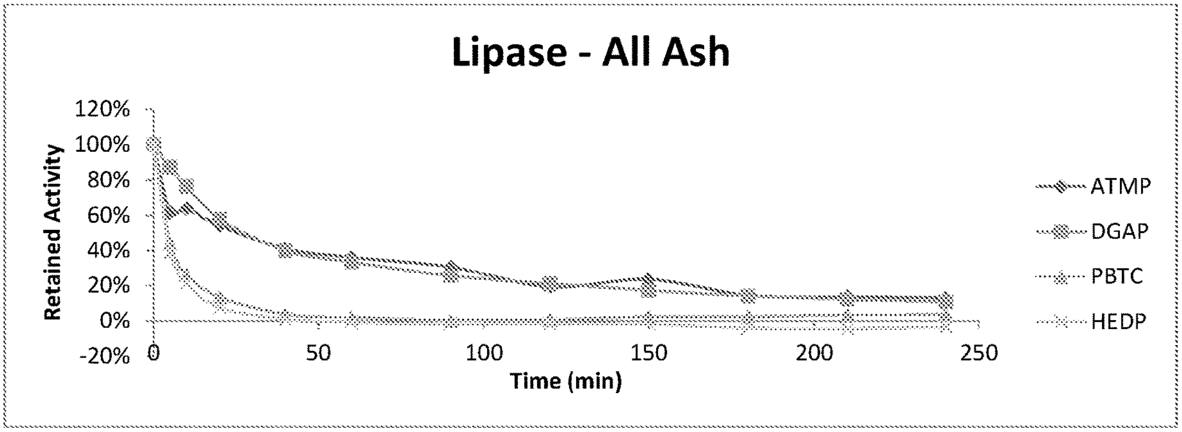

The protease, amylase, and lipase activities at different time points in a use solution of the various detergent compositions containing a phosphonate were plotted in FIGS. 1A-FIG. 6G, respectively. The data in Table 4A-Table 4E and FIG. 1A-FIG. 2C shows that protease in the base formula is more stable in the detergent composition that contains ATMP, DGAP, PAPEMP, and MEAP, which can retain at least 50% protease activity even after its use solution was generated for 4 hours. AMPA also improves protease stability, but to a lesser extent. These phosphonates share a common structure feature of the NR'R"—$PO(OH)_2$. On the other hand, a detergent composition that contains no phosphonate or other type of phosphonates, such as PBTC and HEDP, show a very short enzyme activity time frame and lose more than 70% of its enzyme activity after merely 20 minutes after the use solution is generated. However, for at least some other phosphonates, such as PBTC and HEDP that share common structure feature of CR'R"R'"—$PO(OH)_2$, if the phosphonate is neutralized with an amine, such as triethanolamine, a detergent composition that contains an amine salt of such a phosphonate shows a much improved enzyme activity than the corresponding detergent composition in which the phosphonate is not neutralized by an amine. FIG. 2D shows that protease in the all ash formula is more stable in a use solution of the detergent composition that contains ATMP or DGAP than in a use solution of the same detergent composition that contains PBTC or HEDP without amine(s).

The data in Table 5A-Table 5E and FIG. 3A-FIG. 4C shows that amylase activity in the base formula is also affected differently by different types of phosphonates, in a similar manner as the protease activity, although the effect of phosphonates on amylase activity is not as significant as on protease activity. FIG. 4D shows, however, that amylase in the all ash formula is more stable in a use solution of the detergent composition that contains ATMP or DGAP than in a use solution of the same detergent composition that contains PBTC or HEDP without amine(s).

The data in Table 6A-Table 6F and FIG. 5A-FIG. 6F shows that lipase is also more stable in the detergent composition that contains ATMP, DGAP, PAPEMP, and MEAP, which can retain at least about 15% lipase activity even after its use solution was generated for 4 hours. FIG. 6G shows, however, that lipase in the all ash formula is more stable in a use solution of the detergent composition that contains ATMP or DGAP than in a use solution of the same detergent composition that contains PBTC or HEDP without amine(s).

Applicant unexpectedly discovered that some phosphonates, some of which are commonly used in detergent compositions, actually destabilize protease, amylase, or lipase as shown in FIGS. 1A-FIG. 6G.

Although phosphonates, as scale inhibitors, sequestrants, or antiscalants, are used in many consumer or HI&I detergents to combat hard water use in order to boost the performance of other actives, their general ability as enzyme stabilizers in detergent compositions has not been recognized or investigated, let alone for the specific types of phosphonates as disclosed here. Applicant unexpectedly discovered that these two specific types of phosphonates, alone or in their amine salt forms, can stabilize enzymes in a detergent composition after the generation of its use solution during the cleaning application. This discovery led to increased effectiveness of the detergent compositions and new way to produce or formulate new detergent compositions that are more efficient to remove soils and cost effective.

The inventions being thus described, it will be obvious that the same may be varied in many ways. Such variations are not to be regarded as a departure from the spirit and scope of the disclosures and all such modifications are intended to be included within the scope of the following claims.

The above specification provides a description of the manufacture and use of the disclosed compositions and methods. Since many embodiments can be made without departing from the spirit and scope of the disclosure, the invention resides in the claims.

What is claimed is:

1. A solid detergent composition comprising:

an alkaline source, a phosphonate, and an enzyme;

wherein the alkaline source comprises a metal carbonate, metal bicarbonate, metal silicate, or mixture thereof;

wherein the enzyme comprises a protease, amylase, lipase, cellulase, peroxidase, gluconase, or mixture thereof;

wherein the phosphonate is present from 0.1% to 1% actives concentration and is represented by a formula of

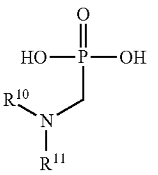

or salt thereof, wherein $R^{10}$ and $R^{11}$ are independently hydrogen, a substituted carboxylic acid, phosphonate, ethanol, diglyco, substituted alkyl, 2-$(EO)_n$-biphosphonateamine-ethyl, 2-$(PO)_n$-biphosphonateamine-isopropyl, or phosphonate-methyl; with a proviso that $R^{10}$ and $R^{11}$ are both —$CH_2$—$PO(OH)_2$ groups.

2. The solid detergent composition of claim 1, wherein the solid detergent is produced by a cast, extruded, or press process.

3. The solid detergent composition of claim 1, wherein the solid detergent is a block, tablet, or particulate.

4. The solid composition of claim 1, wherein the solid detergent is a multi-use solid detergent.

5. The solid detergent composition of claim 1, wherein $R^{11}$ is —$CH_2$—$PO(OH)_2$ group.

6. The solid detergent composition of claim 1, wherein $R^{11}$ is —$CH_2$—$PO(OH)_2$ group and $R^{10}$ is ethanoyl, diglyco, substituted alkyl, isopropyl-2-$(EO)_n$-biphosphonateamine, or methyl-phosphonate.

7. The solid detergent composition of claim 1, wherein the phosphonate is diglycolamine phosphonate (DGAP), monoethanolamine phosphonate (MEAP), polyamino polyether methylene phosphonic acid (PAPEMP), aminomethyl phosphoric acid (AMPA), aminotris(methylene phosphonic acid) (ATMP), a mixture thereof, or a salt thereof.

8. The solid detergent composition of claim 1, wherein the alkaline source comprises a metal carbonate and metal bicarbonate.

9. The solid detergent composition of claim 8, wherein the mole ratio of the metal carbonate and the metal bicarbonate is from about 0.25:1 to about 1:0.25.

10. The solid detergent composition of claim 1, wherein the enzyme comprises a protease, amylase, lipase, or mixture thereof.

11. The solid detergent composition of claim 1, further comprising an amine or salt thereof.

12. The solid detergent composition of claim 11, wherein the amine is fully neutralized.

13. The solid detergent composition of claim 11, wherein the amine comprises an alkanolamine, monoethanolamine, diethanolamine, triethanolamine, isopropylamine, a salt thereof, or a mixture thereof.

14. The solid detergent composition of claim 1, further comprising a metal hydroxide, tripoly phosphate, or mixture thereof.

15. The solid detergent composition of claim 1, further comprising one or more of an oxidizer, builder, water conditioner/water conditioning agent, peroxyacid, initializer of a peroxyacid, chelant, threshold agent, crystal modifier; sanitizing agent, defoaming agent, anti-redeposition agent, bleaching agent, solubility modifier, dispersant, rinse aid, polymer, metal protecting agent, stabilizing agent, corrosion inhibitor, sequestrant and/or chelating agent, fragrance, dye, rheology modifier, thickener, nonionic surfactant, cationic surfactant, or zwitterionic surfactant, hydrotrope, coupler, or any combination thereof.

16. The solid detergent composition of claim 1, wherein a use solution of the composition has a pH of from about 8 to about 12.

17. The solid detergent composition of claim 1, wherein in a use solution of the composition, the enzyme retains at least 15% of its activity at 120° F. for at least 4 hours.

18. The solid detergent composition of claim 1, wherein the enzyme is about 0.1-35 wt-% of the composition.

19. The solid detergent composition of claim 1, wherein the alkaline source is about 0.1-90 wt-% of the composition.

20. The solid detergent composition of claim 1, wherein the solid detergent has a dimensional stability and has a growth exponent of less than 3% if heated at a temperature of 122° F.

* * * * *